US010789459B2

(12) United States Patent
Tokuchi

(10) Patent No.: US 10,789,459 B2
(45) Date of Patent: Sep. 29, 2020

(54) INFORMATION PROCESSING APPARATUS AND NON-TRANSITORY COMPUTER READABLE MEDIUM TO ALLOW OPERATION WITHOUT USER CONTACT

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 43 days.

(21) Appl. No.: 16/051,502

(22) Filed: Aug. 1, 2018

(65) Prior Publication Data
US 2019/0266393 A1 Aug. 29, 2019

(30) Foreign Application Priority Data
Feb. 28, 2018 (JP) .................. 2018-034105

(51) Int. Cl.
*G06K 9/00* (2006.01)
*G06F 3/01* (2006.01)
*G06T 7/246* (2017.01)
*G06F 3/14* (2006.01)

(52) U.S. Cl.
CPC .......... *G06K 9/00375* (2013.01); *G06F 3/011* (2013.01); *G06F 3/017* (2013.01); *G06K 9/00342* (2013.01); *G06T 7/246* (2017.01); *G06F 3/14* (2013.01)

(58) Field of Classification Search
None
See application file for complete search history.

(56) References Cited

U.S. PATENT DOCUMENTS

| 2012/0326966 | A1  | 12/2012 | Rauber |
| 2014/0232747 | A1* | 8/2014  | Sugimoto ............... G06F 3/011 345/633 |
| 2016/0316081 | A1* | 10/2016 | Matsuki .................... G06F 3/12 |
| 2017/0262045 | A1* | 9/2017  | Rouvinez .............. G06T 19/006 |
| 2018/0188806 | A1* | 7/2018  | Colosimo .............. G06F 3/011 |
| 2019/0212962 | A1* | 7/2019  | Iwasaki ................... G06F 3/017 |

FOREIGN PATENT DOCUMENTS

| JP | 2013-172432 | 9/2013 |
| JP | 2014-520339 | 8/2014 |

* cited by examiner

*Primary Examiner* — Henok Shiferaw
(74) *Attorney, Agent, or Firm* — JCIPRNET

(57) ABSTRACT

An information processing apparatus is used in contact with a user, and includes a detection unit and a control unit. The detection unit detects motion of the user, the motion being performed to operate an object as an operation target that is present in a real space from a facing position, and the motion being performed in the real space without contacting the object. The control unit instructs the object to execute an operation corresponding to the detected motion of the user.

29 Claims, 41 Drawing Sheets

INFORMATION PROCESSING APPARATUS AND NON-TRANSITORY COMPUTER READABLE MEDIUM TO ALLOW OPERATION WITHOUT USER CONTACT

CROSS-REFERENCE TO RELATED APPLICATIONS

This application is based on and claims priority under 35 USC 119 from Japanese Patent Application No. 2018-034105 filed Feb. 28, 2018.

BACKGROUND

(i) Technical Field

The present invention relates to an information processing apparatus and a non-transitory computer readable medium.

(ii) Related Art

There is provided a technique of recognizing a device included in an image captured using a camera built in a portable device operated by a user and displaying a virtual user interface corresponding to the recognized device in an augmented reality space to allow operating the device through the virtual user interface.

SUMMARY

According to an aspect of the present invention, there is provided an information processing apparatus that is used in contact with a user, including: a detection unit that detects motion of the user, the motion being performed to operate an object as an operation target that is present in a real space from a facing position, and the motion being performed in the real space without contacting the object; and a control unit that instructs the object to execute an operation corresponding to the detected motion of the user.

BRIEF DESCRIPTION OF THE DRAWINGS

Exemplary embodiments of the present invention will be described in detail based on the following figures, wherein:

FIGS. 40A to 40C illustrate screen variations caused on a display section in the case where a post-processing device image is selected by an index finger image, in which FIG. 40A illustrates display before a gesture by the index finger image is received, FIG. 40B illustrates display after a gesture by the index finger image is received, and FIG. 40C illustrates an example of a screen of the smartphone that receives an operation by a gesture.

DETAILED DESCRIPTION

Exemplary embodiments of the present invention will be described below with reference to the drawings.

First Exemplary Embodiment

System Example

Figure 1:
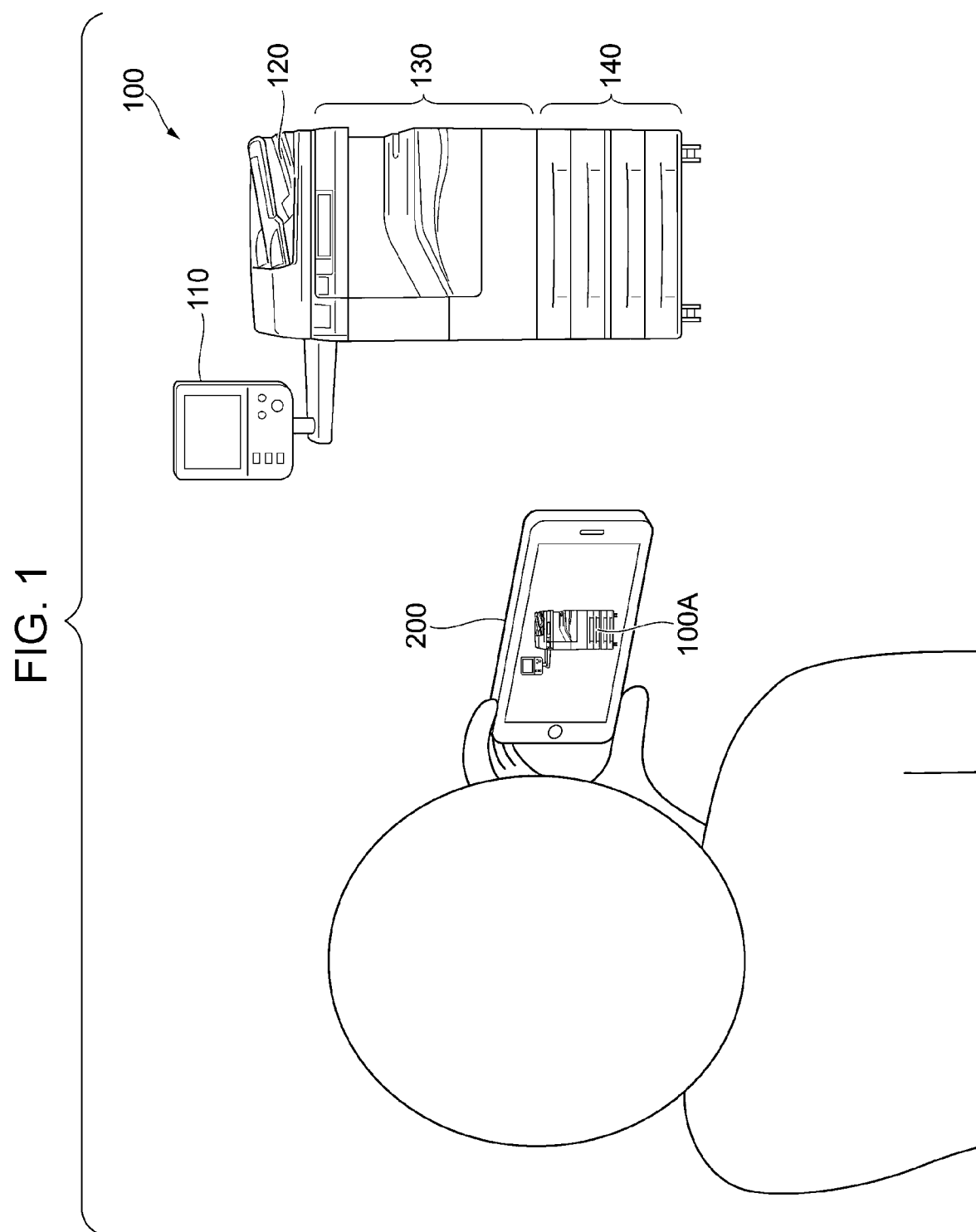
FIG. 1 illustrates an example of a system according to a first exemplary embodiment.

FIG. 1 illustrates an example of a system according to a first exemplary embodiment.

The system illustrated in FIG. 1 includes an image forming apparatus 100 that forms an image on a recording material (hereinafter occasionally referred to representatively as "paper"), and a smartphone 200 that captures an image of the image forming apparatus 100.

The image forming apparatus 100 is an example of the object that is present in the real space, and is also an example of the information processing apparatus.

The image forming apparatus 100 has a copy function of generating a duplicate, a scan function of reading an image of a document, a facsimile transmission/reception function of transmitting and receiving a facsimile image to and from another device, a print function of recording an image on paper, etc. The copy function is implemented by combining the scan function and the print function.

It is not necessary that the image forming apparatus 100 should have all of the copy function, the scan function, and the facsimile transmission/reception function, and the image forming apparatus 100 may be a device that specializes in one of such functions such as a copier, a scanner, a facsimile transmitter/receiver, or a printer (including a three-dimensional printer), for example. The image forming apparatus 100 may also be a device that has a combination of several functions selected from such functions.

The image forming apparatus 100 includes a user interface section 110 that is used to receive an operation from a user and present various kinds of information to the user, an image reading unit 120 that reads an image of a document, an image forming unit 130 that records an image on paper, and a housing section 140 that houses the paper.

The smartphone 200 is a portable terminal device, and includes a camera for image capture, a display screen, a communication function, etc. as discussed later. The smartphone 200 is an example of the information processing apparatus.

An image 100A of the image forming apparatus 100 is displayed on the display screen of the smartphone 200 illustrated in FIG. 1.

<Configuration of Image Forming Apparatus>

Figure 2:
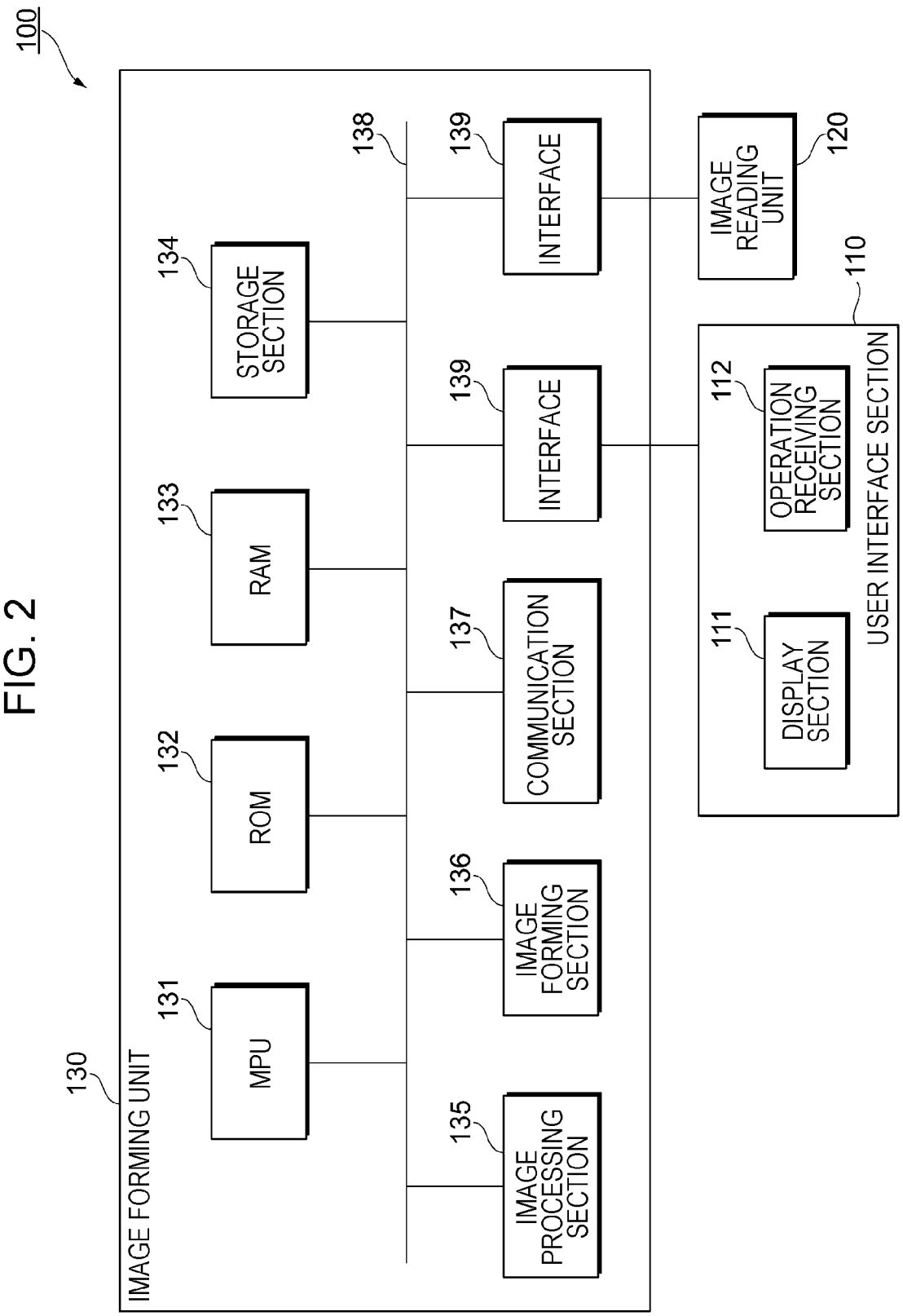
FIG. 2 illustrates an example of the hardware configuration of an image forming apparatus.

FIG. 2 illustrates an example of the hardware configuration of the image forming apparatus 100.

Portions in FIG. 2 corresponding to those in FIG. 1 are denoted by the corresponding reference numerals.

The user interface section 110 includes a display section 111 that is used to display an operation screen etc., and an operation receiving section 112 that receives an operation input by the user.

The display section 111 includes a liquid crystal display panel, an organic electro-luminescence (EL) display panel, or the like, for example.

The operation receiving section 112 includes a button, a touch pad, or the like that receives an operation input by the user.

The image reading unit 120 includes an image reading section that reads an image from a document, and a document transport section that transports the document to the image reading section. The image reading unit 120 is disposed on top of the image forming unit 130.

The image forming unit 130 has a micro processing unit (MPU) 131 that functions as a control section, a read only memory (ROM) 132, and a random access memory (RAM) 133.

The MPU 131 provides various kinds of functions by executing a program such as firmware read from the ROM 132. The RAM 133 is used as a work area for the program.

Besides, the image forming unit 130 includes a storage section 134 that is used to store image data etc., an image processing section 135 that performs image processing such as color correction and tone correction on the image data, an image forming section 136 that forms an image on paper using an electrophotographic system or an inkjet system, a communication section 137 that is used for external communication, etc.

The storage section 134 includes a non-volatile storage medium such as a hard disk device or a semiconductor memory. The storage section 134 stores image data on a document read by the image reading unit 120 and image data received through the communication section 137.

The image processing section 135 includes a dedicated processor or processing board, for example.

The communication section 137 includes a local area network (LAN) interface or an interface for a facsimile communication network service. The LAN interface is used for communication with the smartphone 200 (see FIG. 1) discussed earlier.

The MPU 131, the ROM 132, the RAM 133, the storage section 134, the image processing section 135, the image forming section 136, and the communication section 137 are connected to each other through a bus 138. The user interface section 110 and the image reading unit 120 discussed earlier are connected to the bus 138 through an interface 139.

<Configuration of Smartphone>

Figure 3:
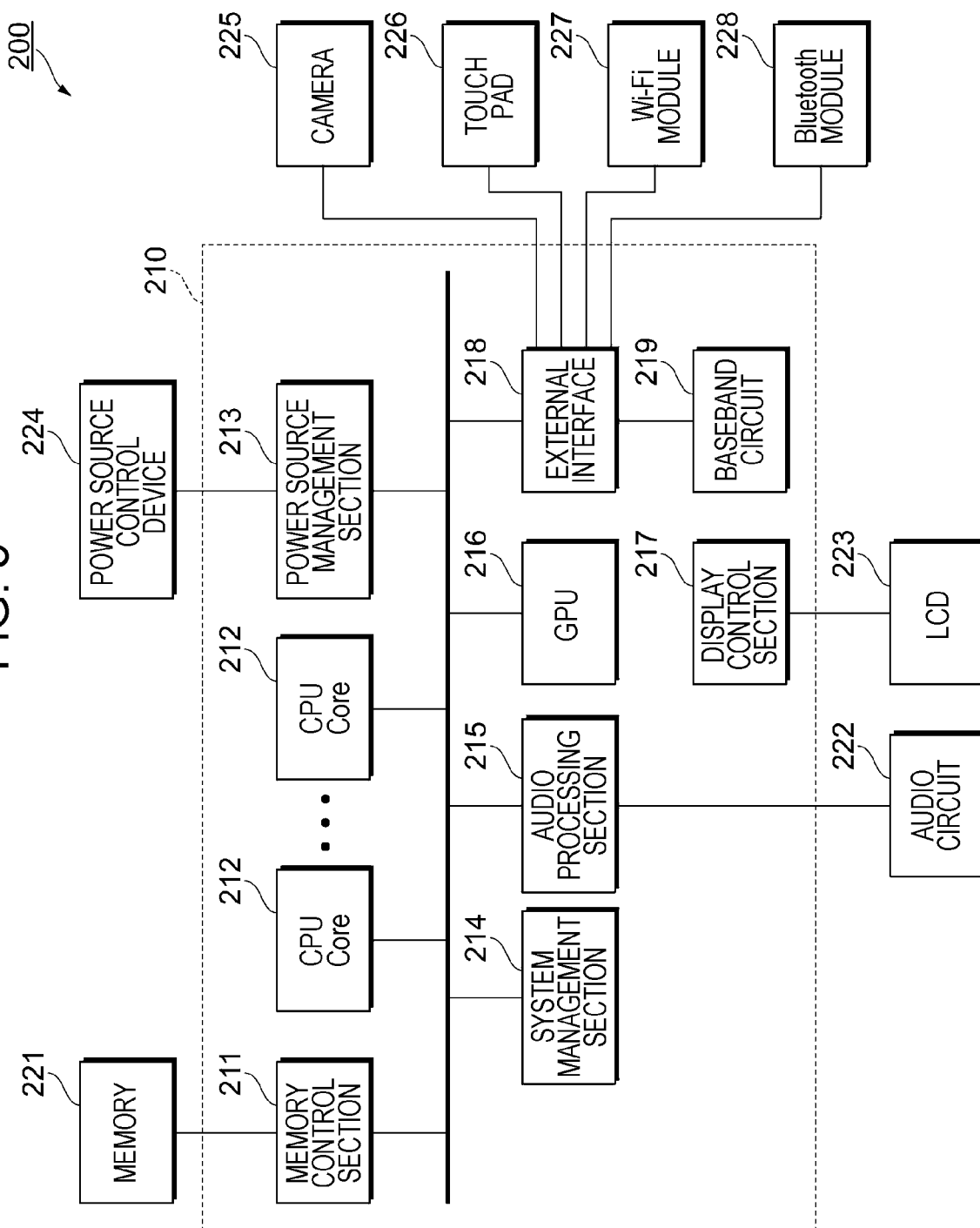
FIG. 3 illustrates an example of the hardware configuration of a smartphone.

FIG. 3 illustrates an example of the hardware configuration of the smartphone 200.

The smartphone 200 includes a processing circuit section 210 that processes data, a non-volatile memory 221 that stores a program and data, an audio circuit 222 that receives and outputs an audio signal, a liquid crystal display (LCD) 223 that displays an image, a power source control device 224, a camera 225 that captures an image, a touch pad 226 that detects contact with an operation surface, a Wi-Fi (Wireless Fidelity) module 227 that transmits and receives a wireless signal that conforms to the Wi-Fi (registered trademark) standard, and a Bluetooth (registered trademark) module 228 that transmits and receives a wireless signal that conforms to the Bluetooth (registered trademark) standard which is one of near-field communication standards.

In the case of the present exemplary embodiment, a surface provided with the camera 225 and a surface provided with the liquid crystal display 223 are a front surface and a back surface, respectively.

This enables the user to capture an image of an object (e.g. the image forming apparatus) that is present in the real space and a part (e.g. a finger, a hand, or a foot) of his/her own body using the camera 225 while confirming the image on the liquid crystal display 223.

In the case where plural cameras 225 are provided or in the case where plural liquid crystal displays 223 are provided, it is only necessary that at least a set of a camera 225 and a liquid crystal display 223 should be disposed on the front surface and the back surface, respectively.

In the present embodiment, the liquid crystal display 223 is used. However, a different display unit such as an organic electro-luminescence (EL) display may also be used.

The processing circuit section 210 includes a memory control section 211 that controls reading and writing of data from and into the memory 221, plural central processing unit (CPU) cores that execute processing, a power source management section 213 that manages supply of power, a system management section 214 that manages operation of a built-in system, an audio processing section 215 that processes an audio signal, a graphics processing unit (GPU) 216 that processes an image in real time, a display control section 217 that displays an image on the liquid crystal display 223, an external interface (I/F) 218 that is used for connection with an external module, and a baseband circuit 219 that processes a baseband signal.

Figure 4:
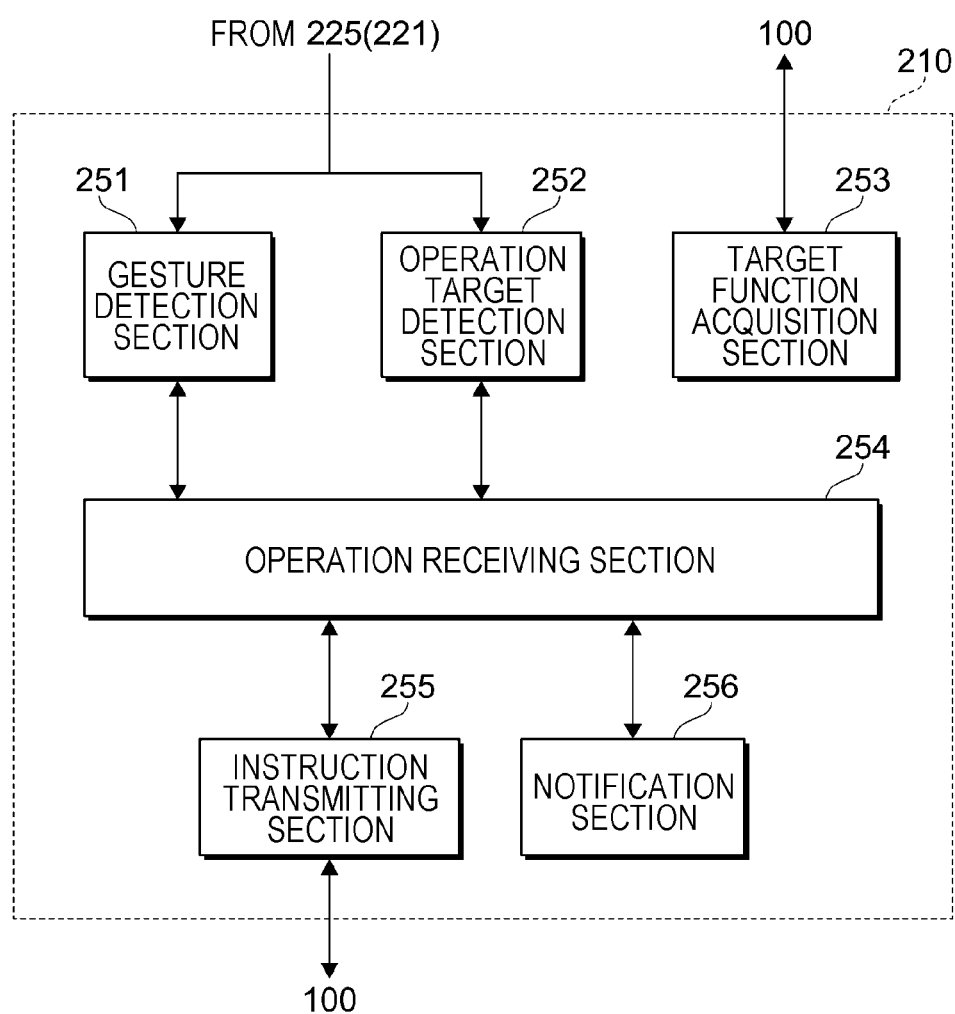
FIG. 4 illustrates an example of the functional configuration implemented by a processing circuit section through execution of a program.

FIG. 4 illustrates an example of the functional configuration implemented by the processing circuit section 210 through execution of a program.

The processing circuit section 210 is an example of the detection unit, and is also an example of the control unit.

The processing circuit section 210 functions as a gesture detection section 251 that detects a gesture by the user by processing image data, an operation target detection section 252 that detects an operation target object, a target function acquisition section 253 that acquires information on a function of the object from the operation target object (the image forming apparatus 100 in the present embodiment), an operation receiving section 254 that receives a gesture by the user as an operation, an instruction transmitting section 255 that transmits an instruction corresponding to the received operation to the target object, and a notification section 256 that notifies the user of reception of the operation.

The gesture detection section 251 according to the present embodiment detects motion of a part (e.g. a finger, a hand, or a foot) of the body of the user from an image captured by the camera 225 as a gesture. The meaning of the motion differs for each object (e.g. the image forming apparatus 100) detected as the operation target.

Examples of the gesture according to the present embodiment include pushing, pulling, rotating, grasping, kicking, stepping on, clicking, double-clicking, dragging, tapping, flicking, and swiping.

The operation target detection section 252 according to the present embodiment detects an object as the operation target, an operator thereof, etc. by analyzing an image displayed on the liquid crystal display 223 (see FIG. 3).

Examples of the operator according to the present embodiment include a physical structure (e.g. a button and a switch) to be operated and display (e.g. a button and a switch) on a screen reproduced in a software manner.

The image to be used in the processing is not limited to real-time image data acquired from the camera 225 provided to the smartphone 200, and may be image data acquired from the memory 221 or acquired externally.

In the case where plural objects are included in the screen, the operation target detection section 252 may detect an object, an image of which displayed on the liquid crystal display 223 is closer to the center of the screen, as the target, or may detect an object, an image of which is superposed on an image of a part of the body of the user, as the operation target, for example.

The operation target detection section 252 may detect a device selected by the user from a list of devices being connected with the smartphone 200 through a wireless LAN or the like as the operation target.

The target function acquisition section 253 according to the present embodiment acquires information on an operator that is operable through communication with an object detected by the operation target detection section 252, for example. For example, the target function acquisition section 253 acquires information on an operator using a wireless LAN.

The target function acquisition section 253 may also acquire information on an operator that is operable from each of communicable devices, for example.

The operation target is not limited to an object that has a communication function. Examples of such an operation target include a plant and a natural object. Also in this case, the target function acquisition section 253 may acquire information on an executable operation through communication with a different device such as a robot that is capable of making motion on behalf of a person.

The operation receiving section 254 according to the present embodiment receives a detected gesture as an operation in association with a particular function of the operation target object.

As illustrated in FIG. 1, the operation target object is present at a position facing the user. Therefore, the direction in which the camera 225 (see FIG. 3) captures an image of a part of the body of the user and the direction in which the camera 225 captures an image of the operation target object are the same as each other.

The facing position may be a position at which the user and the operation target object face each other, and is not necessarily a position at which the user and the object directly face each other. For example, if there is any portion (e.g. a portion of a side surface or a portion of the back surface) of the object that faces the user, it is possible to associate the operation target and a gesture by the user with each other, which allows the user to provide an instruction to the associated object. Thus, the user may be positioned diagonally forward of the object in order to face the object.

The instruction transmitting section 255 according to the present embodiment transmits an instruction corresponding to the received operation to the target object (e.g. the image forming apparatus). In addition, the instruction transmitting section 255 has a function of acquiring a response to an instruction (e.g. reception of an instruction) from the target object.

In the case where a particular gesture and an instruction of a function are associated with each part of the operation target object, the instruction transmitting section 225 may transmit an instruction received through a gesture. In this case, an operation on an operation screen is not necessary.

In the case where it is necessary to perform an operation on an operation screen, it is necessary to perform an operation to select one of plural choices disposed in the operation screen or reach a choice that is positioned in a deep hierarchy.

The notification section 256 according to the present embodiment makes various kinds of notifications that assist the user in performing an operation by a gesture through the audio circuit 222 or the liquid crystal display 223.

<Processing Operation Performed by Processing Circuit Section>

Figure 5:
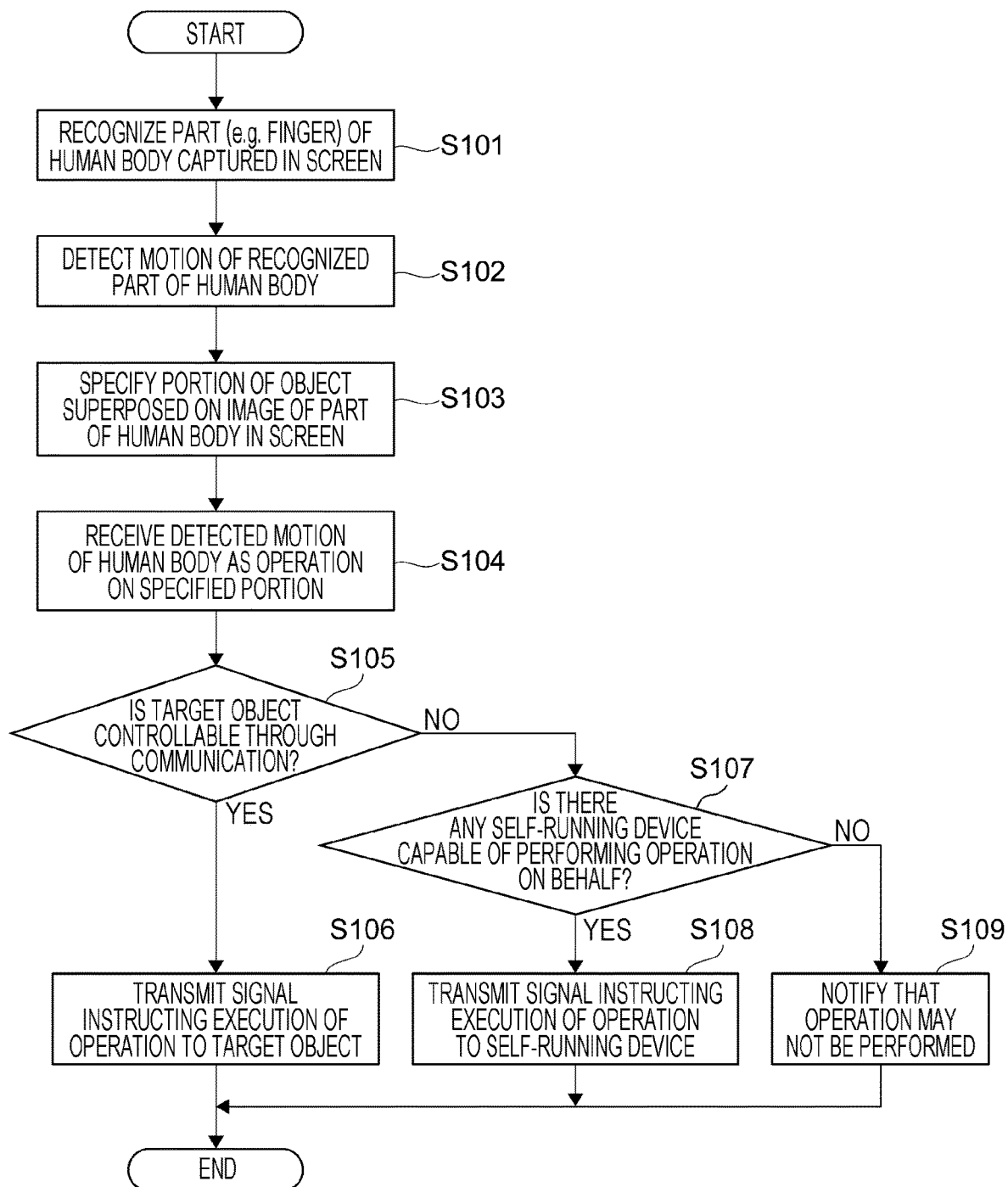
FIG. 5 is a flowchart illustrating an example of processing operation executed by the processing circuit section.

FIG. 5 is a flowchart illustrating an example of processing operation executed by the processing circuit section 210. In FIG. 5, steps are denoted by the symbol S.

The processing circuit section 210 according to the present embodiment recognizes a part (e.g. a finger) of a human body that is captured in the screen of the liquid crystal display 223 (see FIG. 3) (step 101).

Next, the processing circuit section 210 detects motion of the recognized part of the human body (step 102).

The above processes are executed by the gesture detection section 251 (see FIG. 4), for example.

After that, the processing circuit section 210 specifies a portion of an object superposed on an image of the part of the human body in the screen (step 103). This process is executed by the operation target detection section 252 (see FIG. 4), for example.

The processing circuit section 210 also recognizes an operation target object in advance or concurrently. In the case where an operation target object may not be specified, the processing circuit section 210 makes a notification that an operation target object may not be specified, that an image that includes a model or the like should be captured, etc. This process is executed by the notification section 256 (see FIG. 4), for example.

Subsequently, the processing circuit section 210 receives the detected motion of the human body as an operation on the specified portion (step 104). This process is executed by the operation receiving section 254, for example. The processing circuit section 210 occasionally does not receive the detected motion as an operation in the case where no function is correlated with the specified portion or in the case where the detected motion is not related to execution of the correlated function.

Next, the processing circuit section 210 determines whether or not the target object is controllable through communication (step 105). This process is also executed by the operation receiving section 254, for example.

In the case where a positive result is obtained in step 105, the processing circuit section 210 transmits a signal that instructs execution of the operation to the target object (step 106).

In the case where a negative result is obtained in step 105, the processing circuit section 210 determines whether or not there is any self-running device that is capable of making an operation on behalf (step 107).

In the case where a positive result is obtained in step 107, the processing circuit section 210 transmits a signal that instructs execution of the operation to the self-running device (step 108).

In the case where a negative result is obtained in step 107, the processing circuit section 210 makes a notification that the operation may not be performed (step 109).

OPERATION EXAMPLES

Operation examples implemented using the functions discussed earlier will be described below.

Operation Example 1

Figure 6:
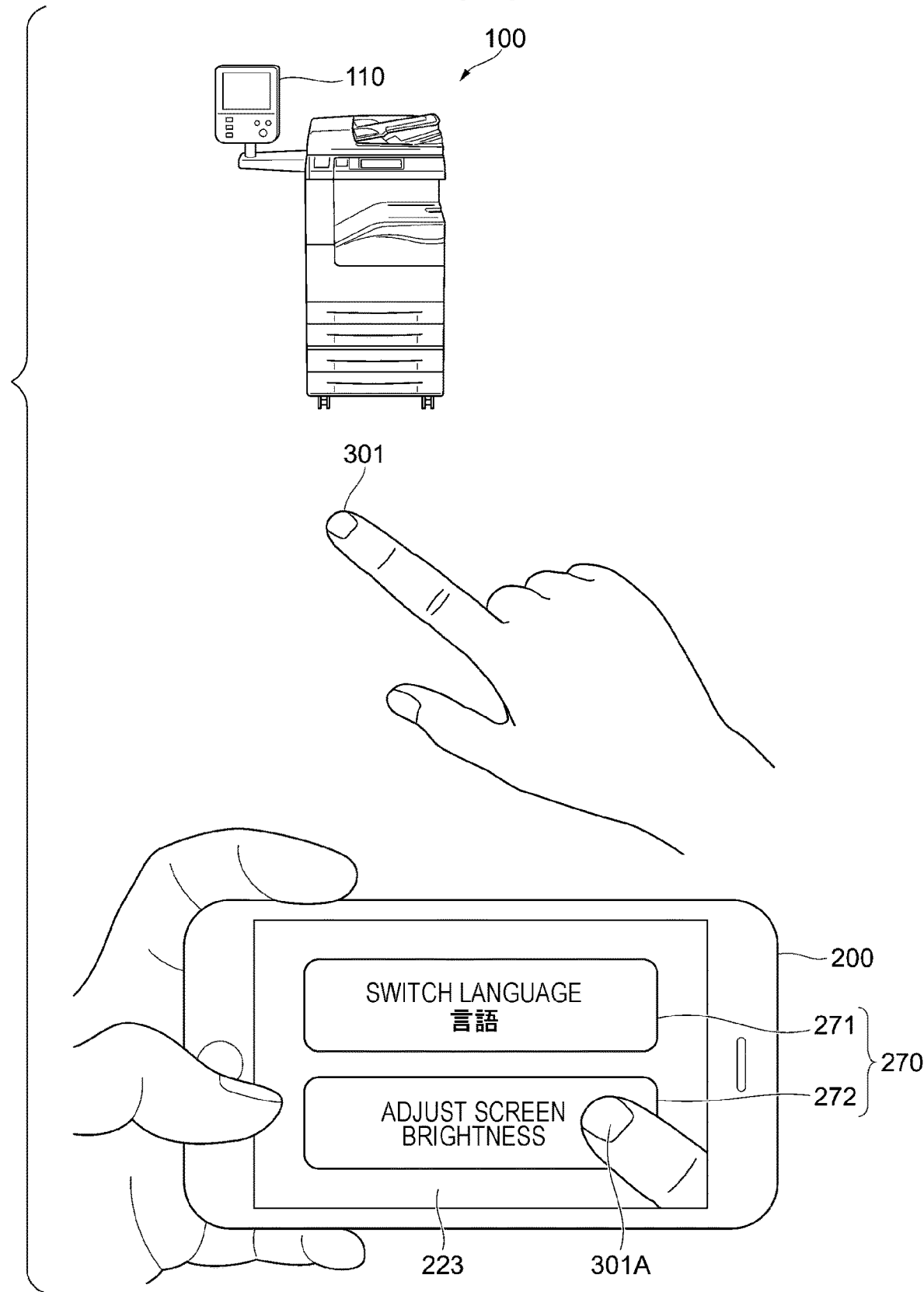
FIG. 6 illustrates a scene in which a user captures an image of his/her own index finger as superposed on the image forming apparatus.

FIG. 6 illustrates a scene in which the user captures an image of his/her own index finger 301 as superposed on the image forming apparatus 100.

When capturing an image, the user holds the smartphone 200 with his/her left hand. An index finger 301 is of the right hand of the user, and is not in contact with the image forming apparatus 100.

In the case of FIG. 6, a portion of the user interface section 110 is displayed as enlarged on the liquid crystal display 223 of the smartphone 200.

This display state is obtained by moving two fingers in contact with the screen of the liquid crystal display 223 away from each other with an image of the image forming apparatus 100 displayed on the liquid crystal display 223. Zoom-up is achieved without contacting the liquid crystal display 223 if a voice recognition technique is used.

In the case of FIG. 6, an image 270 (a button 271 for language switching and a button 272 for screen brightness adjustment) in which a portion of the user interface section 110 that is present in the real space is captured and an index finger image 301A are displayed on the liquid crystal display 223.

In the real space, as discussed earlier, the image forming apparatus 100, the index finger 301 of the user, and the smartphone 200 are positioned sequentially in this order from the farther side.

Thus, the index finger image 301A captured by the smartphone 200 is displayed as superposed on the closer side of the user interface section image 270.

To operate the image forming apparatus 100 using motion of the index finger 301, it is necessary that the image forming apparatus 100 should be specified in advance as the operation target.

To specify the image forming apparatus 100, it is possible to use a technique of specifying a model by processing an image of the image forming apparatus 100, a technique of detecting character information such as a model number included in an image, a technique of allowing selecting one from candidates displayed on the liquid crystal display 223, or the like, for example. The candidates are given as a list of devices being connected with the smartphone 200 through a wireless LAN or the like, for example.

It is assumed that the image forming apparatus 100 has already been specified as the operation target.

In the case of FIG. 6, two operators (the button 271 for language switching and the button 272 for screen brightness adjustment) that are operable are displayed on the liquid crystal display 223. However, three or more operators may be displayed, or only one operator may be displayed.

In the case of FIG. 6, two operators are displayed on the liquid crystal display 223, and thus it is necessary to move the index finger 301 in the air such that the operation target operator and the index finger image 301A are superposed on each other.

Movement of the index finger 301 in the air is also detected by the smartphone 200 as motion of the user. It should be noted, however, that motion in the horizontal direction is not correlated with motion of an operation on the operator captured in an image.

Therefore, motion made before the index finger image 301A is superposed on the button 272 for screen brightness adjustment is not received as an operation on the operator.

In the present embodiment, motion of the index finger image 301A is detected since the operation target includes buttons. However, a portion of the body as the detection target may be determined in accordance with the operation target. For example, a part of a human body such as a hand, an arm, or a foot may be determined as the detection target.

Figure 7:
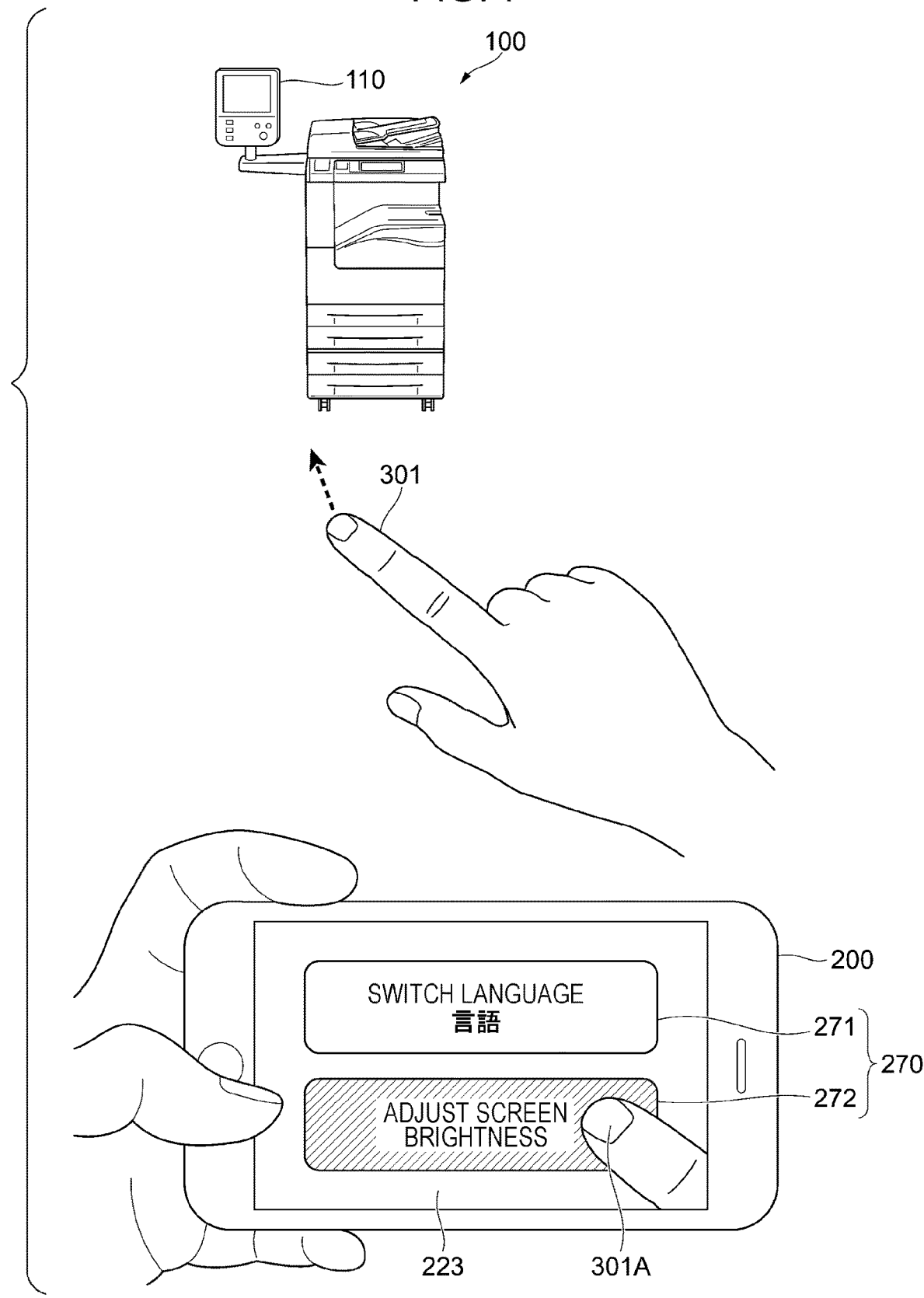
FIG. 7 illustrates a scene in which the user captures an image in which the user makes pushing operation in the air with his/her index finger without contacting the image forming apparatus.

FIG. 7 illustrates a scene in which the user captures an image in which the user makes pushing operation in the air with his/her index finger 301 without contacting the image forming apparatus 100. Portions in FIG. 7 corresponding to those in FIG. 6 are denoted by the corresponding reference numerals.

The pushing operation refers to motion in the direction in which the index finger 301 is moved away from the smartphone 200. In other words, the pushing operation refers to motion in the direction of the image forming apparatus 100.

Specifically, the pushing operation corresponds to motion to push an operator displayed on the user interface section 110 in the actual space. This is because the direction of the line of sight of the user and the direction in which the camera 225 (see FIG. 3) captures an image coincide with each other.

The index finger image 301A is superposed on the button 272 for screen brightness adjustment on the liquid crystal display 223 illustrated in FIG. 7, and thus the smartphone 200 detects the pushing operation as an operation to push the button 272 for screen brightness adjustment.

In the case of the present embodiment, the smartphone 200 stores the relationship between the operators and motion in the memory 221 (see FIG. 3). The memory 221 may store the relationship between some of the operators provided to the image forming apparatus 100 and motion.

The relationship between images of the operators provided to the image forming apparatus 100 and motion recognized as operations may be stored in the image forming apparatus 100, and a process of specifying an operation target operator may be executed by the image forming apparatus 100.

In FIG. 7, the smartphone 200 is able to communicate with the image forming apparatus 100, and thus transmits a signal that instructs an operation of the button 272 for screen brightness adjustment to the image forming apparatus 100.

The smartphone 200 according to the present embodiment is prepared for a function of notifying the user of reception of an operation.

Therefore, in FIG. 7, the user is notified of reception of an operation by varying the manner of display of the button 272 for screen brightness adjustment.

Examples of the method of varying the manner of display include increasing the brightness of a region in which the button as the operation target is displayed, flashing the region, and varying the region to a different color.

The function of notifying the user of reception of an operation is not necessary.

Operation Example 2

Figure 8:
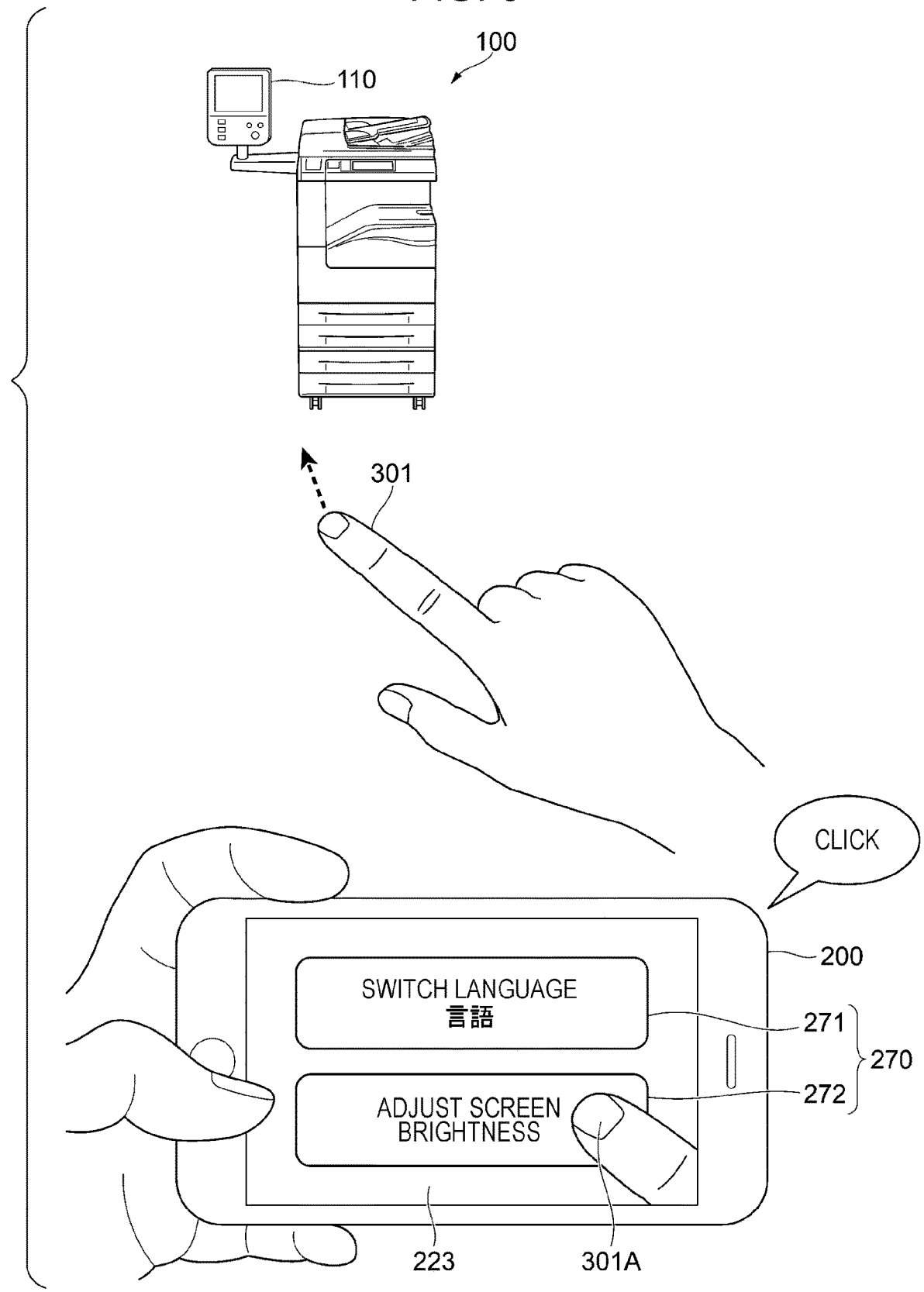
FIG. 8 illustrates a different method of notifying the user of reception of an operation.

FIG. 8 illustrates a different method of notifying the user of reception of an operation.

Portions in FIG. 8 corresponding to those in FIG. 7 are denoted by the corresponding reference numerals.

In the case of FIG. 8, a "click" sound is output from a speaker (not illustrated) although display of the button 272 for screen brightness adjustment is not varied.

A speech such as "Your operation has been received" may be generated in the notification method which uses a sound.

Operation Example 3

Figure 9:
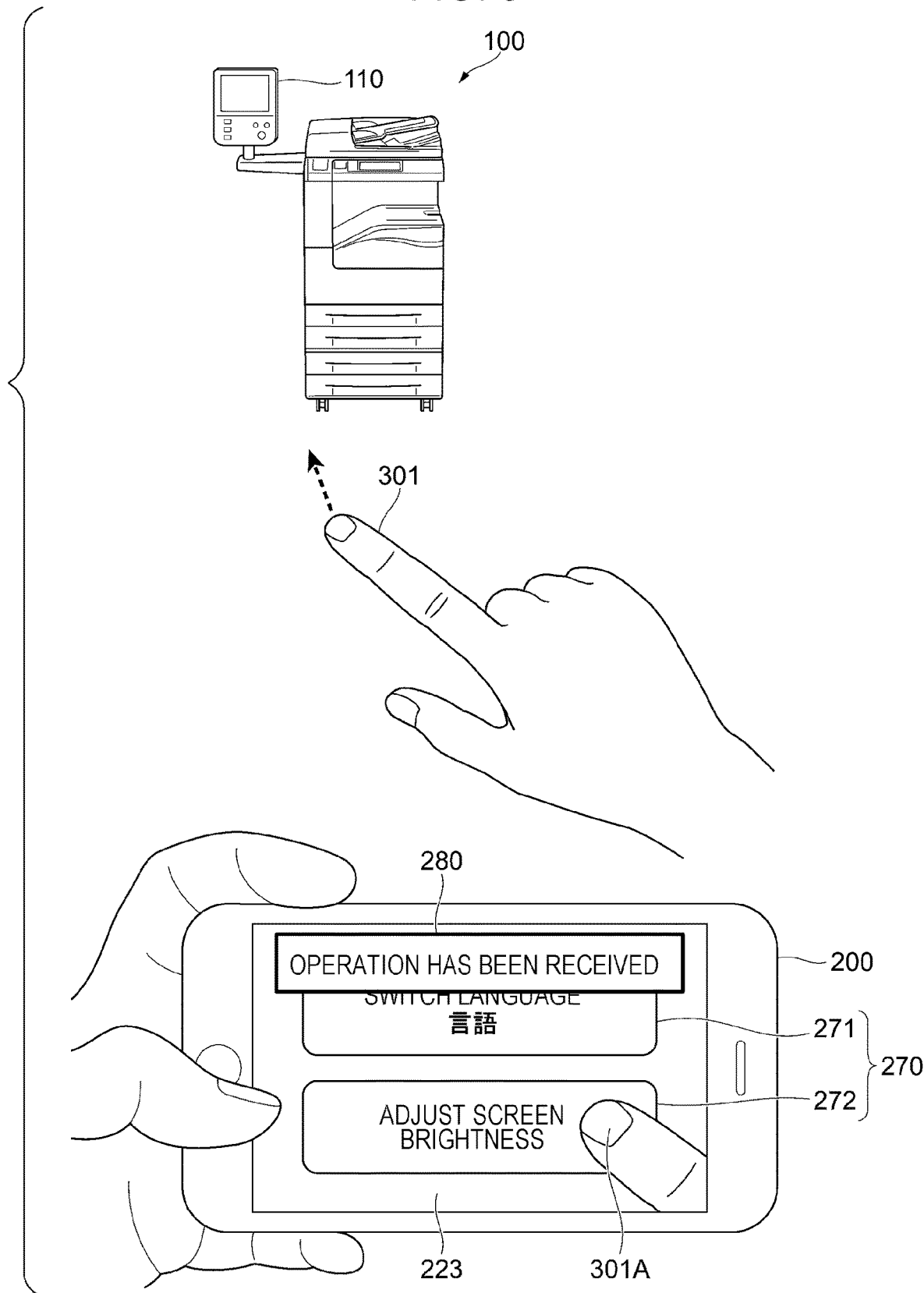
FIG. 9 illustrates a different method of notifying the user of reception of an operation.

FIG. 9 illustrates a different method of notifying the user of reception of an operation.

Portions in FIG. 9 corresponding to those in FIG. 7 are denoted by the corresponding reference numerals.

In the case of FIG. 9, a small screen 280 that indicates reception of an operation is additionally displayed although display of the button 272 for screen brightness adjustment is not varied.

A character string "Your operation has been received" is written in the screen 280 illustrated in FIG. 9. As a matter of course, this character string is exemplary.

Operation Example 4

Figure 10:
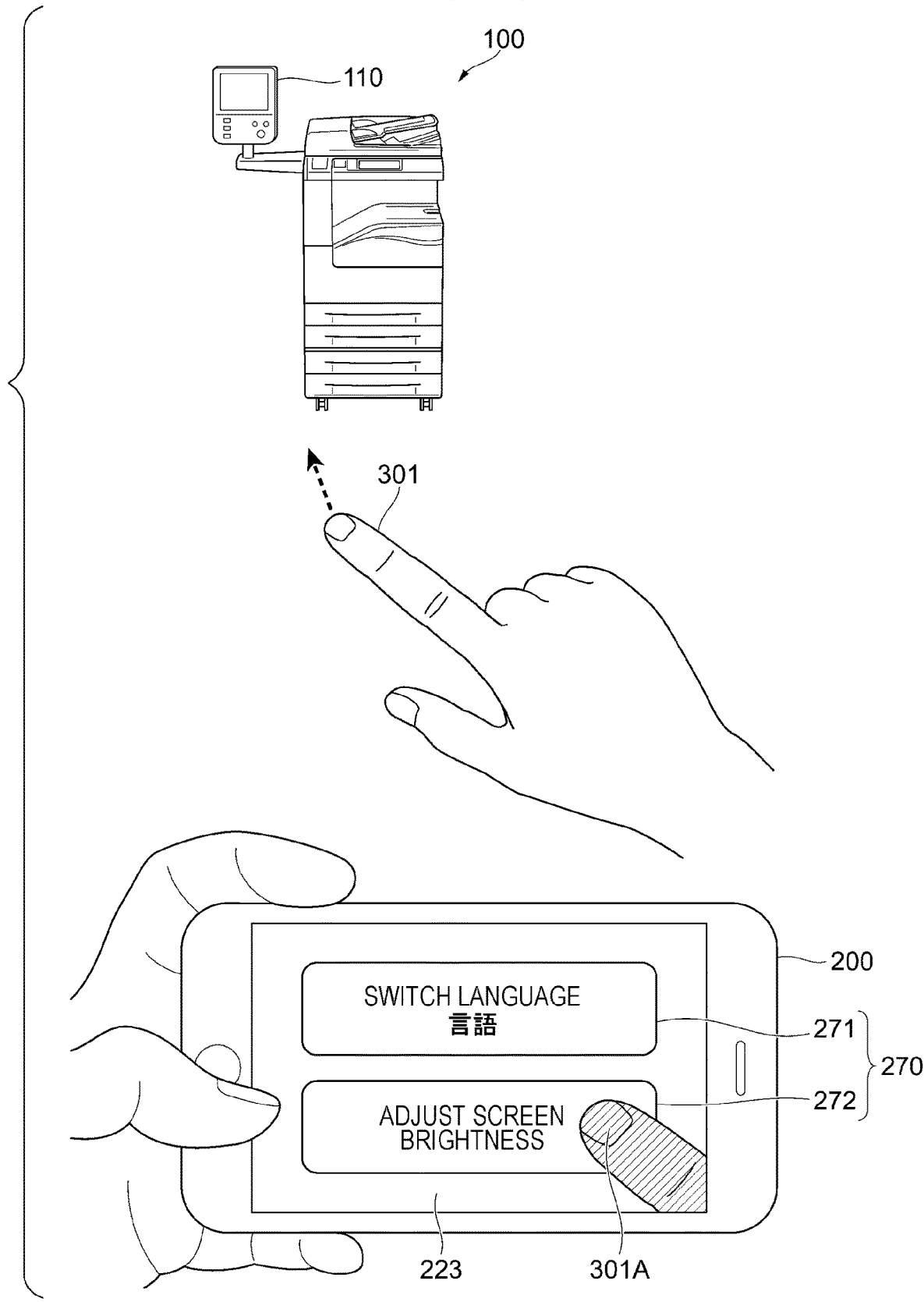
FIG. 10 illustrates a different method of notifying the user of reception of an operation.

FIG. 10 illustrates a different method of notifying the user of reception of an operation.

Portions in FIG. 10 corresponding to those in FIG. 7 are denoted by the corresponding reference numerals.

In the case of FIG. 10, the manner of display of the index finger image 301A has been varied from the manner before reception of an operation although display of the button 272 for screen brightness adjustment is not varied.

Examples of the method of varying the manner of display include increasing the brightness of a region in which the index finger image 301A is displayed, flashing the region, and varying the region to a different color.

Operation Example 5

Figure 11:
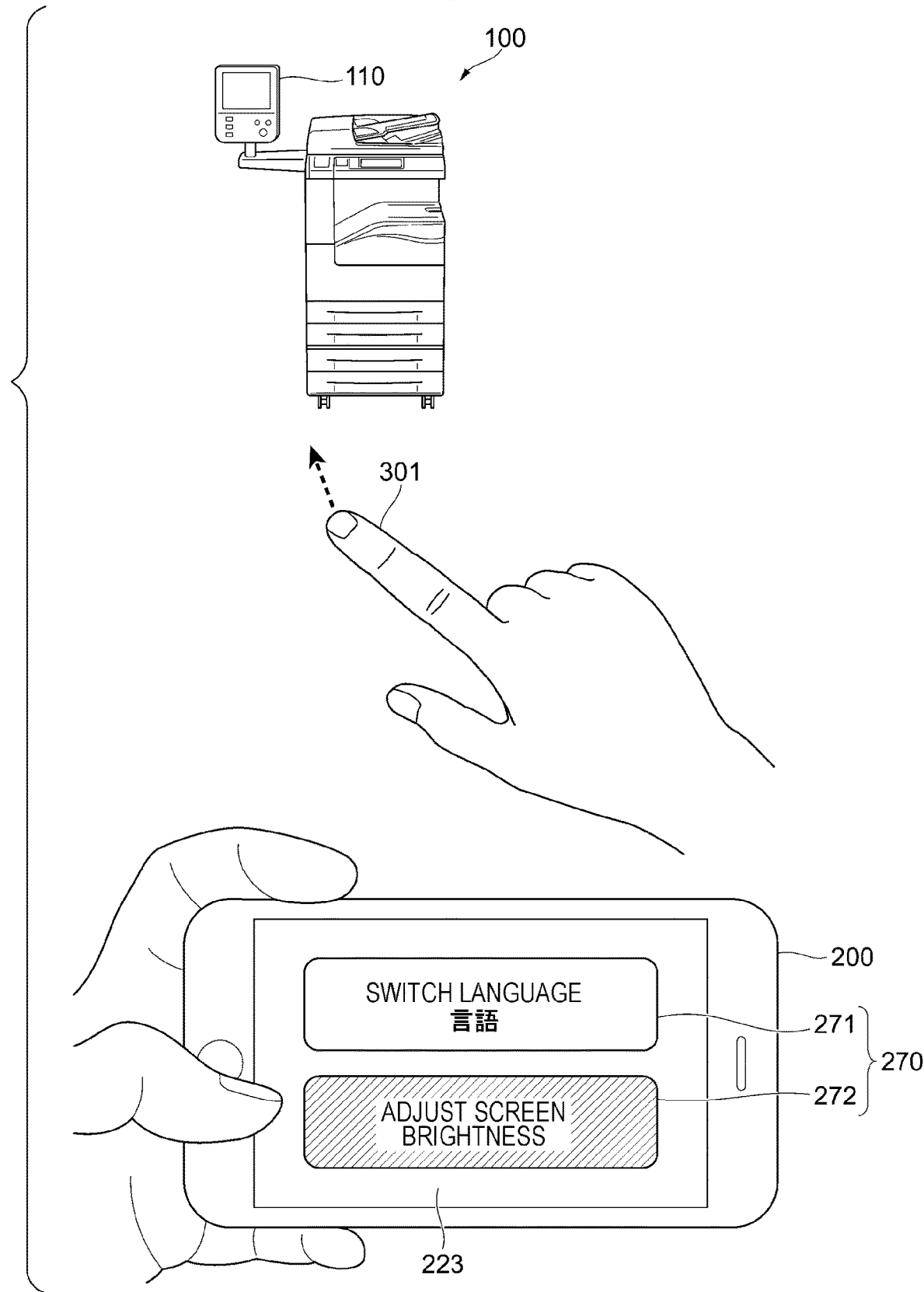
FIG. 11 illustrates a method in which an index finger image is not displayed on a liquid crystal display.

FIG. 11 illustrates a method in which the index finger image 301A (see FIG. 7) is not displayed on the liquid crystal display 223.

Portions in FIG. 11 corresponding to those in FIG. 7 are denoted by the corresponding reference numerals.

In the method in which a part of a human body that has entered the range of an image captured by the camera 225 (see FIG. 3) is always displayed, for example, a large portion of an operator may be hidden by the part of the human body. For example, characters written on the operator may be hidden by an image of a hand or an arm.

In such a case, the user may not be able to confirm the operation target operator on the screen, or may be able to confirm only a part thereof, which may hinder an operation.

If characters written on an operator may not be confirmed, the user may not be able to see what operator he/she is operating, and may perform an erroneous operation.

Thus, in FIG. 11, the index finger image 301A has been erased from the screen through image processing.

Operation Example 6

In the case of Operation Example 5 (see FIG. 11), meanwhile, the positional relationship between an operator and the index finger image 301A may not be easily seeable, or it may not be seeable whether or not an operation has been actually received, since the index finger image 301A is not displayed.

Figure 12:
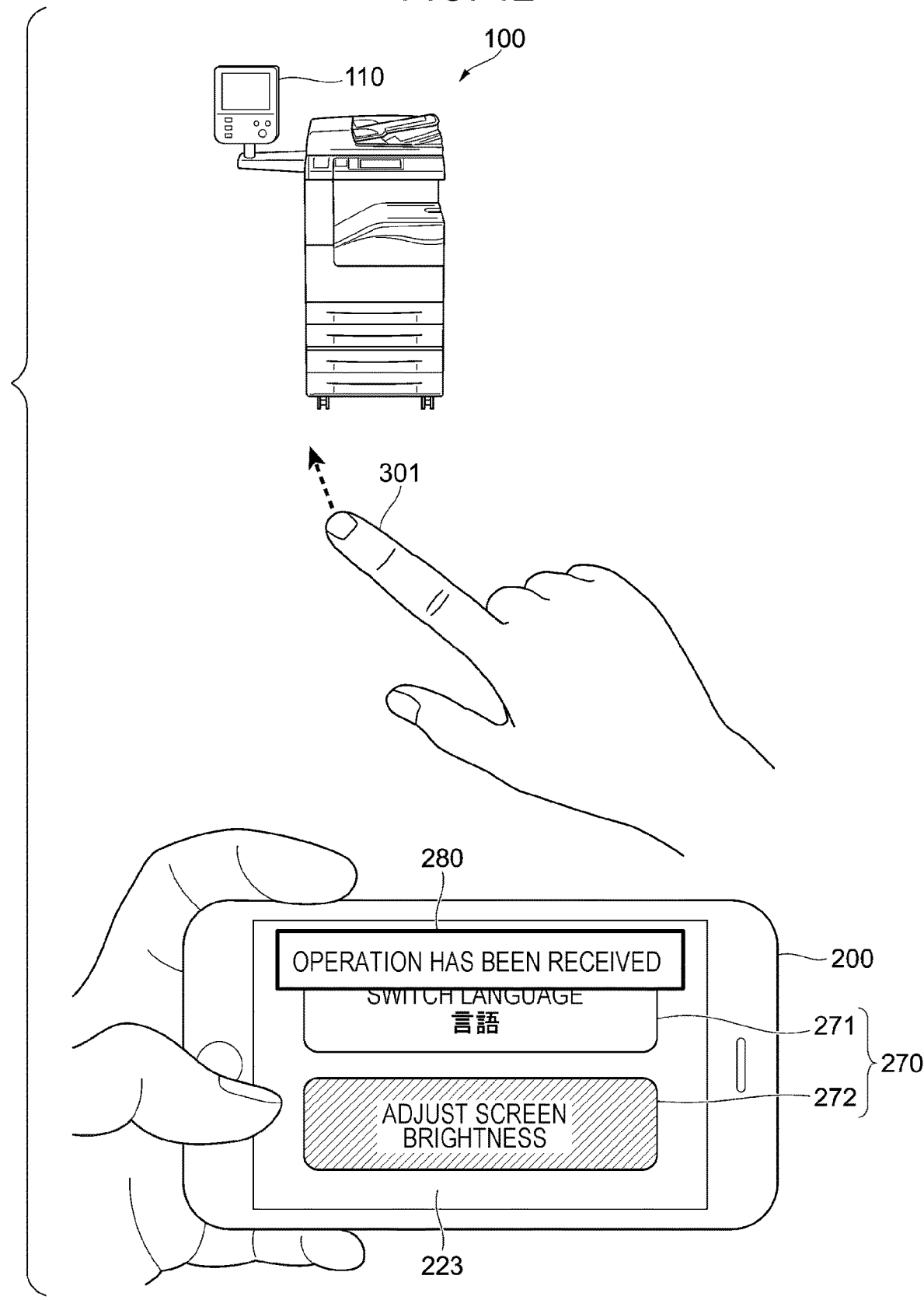
FIG. 12 illustrates a different method in which an index finger image is not displayed on the liquid crystal display.

FIG. 12 illustrates a different method in which the index finger image 301A (see FIG. 7) is not displayed on the liquid crystal display 223.

Portions in FIG. 12 corresponding to those in FIG. 11 are denoted by the corresponding reference numerals.

In FIG. 12, the manner of display of an operator (the button 272 for screen brightness adjustment) at a position actually superposed by the index finger image 301A is varied to assist confirmation by the user. In FIG. 12, in addition, the screen 280 with a character string indicating reception of an operation is also displayed.

Operation Example 7

Figure 13:
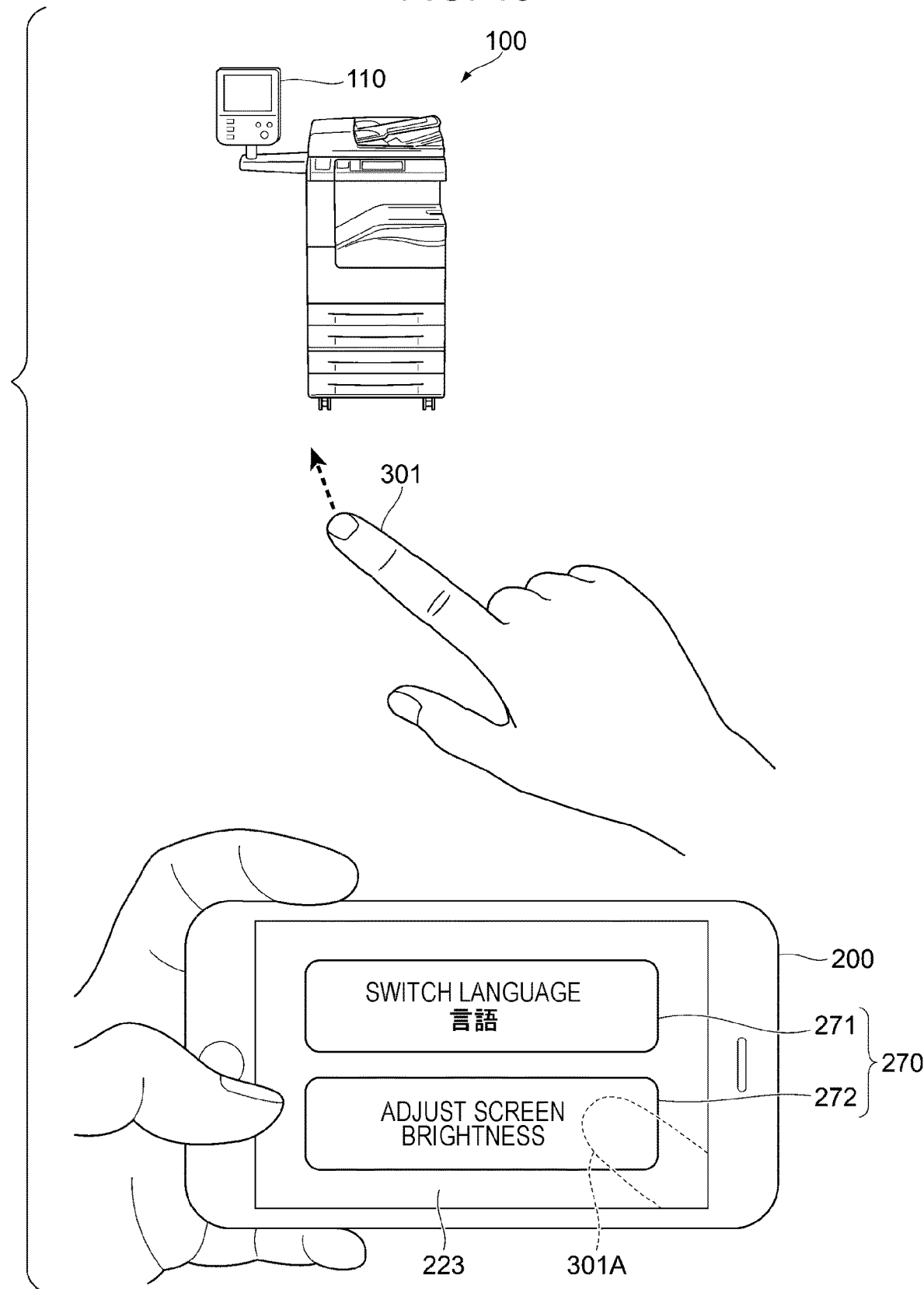
FIG. 13 illustrates a different method in which an index finger image is not displayed on the liquid crystal display.

FIG. 13 illustrates a different method in which the index finger image 301A (see FIG. 7) is not displayed on the liquid crystal display 223.

Portions in FIG. 13 corresponding to those in FIG. 11 are denoted by the corresponding reference numerals.

While the index finger image 301A is not displayed at all in Operation Example 6, it is also conceivable that there is a desire to confirm a position on the screen.

FIG. 13 illustrates a display method provided in consideration of such a desire, and illustrates the contour line of a region in which the index finger image 301A is positioned. The contour line is an example of the notation that suggests a portion of the body of the user.

In FIG. 13, the contour line of the index finger image 301A is indicated by the broken line. However, a transparent image obtained through image processing may be displayed in place of an actual image. The transparent image is also an example of the notation that suggests a portion of the body of the user.

Only a fingertip portion may be selectively displayed by a contour line or as a transparent image while other portions are displayed as an actual image. On the contrary, only a fingertip portion may be selectively displayed as an actual image.

Operation Example 8

Figure 14:
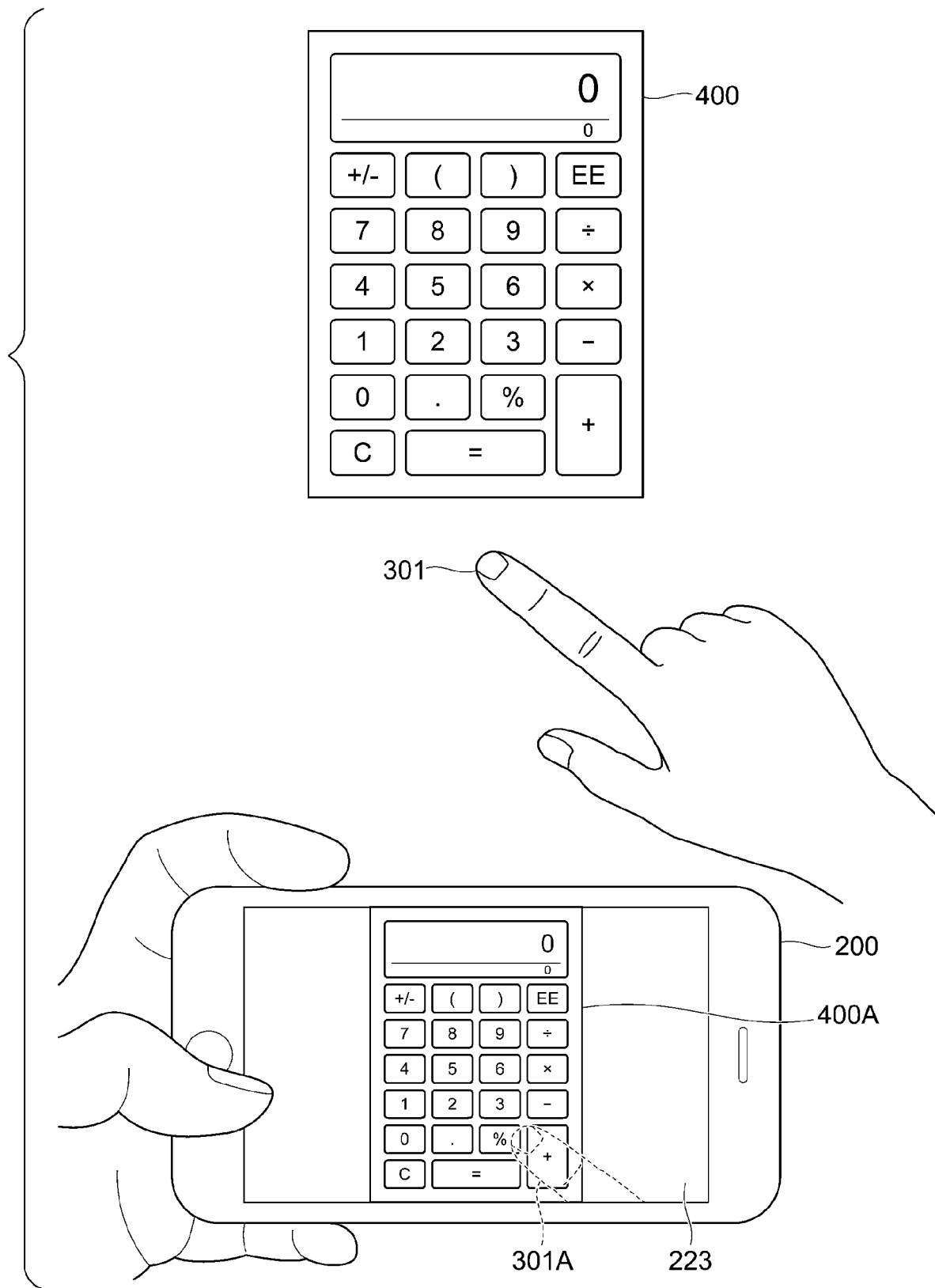
FIG. 14 illustrates a case where an operation target is a calculator that has a communication function.

FIG. 14 illustrates a case where the operation target is a calculator 400 that has a communication function.

In the case of FIG. 14, the user's index finger image 301A is displayed as a transparent image as superposed on a calculator image 400A. Unlike a contour line, a transparent image is displayed such that an actual image is seeable therethrough.

In the case where operators are small in dimensions such as those of the calculator 400, however, there remains a possibility of a push error.

Thus, the size of a part of the body displayed on the liquid crystal display 223 may be selectable. For example, the size of such a part of the body may be increased or reduced compared to the actual image. The size of such a part of the body may be adjustable stepwise.

Operation Example 9

Figure 15:
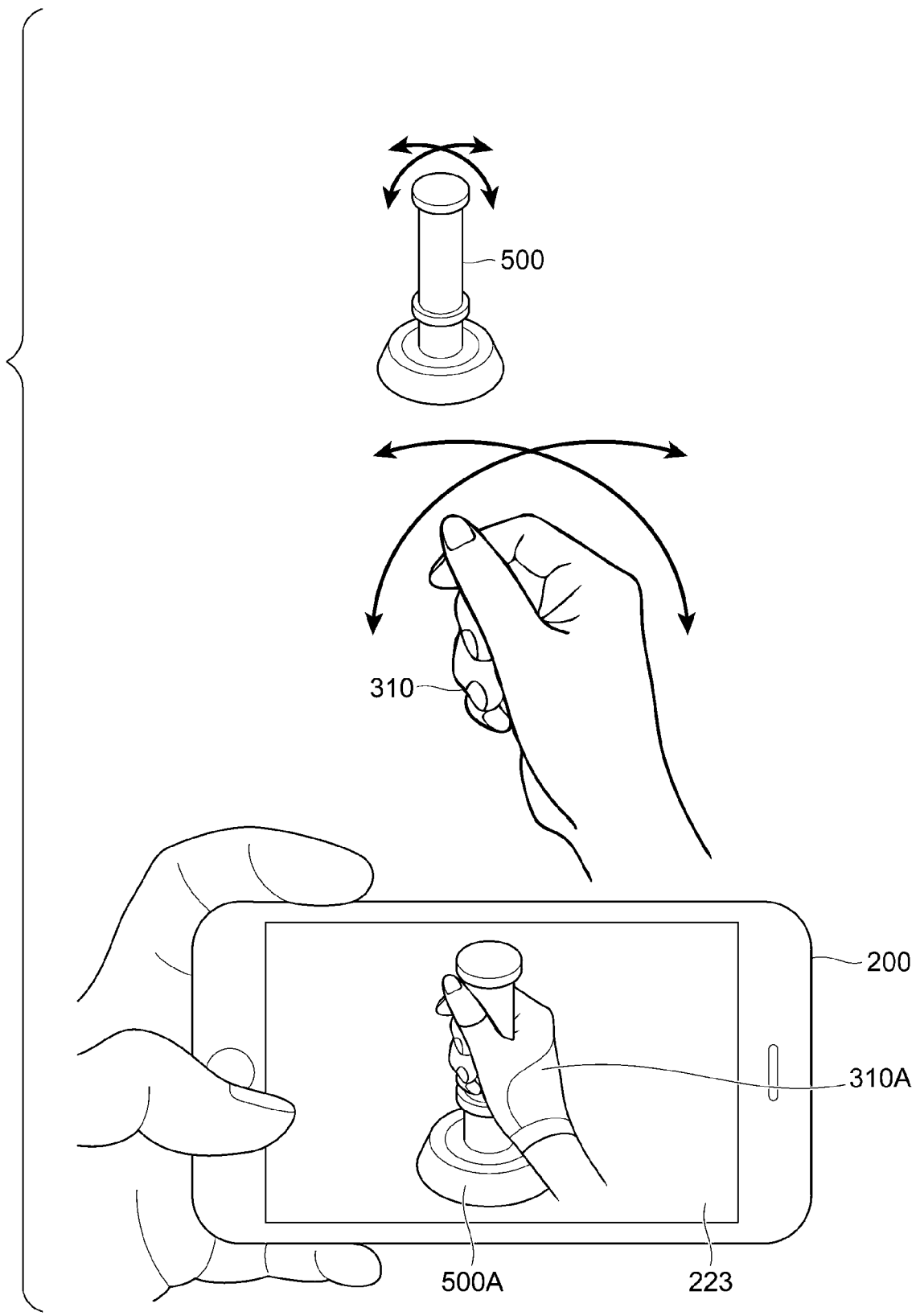
FIG. 15 illustrates a case where the operation target is a lever.

FIG. 15 illustrates a case where the operation target is a lever 500.

Examples of the lever 500 according to the present embodiment include a control column, a joystick, a shift lever, a blinker lever, a brake lever, and a vehicle controller.

In the case of FIG. 15, the operation target is the lever 500, and thus the user sticks out his/her right hand 310 in the air as if grasping something. In the case of this example, when the right hand 310 is moved back and forth and right and left, the lever 500 makes the same motion in accordance with an instruction from the smartphone 200 which detects the motion of the right hand 310.

The liquid crystal display 223 displays a right hand image 310A grasping a lever image 500A. The right hand image 310A may be displayed simply as superposed on the lever image 500A.

It is not necessary to move the lever 500 in conjunction with the right hand 310, and it is only necessary that the target to be controlled by the lever 500 should be controlled in accordance with the motion of the right hand 310.

This is because the lever 500 is an input device, not the final control target. Thus, communication between the lever 500 and the smartphone 200 is not necessary. It is only necessary that the smartphone 200 should be able to communicate with a device to be controlled in accordance with an operation of the lever 500, even if the smartphone 200 is not able to communicate with the lever 500.

The smartphone 200 according to this operation example is prepared for a function of decorating a part of the body of the user displayed on the liquid crystal display 223 in accordance with the attribute of the user or the environment of use.

For example, while a part of the body captured in an image by the camera 225 (see FIG. 3) is displayed as an actual image in the case of Operation Example 1 (see FIG. 6), a right hand image 310A wearing a thin glove is displayed in the example of FIG. 15. The glove is an example of the equipment.

The type of decoration to be used may be selected by the user in advance, or stored in the memory 221 (see FIG. 3) of the smartphone 200. Alternatively, a notification of the type of decoration to be used may be provided from the lever 500 (or a device that includes the lever 500), an external server, or the like.

Image data to be used for decoration may be stored in the memory 221 of the smartphone 200, or may be given from a device that includes the lever 500, an external server, or the like.

The shape and the size of the right hand image 310A displayed on the liquid crystal display 223 differs in accordance with the manner of image capture. Thus, the smartphone 200 also has a function of deforming an image for decoration in accordance with the shape or the size of the right hand image 310A.

In the case of the present embodiment, this function is implemented through execution of an application program by the smartphone 200. Image processing may be executed using a different computer such as a server provided externally to the smartphone 200 so that the result of the processing is reflected in the display on the liquid crystal display 223.

Figure 16:
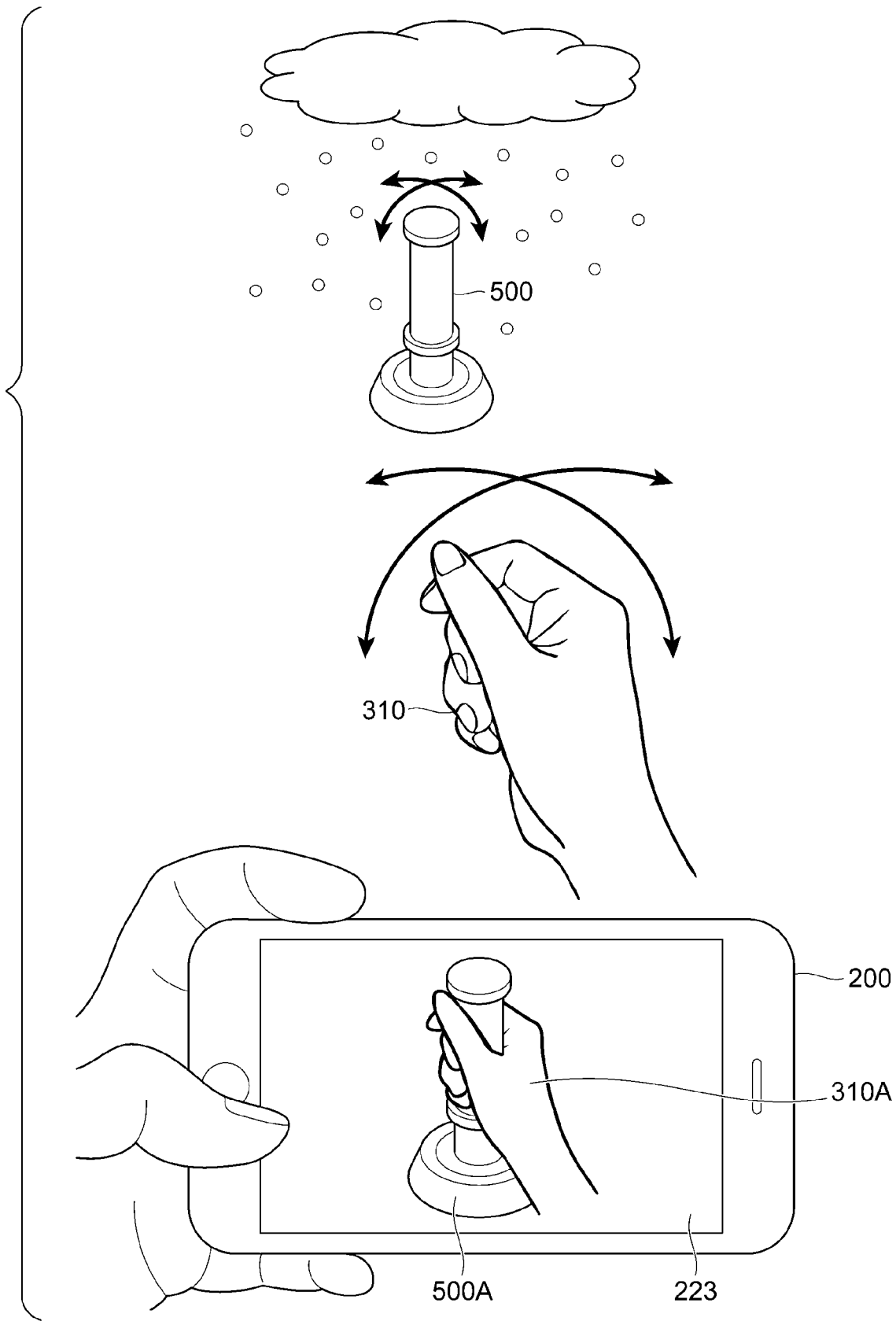
FIG. 16 illustrates a different example of the case where the operation target is a lever.

FIG. 16 illustrates a different example of the case where the operation target is the lever 500.

Portions in FIG. 16 corresponding to those in FIG. 15 are denoted by the corresponding reference numerals.

FIG. 16 assumes a case where the lever 500 is operated outdoors in winter. Therefore, in the case of FIG. 16, a thick glove is added as a decoration to the right hand image 310A.

Operation Example 10

Figure 17:
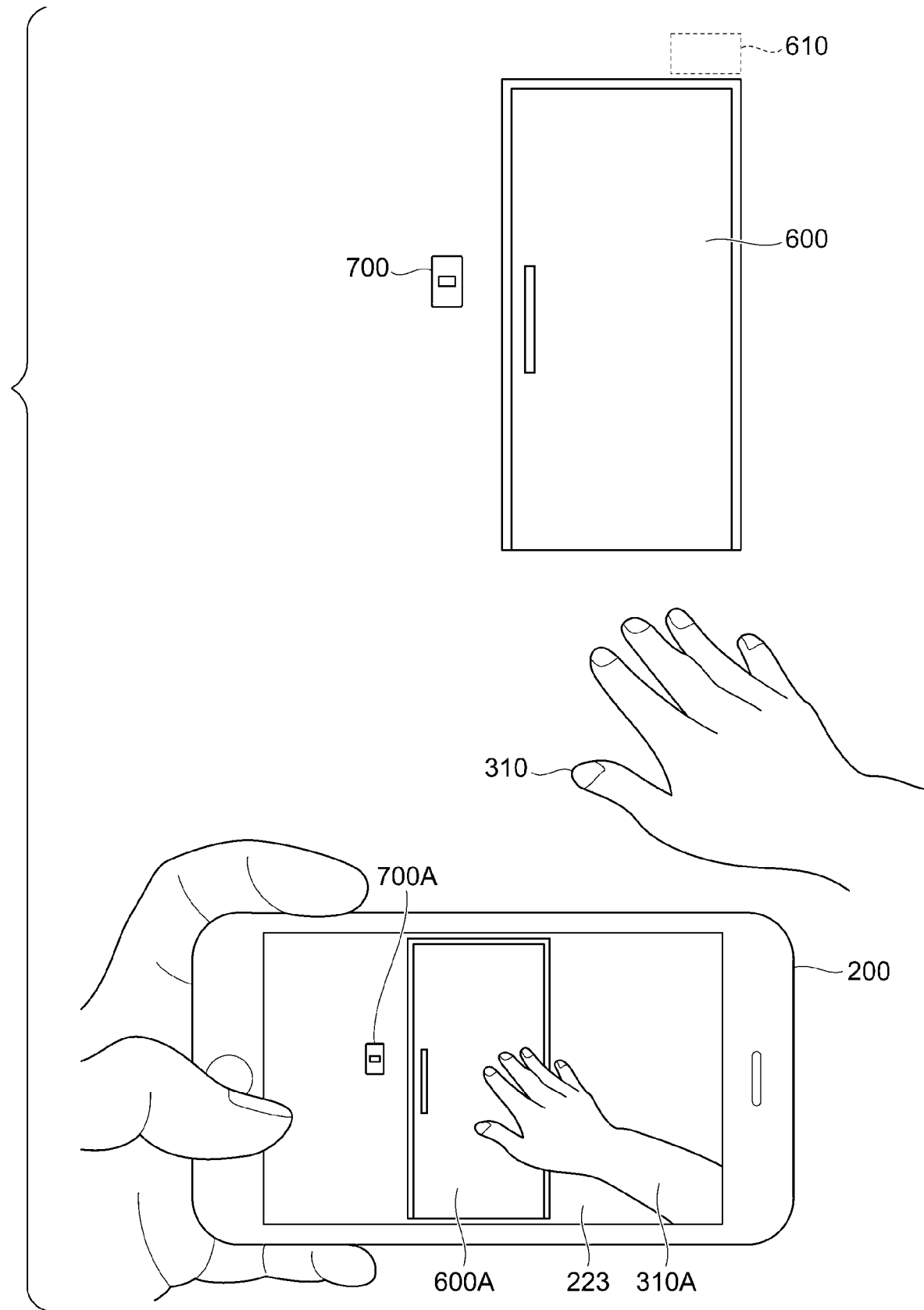
FIG. 17 illustrates a case where the operation target is a single-swing door that opens and closes about a hinged portion.

FIG. 17 illustrates a case where the operation target is a single-swing door 600 that opens and closes about a hinged portion.

The single-swing door 600 includes a mechanism 610 that electrically opens and closes the single-swing door 600. The mechanism 610 is attached to a wall surface provided with a doorway. The mechanism 610 is capable of directly or indirectly communicating with the smartphone 200 through a wireless LAN or the like.

A switch 700 that is used to turn on and off a lighting fixture (not illustrated) is attached to the wall surface near the doorway.

Therefore, a single-swing door image 600A and a switch image 700A are displayed on the liquid crystal display 223 of the smartphone 200.

The right hand 310 of the user is positioned on a line that connects between the single-swing door 600 and the smartphone 200 which are present in the real space. The right hand 310 is not in contact with the single-swing door 600.

Therefore, the right hand image 310A is displayed on the liquid crystal display 223 as superposed on the single-swing door image 600A. In the case of FIG. 17, the right hand image 310A is an actual image.

The single-swing door 600 illustrated in FIG. 17 opens toward the farther side when pushed, and closes when pulled toward the closer side.

Figure 18:
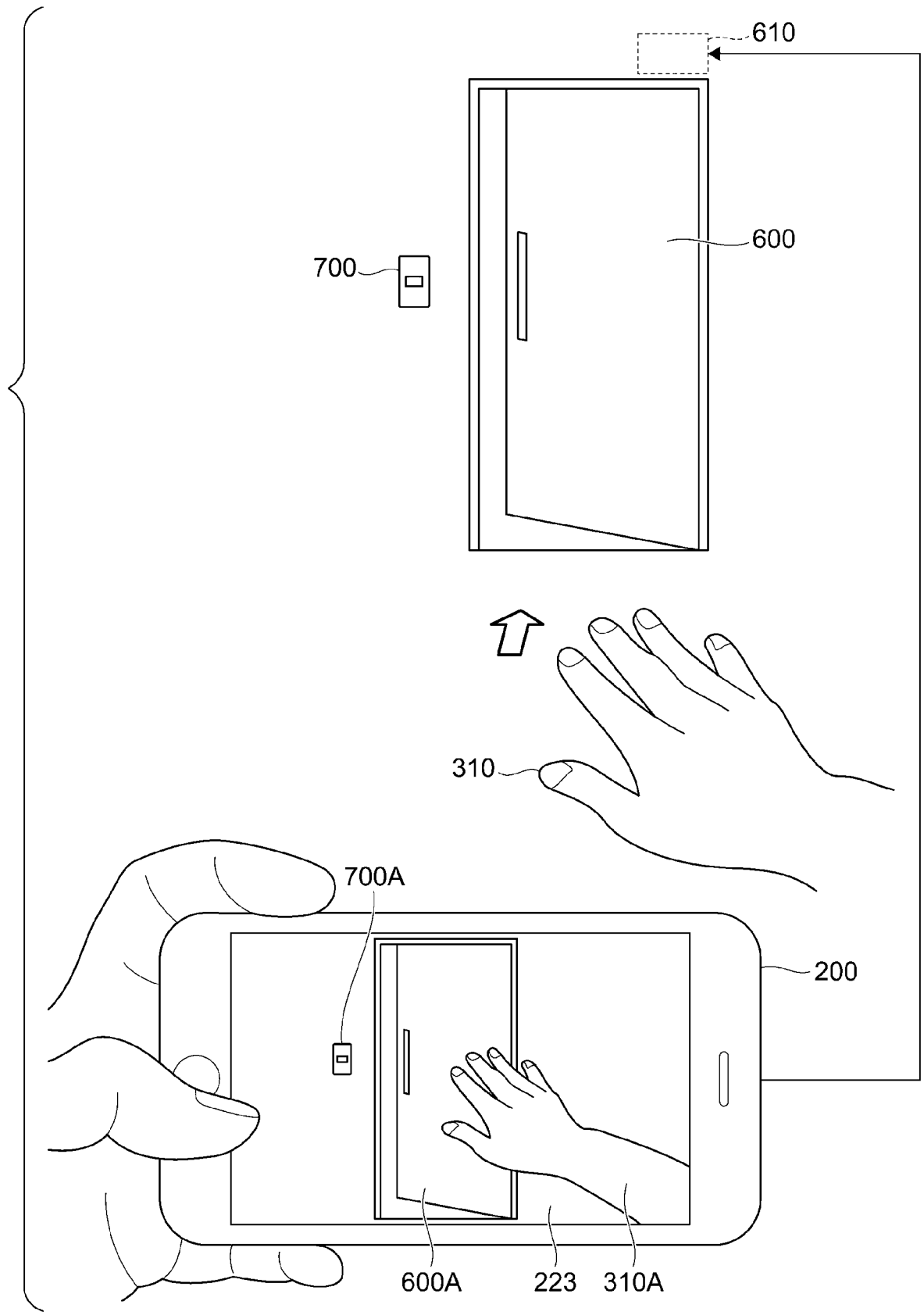
FIG. 18 illustrates a state in which the single-swing door is slightly opened by capturing an image in which the user makes motion to push out his/her right hand in the air using the smartphone.

FIG. 18 illustrates a state in which the single-swing door 600 is slightly opened by capturing an image in which the user makes motion to push out his/her right hand 310 in the air using the smartphone 200.

In FIG. 18, the direction of motion of the right hand 310 is indicated by an arrow. This motion of the right hand 310 is detected by the smartphone 200 as an operation to open the single-swing door 600. The smartphone 200 transmits a signal that instructs execution of the detected operation to the mechanism 610.

In this event, the smartphone 200 may transmit the speed of motion of the right hand 310 detected on an image to the mechanism 610. In this case, the mechanism 610 is able to reflect the given speed in the speed at which the mechanism 610 opens the single-swing door 600.

Figure 19:
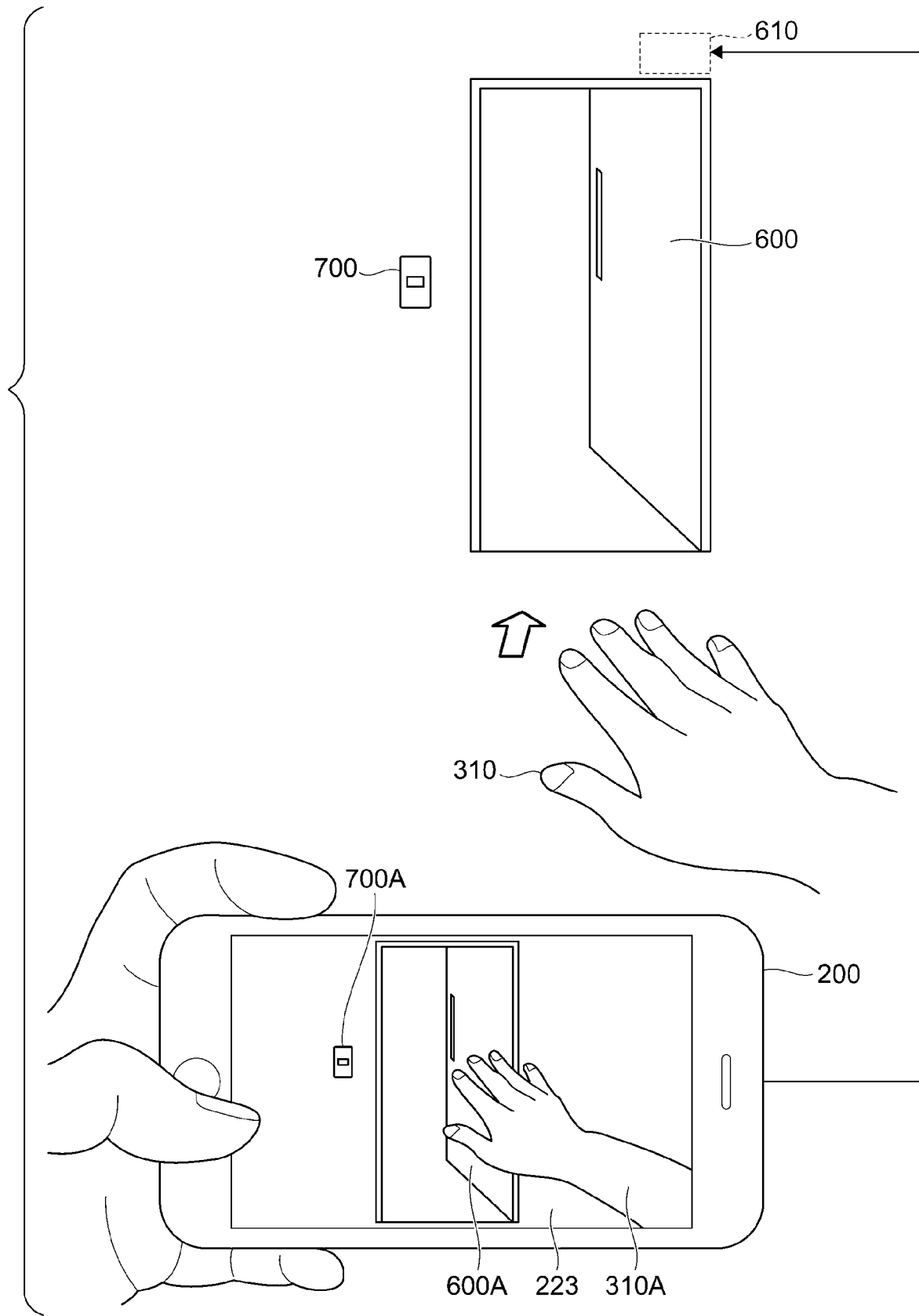
FIG. 19 illustrates a state in which the single-swing door is greatly opened by capturing an image in which the user makes motion to push out his/her right hand in the air using the smartphone.

FIG. 19 illustrates a state in which the single-swing door 600 is greatly opened by capturing an image in which the user makes motion to push out his/her right hand 310 in the air using the smartphone 200.

In FIG. 19, motion of the right hand 310 is continued, and drive by the mechanism 610 is also continued.

Control may be performed such that, after operation to open the single-swing door 600 is detected, drive of the single-swing door 600 is continued even if motion of the right hand 310 is stopped. This is because the range in which the right hand 310 is movable during image capture by the smartphone 200 is narrower than the range in which the single-swing door 600 as the drive target is movable. This control may be implemented as a function of the smartphone 200, or may be implemented as a function of the mechanism 610.

In the case where motion to pull the right hand 310 toward the closer side is detected, the smartphone 200 detects the motion as an operation to close the single-swing door 600.

Figure 20:
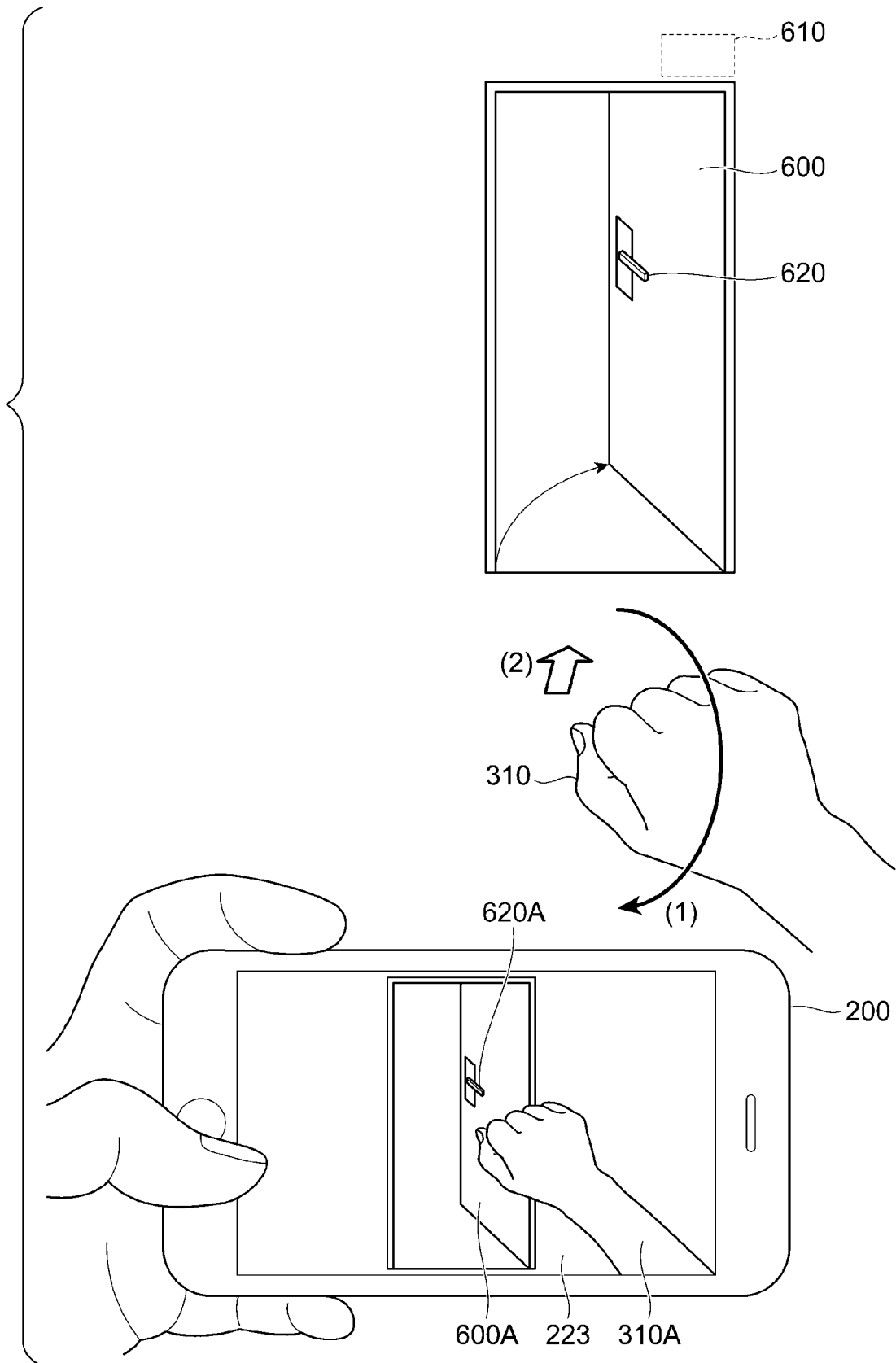
FIG. 20 illustrates a case where the single-swing door is provided with a lever-type handle.

FIG. 20 illustrates a case where the single-swing door 600 is provided with a lever-type handle (lever handle) 620.

In order to open such a single-swing door 600, it is necessary to make pushing motion after grasping and rotating the lever-type handle 620.

In FIG. 20, the right hand image 310A is displayed as superposed on the single-swing door image 600A and a handle image 620A.

The smartphone 200 illustrated in FIG. 20 detects an operation to open the single-swing door 600 in the case where such motions in two stages are detected sequentially. Operation after the detection is the same as that described in relation to FIGS. 18 and 19.

In FIGS. 17 to 20, the single-swing door 600 is illustrated as an example. However, the present invention is not limited to a swinging door that opens and closes with a door surface drawing an arc, and may also be applied to a sliding door guided by a groove or a rail to open and close linearly, a glide sliding door obtained by combining a swinging door and a sliding door, a folding door, a revolving door, etc.

The door is not limited to a single-swing door, and may be a double-swing door.

Operation Example 11

Figure 21:
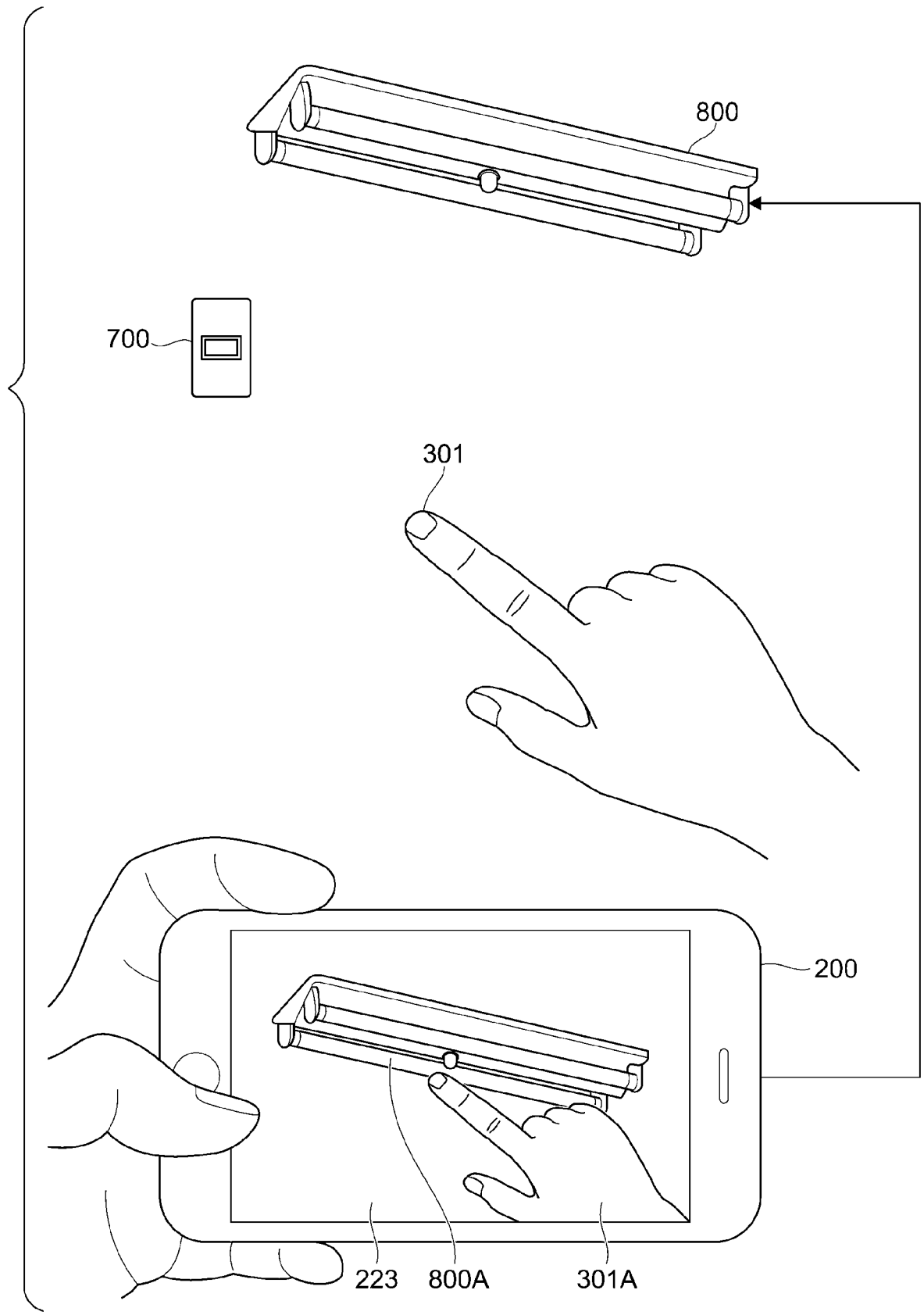
FIG. 21 illustrates a case where an image capture target is a lighting fixture.

FIG. 21 illustrates a case where an image capture target is a lighting fixture 800.

The lighting fixture 800 illustrated in FIG. 21 is electrically connected to the switch 700 of a position holding type through a wire (not illustrated). The lighting fixture 800 is turned on when the switch 700 is operated on. The lighting fixture 800 is turned off when the switch 700 is operated off.

In the case of FIG. 21, the lighting fixture 800 is provided with a function of receiving operation to push out the index finger 301 in the air with the lighting fixture 800 turned off as an operation to turn on, and receiving operation to push out the index finger 301 in the air with the lighting fixture 800 turned on as an operation to turn off.

Thus, when motion to push out the index finger 301 in the air is made with the index finger image 301A superposed on a lighting fixture image 800A displayed on the liquid crystal display 223 of the smartphone 200, a signal that switches the state is output from the smartphone 200 which has detected such motion to the lighting fixture 800. Specifically, a signal that instructs turn-off is output when the lighting fixture 800 is turned on, and a signal that instructs turn-on is output when the lighting fixture 800 is turned off.

Switching of the state of the lighting fixture 800 is not limited to two stages. For example, when the lighting fixture 800 is turned on, switching may be made among states in which the brightness differs in several stages through motion of the user. In the case where the color of illumination light from the lighting fixture 800 is switchable, the color may be switched through motion of the user.

In the earlier description, motion to push out the index finger 301 in the air is detected as an operation. However, motion with one finger and motion with two fingers may be detected as an operation for turn-on and an operation for turn-off, respectively, and motion to hold up a finger and motion to keep a finger horizontal may be detected as an operation for turn-on and an operation for turn-off, respectively. That is, the number of fingers or the direction of a finger in an image captured by the camera 225 (see FIG. 3) may be associated with a particular operation.

In any way, the state of operation of the lighting fixture 800 may be operated without directly contacting the lighting fixture 800.

Figure 22:
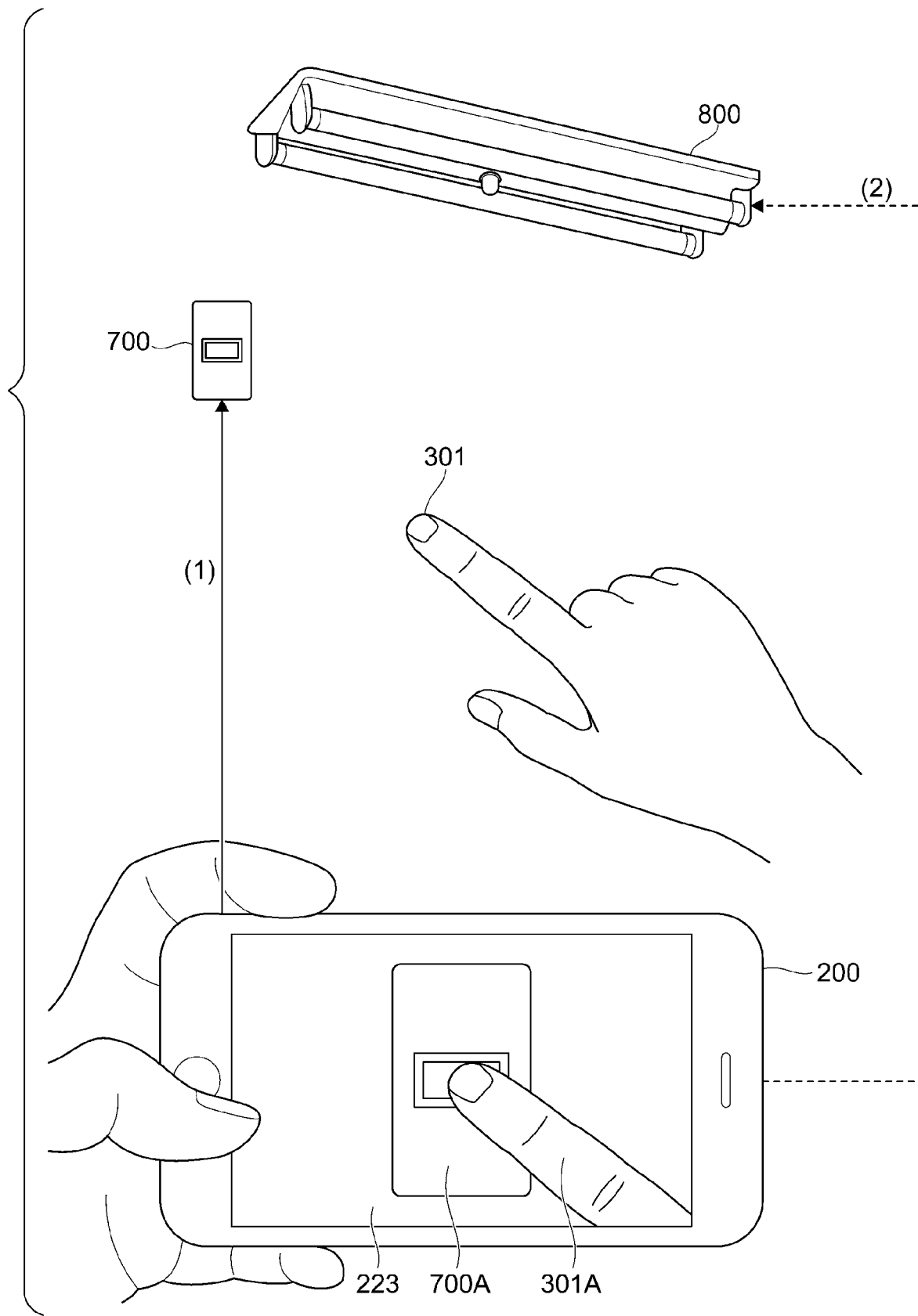
FIG. 22 illustrates a case where the image capture target is a switch that is used to turn on the lighting fixture.

FIG. 22 illustrates a case where the image capture target is the switch 700 that is used to turn on the lighting fixture 800.

Portions in FIG. 22 corresponding to those in FIG. 21 are given the corresponding reference numerals.

As discussed earlier, the lighting fixture 800 is turned on by an operation to turn on the switch 700, and turned off by an operation to turn off the switch 700.

FIG. 22 differs from FIG. 21 in that only the tip of the index finger is selectively displayed as the image 301A while other portions are not displayed.

In the case where the switch 700 has a function of communicating with the smartphone 200, the smartphone 200 outputs a signal that switches on and off the switch 700 when there is an operation to push out the index finger 301 in the air with the index finger image 301A superposed on the switch image 700A.

In some cases, the switch 700 does not have a function of communicating with the smartphone 200. Also in this case, if the relationship between the switch 700 and the lighting fixture 800 has been given to the smartphone 200, motion to push out the index finger 301 in the air with the index finger image 301A superposed on the switch image 700A may be received as an operation on the lighting fixture 800.

The control target may alternatively be an air-conditioner, an audio device, a home electric appliance, or the like.

Operation Example 12

In the operation example discussed earlier, the smartphone 200 captures an image of an object that is present in the real space. However, the image capture target may be an image of an object that actually exists.

Figure 23:
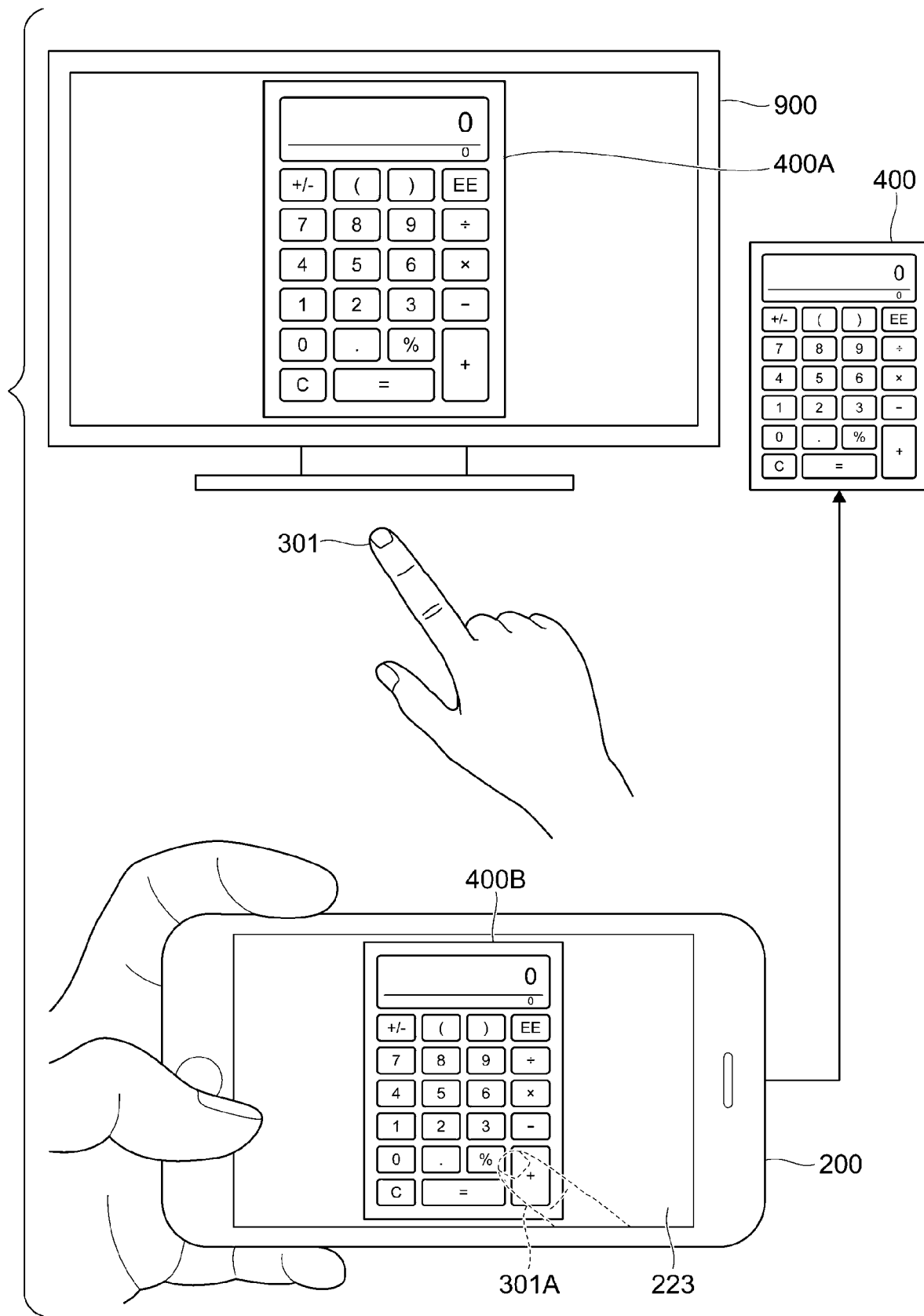
FIG. 23 illustrates a case where the image capture target is a calculator image displayed on a display device.

FIG. 23 illustrates a case where the image capture target is the calculator image 400A displayed on a display device 900.

Portions in FIG. 23 corresponding to those in FIG. 14 are denoted by the corresponding reference numerals.

The display device 900 is a television receiver or a monitor, for example. The calculator image 400A is an image reproduced from image data obtained by capturing an image of the calculator 400 that actually exists.

A calculator image 400B obtained by capturing an image of the display device 900 and the index finger image 301A are displayed on the liquid crystal display 223 of the smartphone 200. As a matter of course, the index finger 301 is not in contact with the display device 900.

This operation example is the same as Operation Example 8 described with reference to FIG. 14 except that the target of image capture by the smartphone 200 differs from the calculator 400 that actually exists as the operation target.

Also in this case, it is possible to operate the calculator 400 in the same manner as in Operation Example 8 if the calculator 400 as the operation target is specified in advance from a list of devices being connected with the smartphone 200 through a wireless LAN or the like.

The smartphone 200 is able to detect that the image capture target is a calculator through a technique of recognizing an image, even if the relationship between the calculator image 400A and the calculator 400 that actually exists is unknown. In this case, the smartphone 200 may designate the calculator 400 which actually exists and is communicable therewith to instruct execution of an operation corresponding to motion of the user.

It should be noted, however, that the calculator 400 which is communicable may not be operated through capturing an image of a gesture in the case where the calculator 400 is not prepared for an operation detected by the smartphone 200.

Operation Example 13

The operation example discussed earlier assumes a case where the operation target object (or an image thereof) and a part of the body of the user are captured in an image at the same time by the camera 225 (see FIG. 3) provided to the smartphone 200. However, the operation target object may not be captured in an image.

Figure 24:
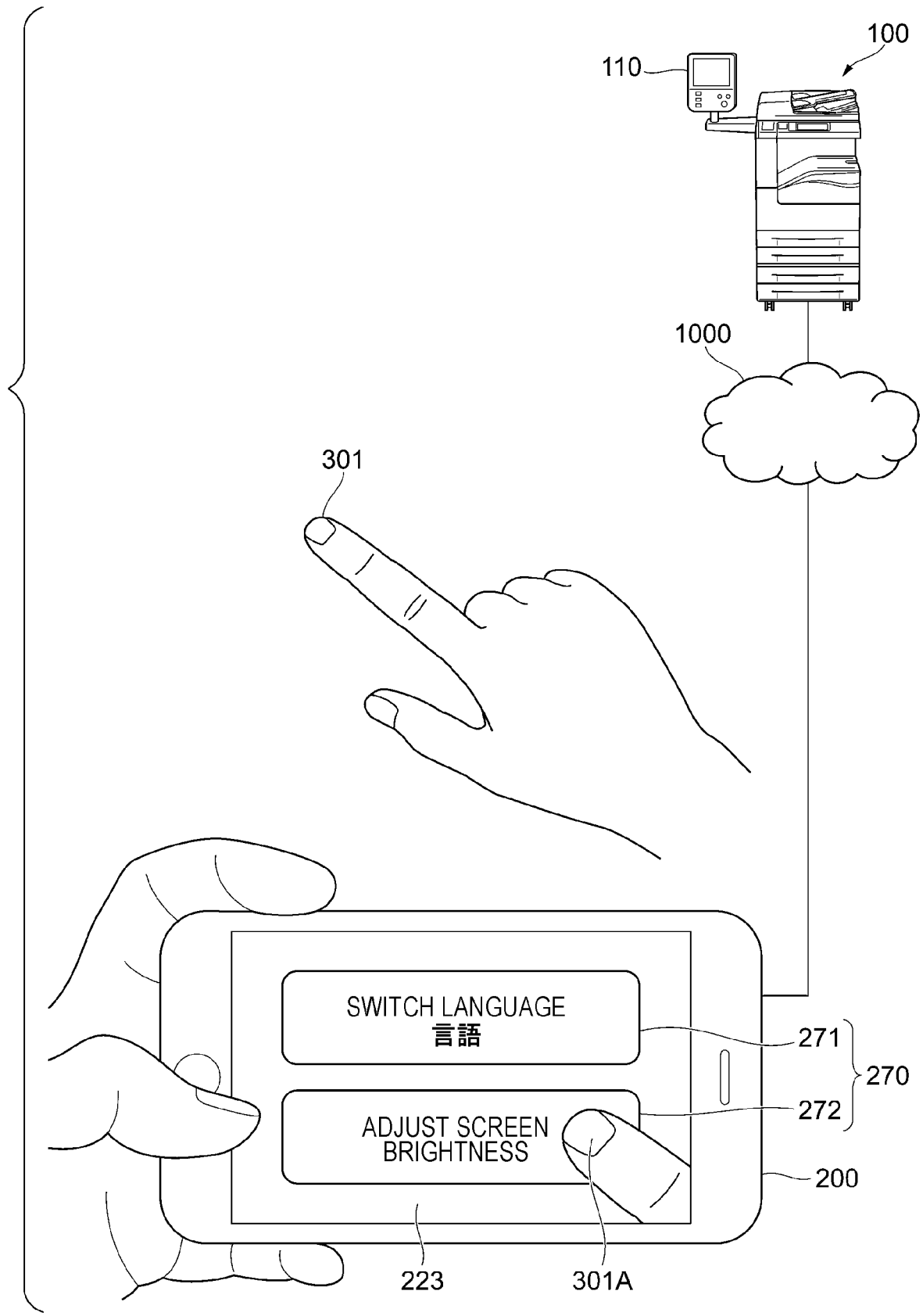
FIG. 24 illustrates a case where motion of the user captured in an image using the smartphone is associated with an operation of an operator displayed on a screen.

FIG. 24 illustrates a case where motion of the user captured in an image using the smartphone 200 is associated with an operation of an operator displayed on a screen.

Portions in FIG. 24 corresponding to those in FIG. 6 are denoted by the corresponding reference numerals.

In the case of FIG. 24, the image forming apparatus 100 as the operation target is connected so as to be communicable with the smartphone 200 via a network 1000 such as the Internet or a LAN.

In the case of FIG. 24, the liquid crystal display 223 displays an image 270 (a button 271 for language switching and a button 272 for screen brightness adjustment) obtained by capturing an image of a portion of the user interface section 110.

The liquid crystal display 223 displays an image synthesized from the index finger image 301A captured by the camera 225 and the image 270 although the image forming apparatus 100 is not present in front of the smartphone 200.

The smartphone 200 performs image processing to generate the synthesized image. When the smartphone 200 receives motion of the index finger 301 as an operation, the smartphone 200 transmits a signal that instructs execution of the operation to the corresponding image forming apparatus 100.

Second Exemplary Embodiment

In the case of the first exemplary embodiment discussed earlier, a gesture by the user is captured in an image using the smartphone 200 (see FIG. 1), and used to operate the image forming apparatus 100 (see FIG. 1) that actually exists. However, a gesture by the user is not limited to being captured in an image by the smartphone 200.

Figure 25:
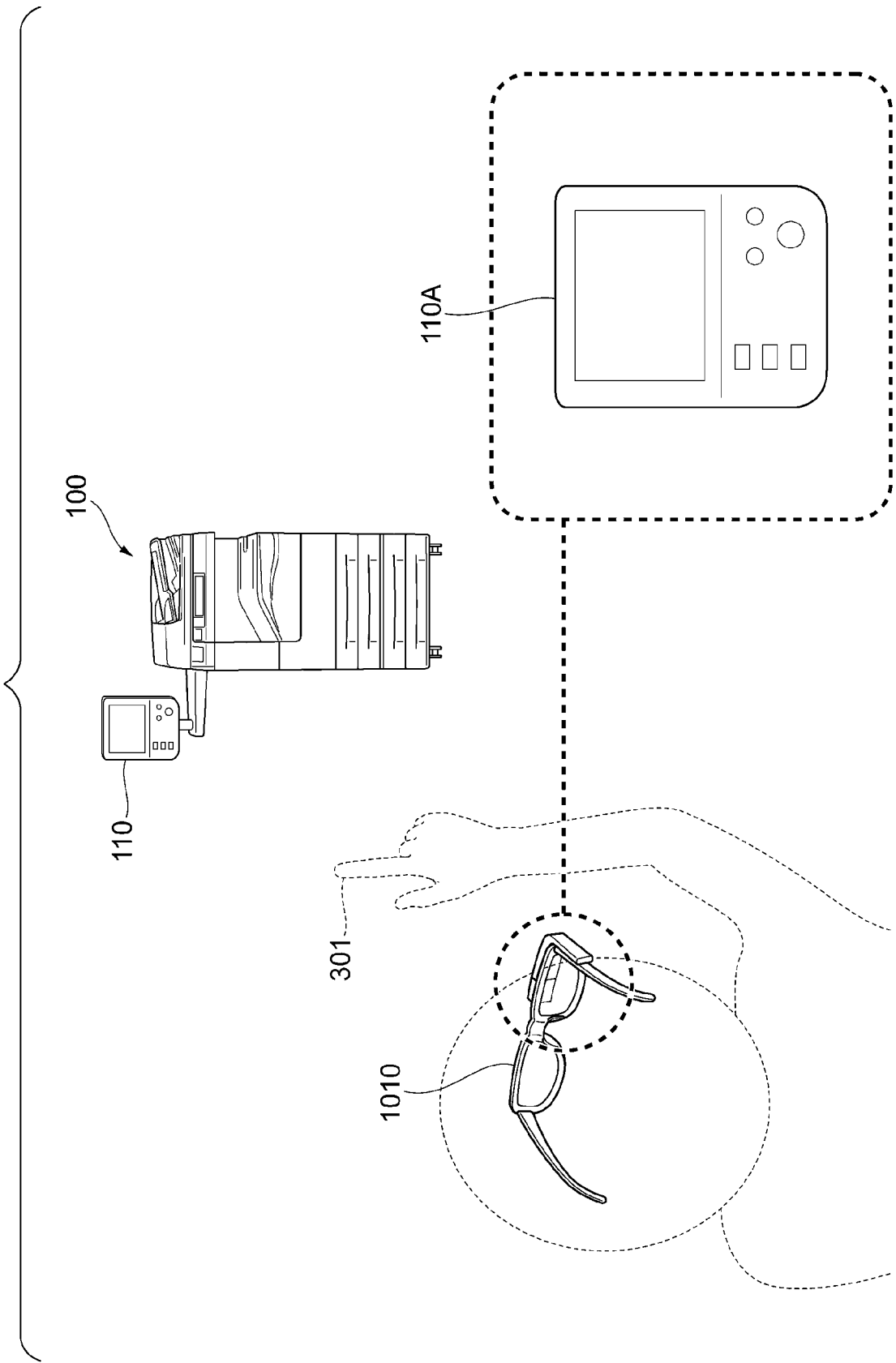
FIG. 25 illustrates an example of a system according to a second exemplary embodiment.

FIG. 25 illustrates an example of a system according to a second exemplary embodiment.

Portions in FIG. 25 corresponding to those in FIG. 1 are denoted by the corresponding reference numerals.

In the case of FIG. 25, the user wears a glass-type terminal 1010. The hardware configuration (see FIG. 3) and the software configuration (see FIG. 4) of the glass-type terminal 1010 are the same as those of the smartphone 200. It should be noted, however, that the touch pad 226 (see FIG. 3) is not attached to the glass-type terminal 1010.

The user in FIG. 25 is seeing a user interface section image 110A.

Third Exemplary Embodiment

A physical operation and an operation by a gesture are not differentiated from each other for the operation target devices (e.g. image processing apparatus, calculator, lever, door, and lighting fixture) according to the exemplary embodiment discussed earlier.

A device that receives only an operation by a gesture will be described in relation to the third exemplary embodiment.

Figure 26:
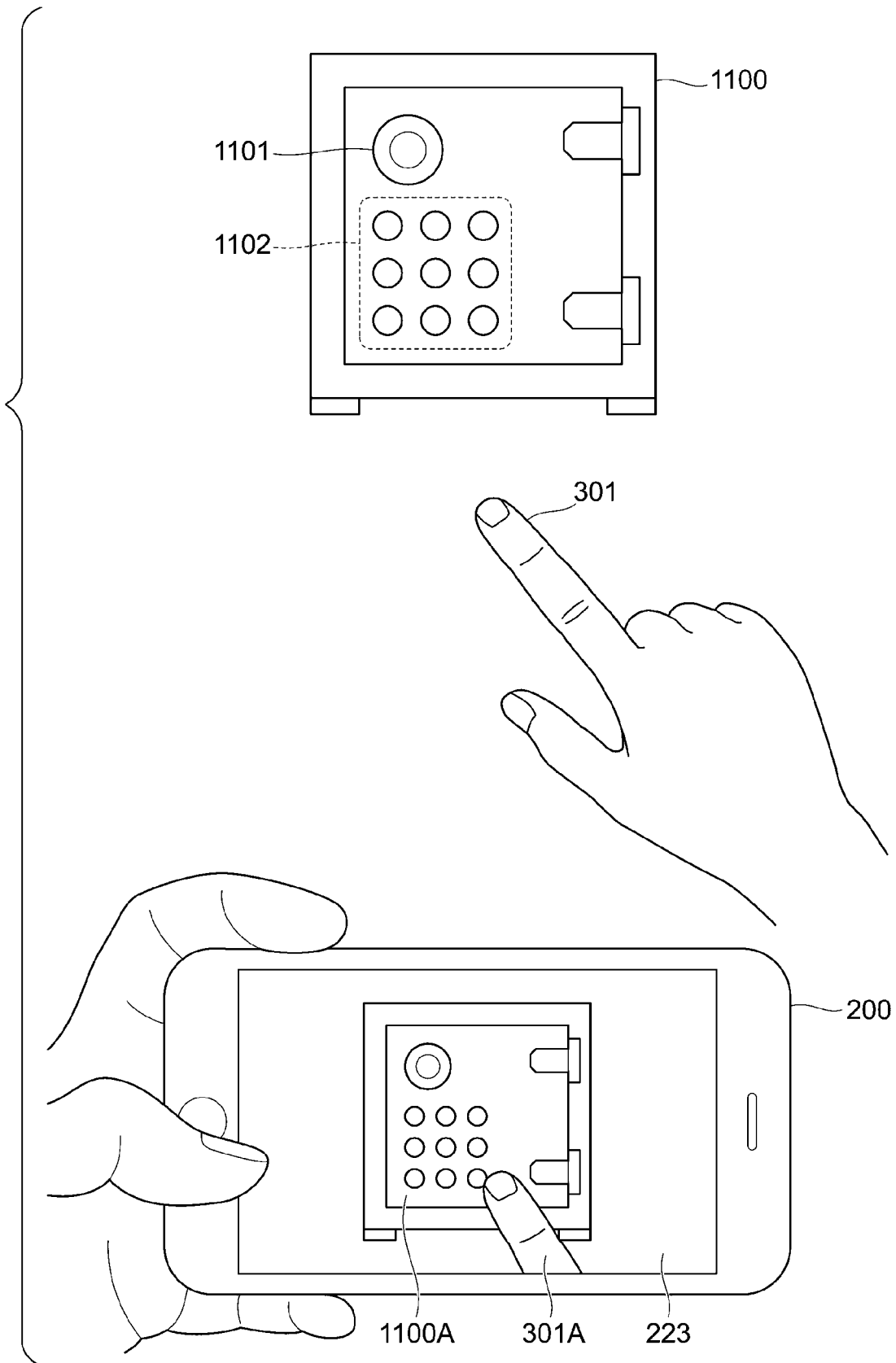
FIG. 26 illustrates a case where a safe is captured in an image as the operation target.

FIG. 26 illustrates a case where a safe 1100 is captured in an image as the operation target.

The safe 1100 illustrated in FIG. 26 has a function of being unlocked on condition that a cylinder 1101 or push buttons 1102 disposed on the front surface thereof are physically operated correctly, and a function of disabling a physical operation on the cylinder 1101 and the push buttons 1102.

In the case where a physical operation is disabled, the safe 1100 is unlocked in the case where a signal corresponding to an operation of the push buttons 1102 is received from the smartphone 200.

In this exemplary embodiment, a safe image 1100A and the index finger image 301A are displayed on the liquid crystal display 223. As a matter of course, the index finger image 301A corresponds to the index finger 301. The index finger 301 is not in contact with the safe 1100, and is moved in the air.

Figure 27:
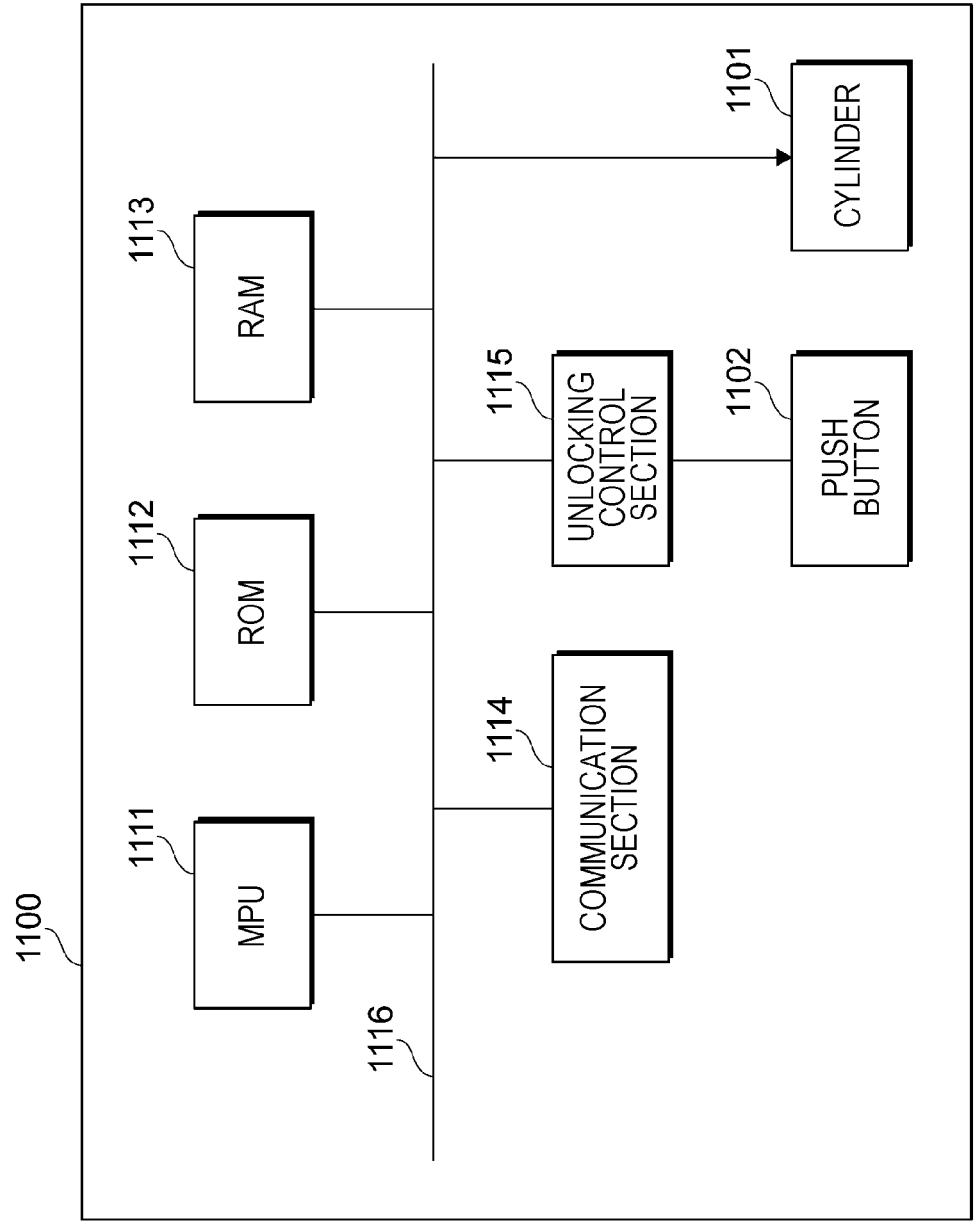
FIG. 27 illustrates an example of the hardware configuration of the safe.

FIG. 27 illustrates an example of the hardware configuration of the safe 1100.

The safe 1100 includes the cylinder 1101, the plural push buttons 1102 on operation surfaces of which alphanumeric characters are printed, an MPU 1111, a ROM 1112 that stores data such as firmware, a RAM 1113 that is used as a work area for a program, a communication section 1114 that is used for communication with an external device such as the smartphone 200 (see FIG. 26), and an unlocking control section 1115 that electrically unlocks and locks the cylinder 1101.

Figure 28:
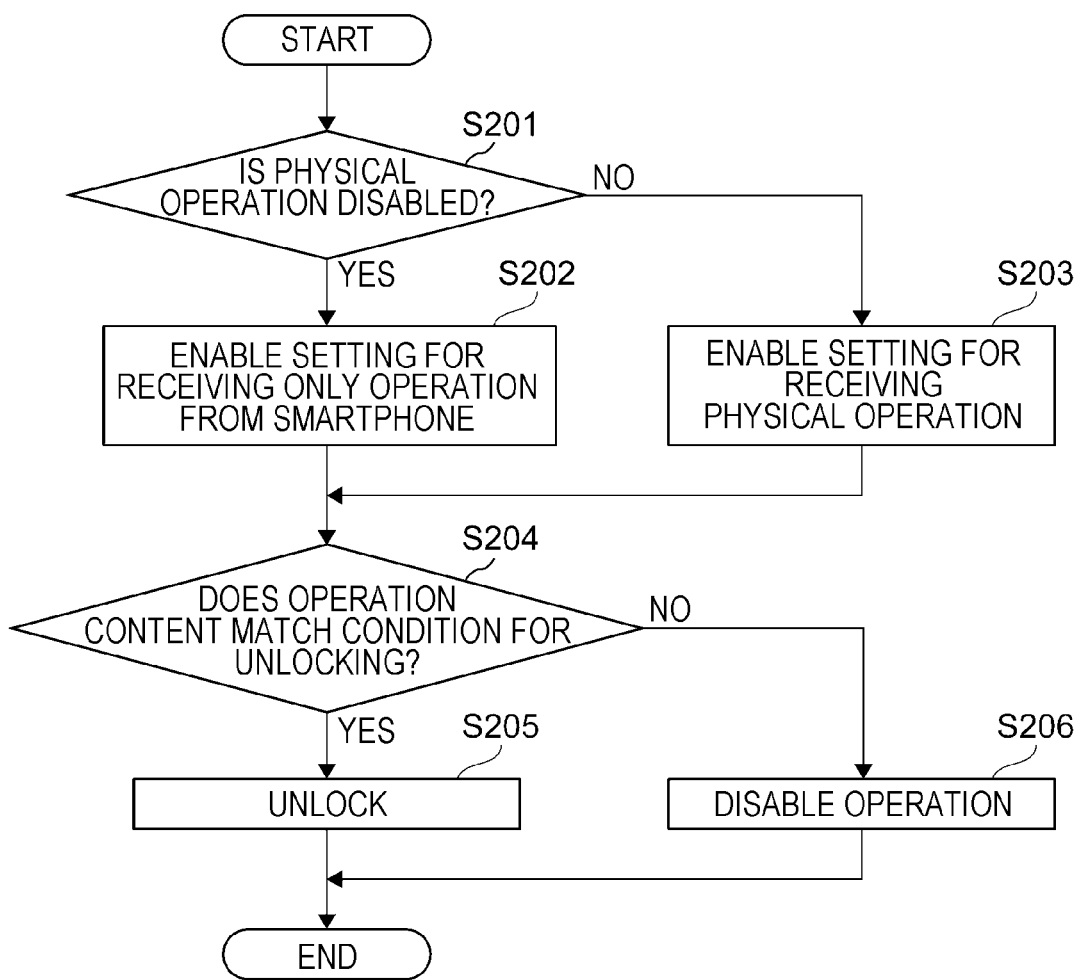
FIG. 28 is a flowchart illustrating an example of processing operation executed by a micro processing unit (MPU)

FIG. 28 is a flowchart illustrating an example of processing operation executed by the MPU 1111.

First, the MPU 1111 determines whether or not a physical operation has been disabled (step 201).

In the case where a positive result is obtained in step 201, the MPU 1111 enables a setting for receiving only an operation from the smartphone 200 (step 202).

In the case where a negative result is obtained in step 201, on the other hand, the MPU 1111 enables a setting for receiving a physical operation (step 203). In the case where a setting for receiving a physical operation is enabled, an operation from the smartphone 200 is also enabled.

After such a setting is made, the MPU 1111 determines whether or not the content of an operation matches a condition for unlocking (step 204).

In the case where a positive result is obtained in step 204, the MPU 1111 unlocks the cylinder 1101 (step 205).

In the case where a negative result is obtained in step 204, on the other hand, the MPU 1111 disables the operation (step 206).

For example, in the case where a physical operation is disabled, a locked state is maintained even if a correct key is inserted into the cylinder 1101 (see FIG. 26) or the push buttons 1102 (see FIG. 26) are operated in the correct order. In the case where an instruction to operate the push buttons 1102 in the correct order is given from the smartphone 200, on the other hand, unlocking is permitted.

Fourth Exemplary Embodiment

A method of operating by a gesture a subject captured in an image by a web camera or the like as if the subject were present right in front of the eyes will be described.

Figure 29:
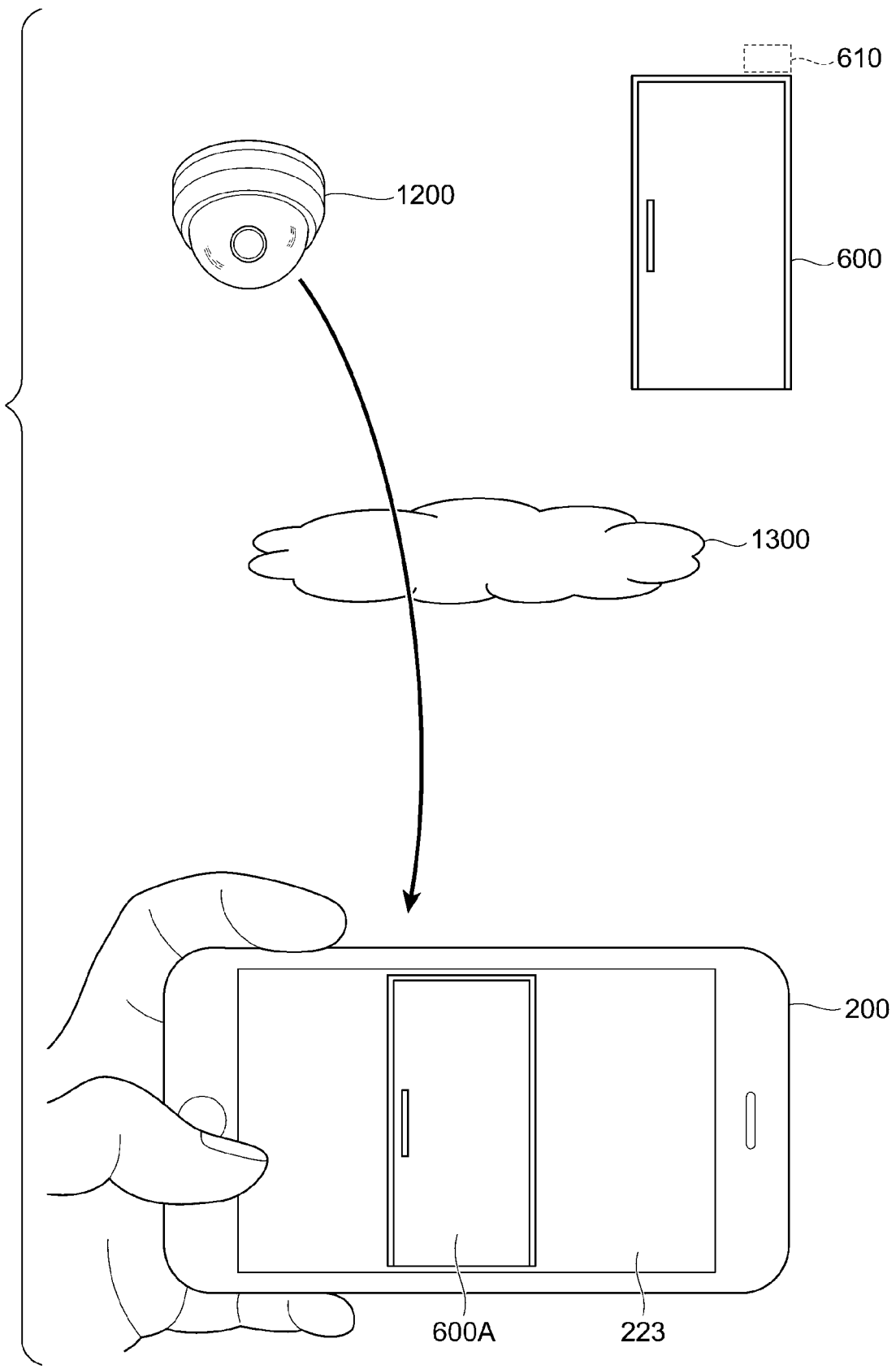
FIG. 29 illustrates an example of a system according to a fourth exemplary embodiment.

FIG. 29 illustrates an example of a system according to a fourth exemplary embodiment.

In the system illustrated in FIG. 29, image data output from a web camera 1200 are transmitted to the smartphone 200 by way of a network 1300, and displayed on the liquid crystal display 223.

An image 600A of the single-swing door 600 is displayed on the liquid crystal display 223 illustrated in FIG. 29.

Figure 30:
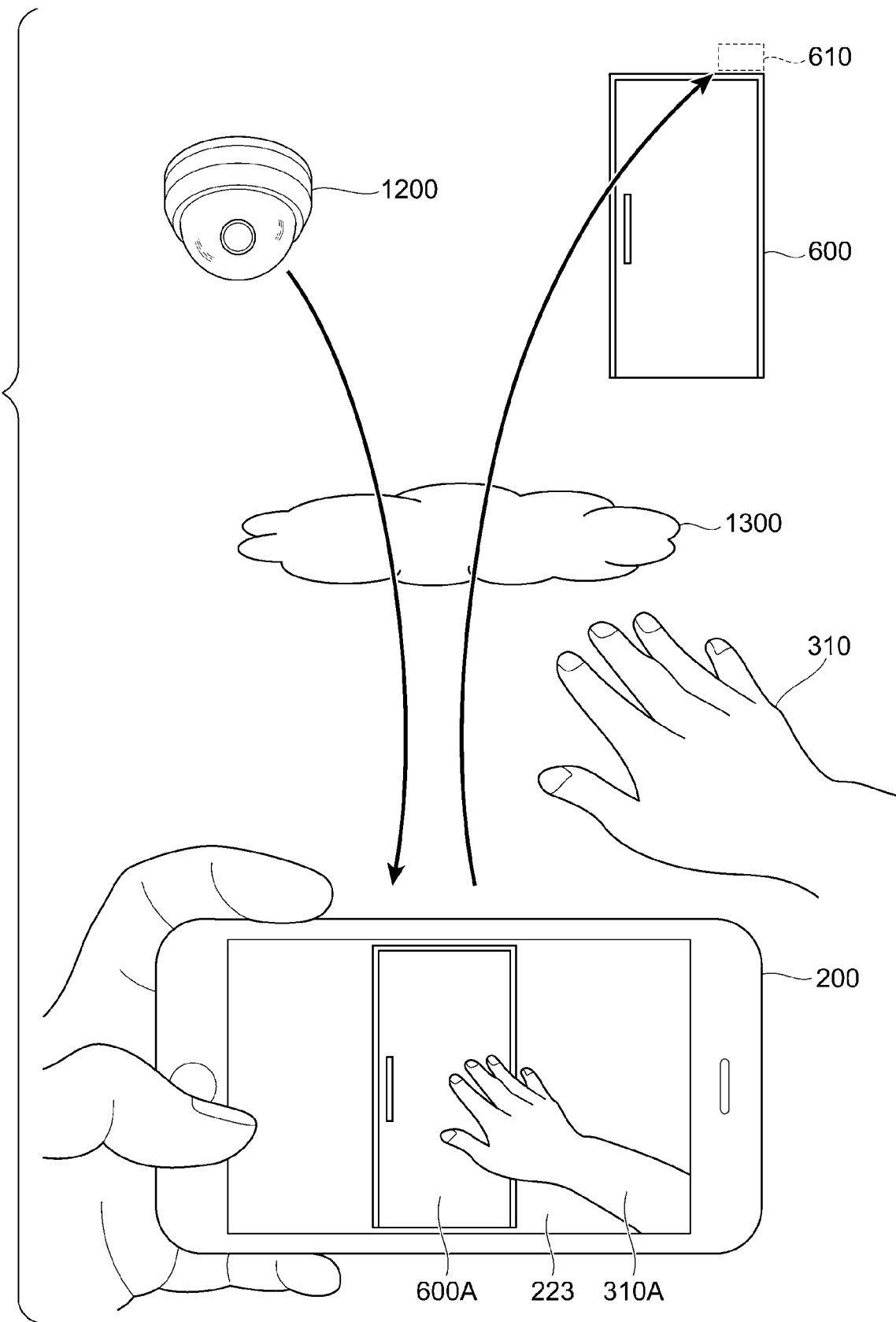
FIG. 30 illustrates a case where the smartphone receives motion of a part of the body of the user as an operation on the single-swing door as described in relation to the exemplary embodiment discussed earlier.

FIG. 30 illustrates a case where the smartphone 200 receives motion of a part (right hand 310) of the body of the user as an operation on the single-swing door 600 as described in relation to the exemplary embodiment discussed earlier.

Portions in FIG. 30 corresponding to those in FIG. 29 are given the corresponding reference numerals.

In FIG. 30, the right hand image 310A captured by the smartphone 200 is superposed on the single-swing door image 600A.

In this state, when the right hand 310 is moved so as to push out in the air, a signal that instructs an opening operation of the single-swing door 600 is output to the mechanism 610 connected by way of the network 1300.

Figure 31:
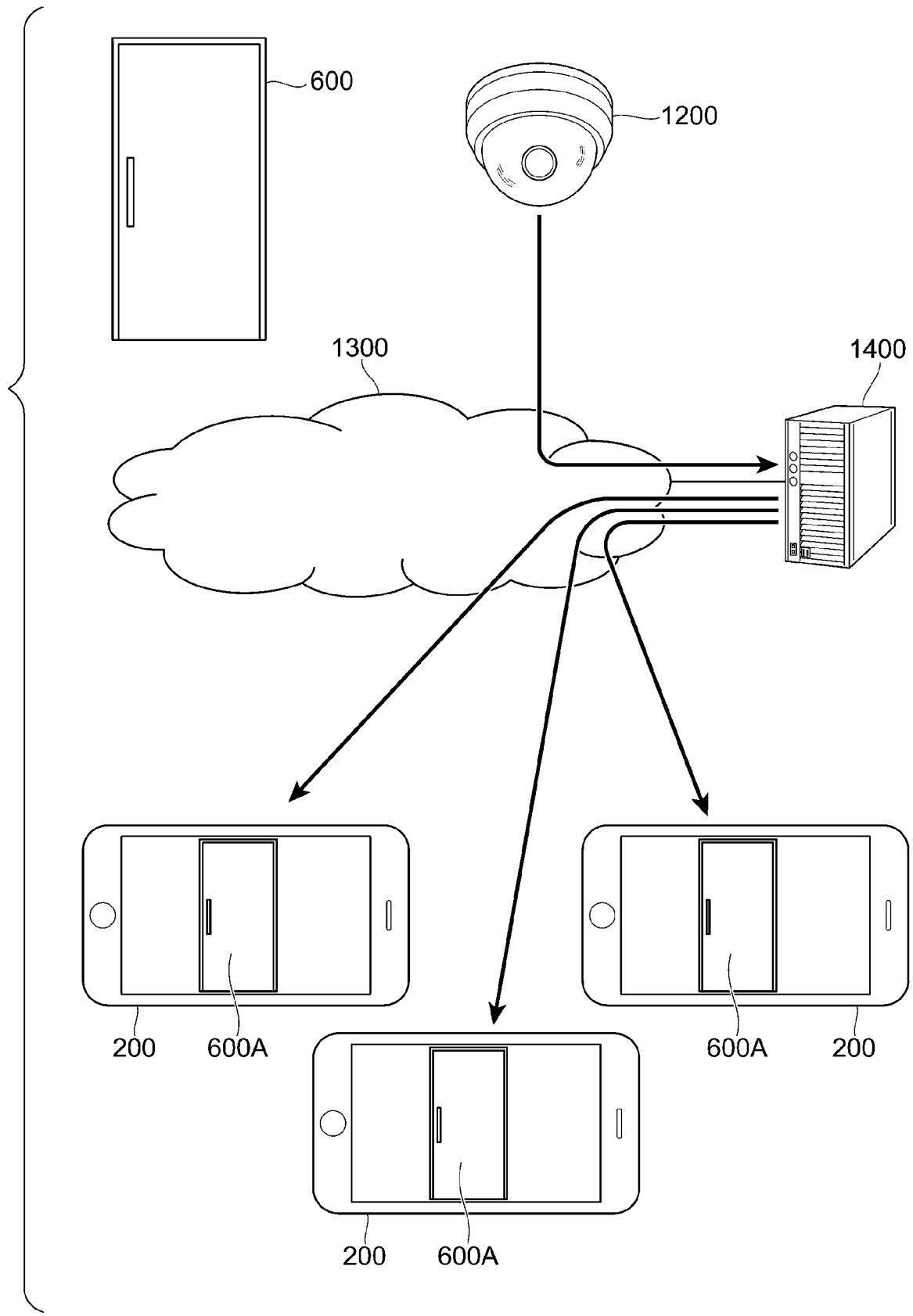
FIG. 31 illustrates a scheme in which plural users share information on an operation via a network.

FIG. 31 illustrates a scheme in which plural users share information on an operation via the network 1300. Portions in FIG. 31 corresponding to those in FIG. 30 are given the corresponding reference numerals.

FIG. 31 illustrates a case where image data output from the web camera 1200 are acquired by a server 1400 and thereafter distributed to three smartphones 200. The function of the server 1400 may be built in the web camera 1200.

In the case of FIG. 31, all the smartphones 200 display the single-swing door image 600A.

Figure 32:
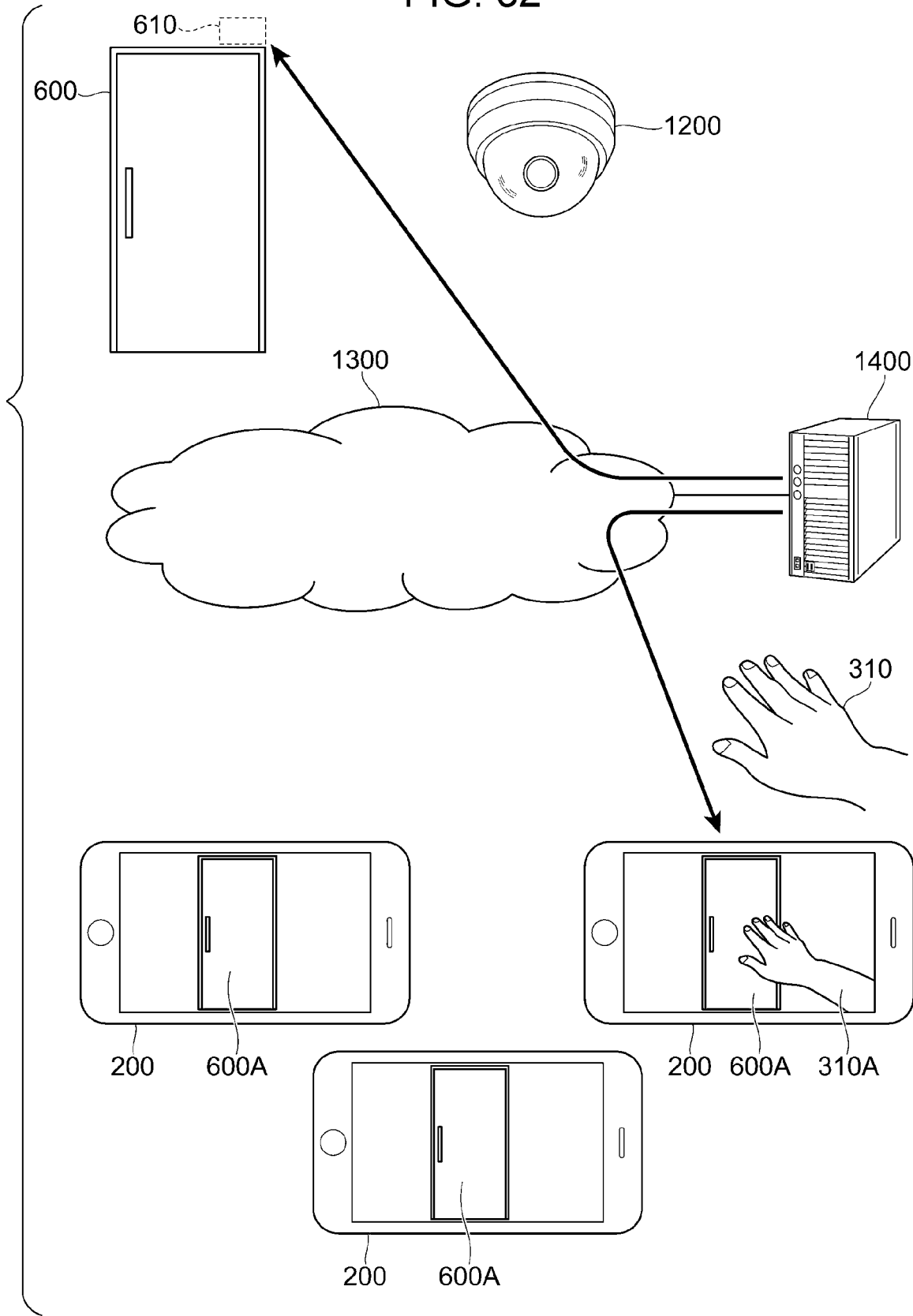
FIG. 32 illustrates a case where the single-swing door is pushed open using one of three smartphones.

FIG. 32 illustrates a case where the single-swing door 600 is pushed open using one of the three smartphones 200. Portions in FIG. 32 corresponding to those in FIG. 31 are denoted by the corresponding reference numerals.

In the case of FIG. 32, an operation received through one of the three smartphones 200 is transmitted to the mechanism 610 of the single-swing door 600 through the server 1400. In the case where plural operations on the single-swing door 600 are performed at a time, the server 1400 according to the present embodiment gives priority to an operation that arrives the earliest. In the case where contradictory operations arrive at a time, execution of such operations may be suspended. The phrase "at a time" means that operations arrive within a period determined in advance.

Figure 33:
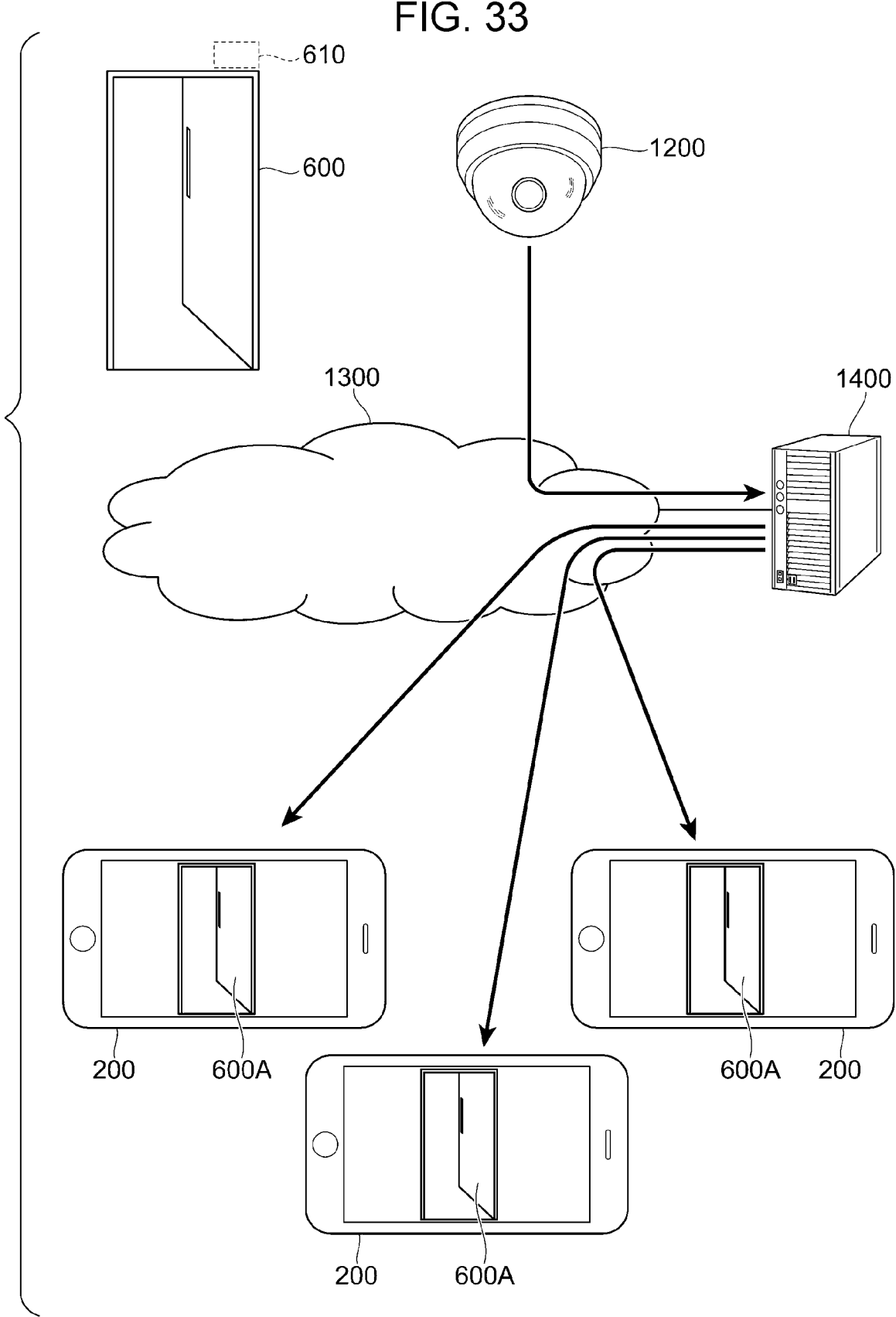
FIG. 33 illustrates a scene in which a state in which the single-swing door is open is shared among the three smartphones.

FIG. 33 illustrates a scene in which a state in which the single-swing door 600 is open is shared among the three smartphones 200. Portions in FIG. 33 corresponding to those in FIG. 32 are denoted by the corresponding reference numerals.

Fifth Exemplary Embodiment

While the operation target displayed on the smartphone 200 is a device in the exemplary embodiment discussed earlier, a case where the operation target is not provided with a communication function will be described.

Figure 34:
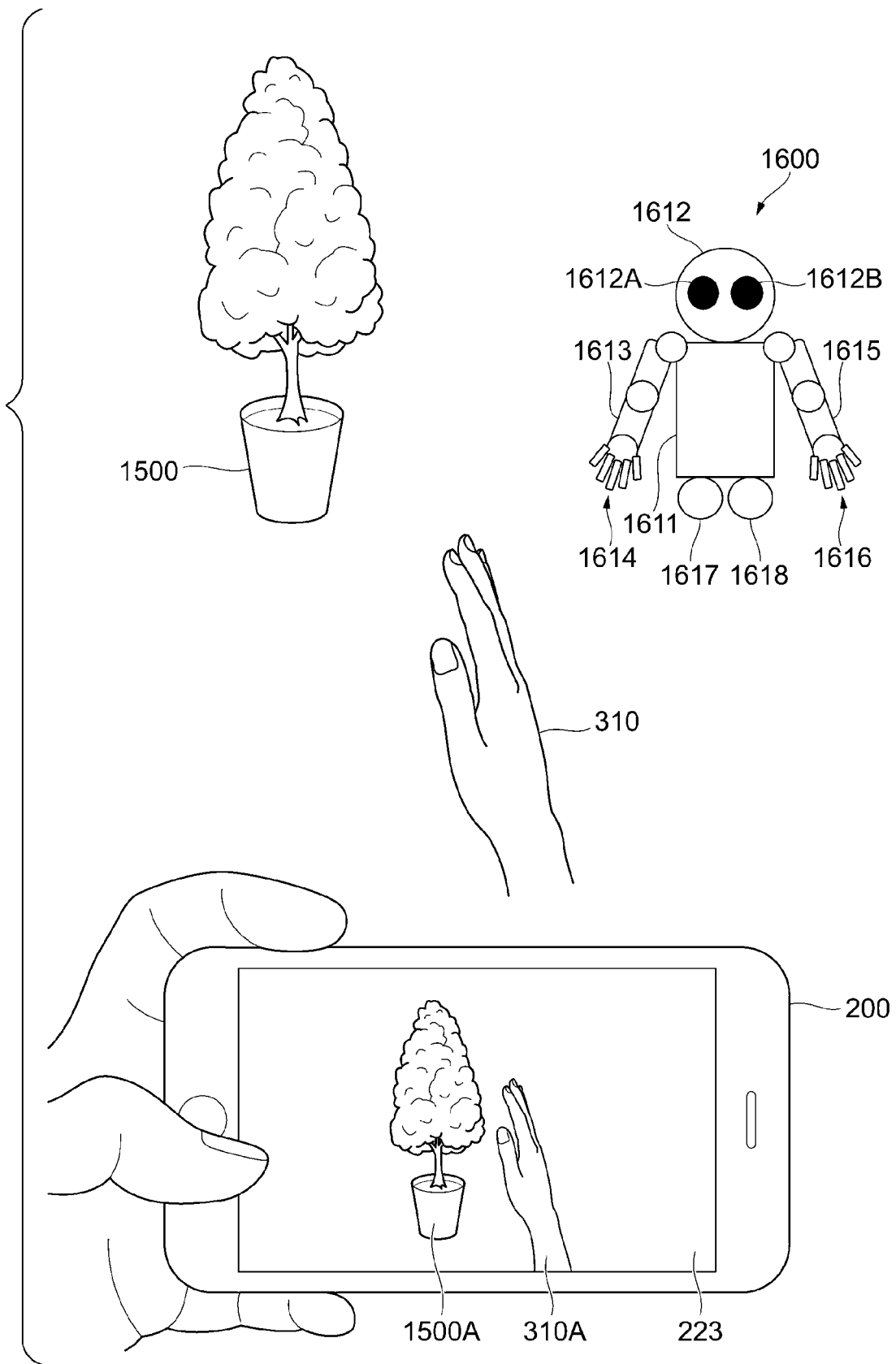
FIG. 34 illustrates a case where an instruction to move a potted plant is provided by a gesture.

FIG. 34 illustrates a case where an instruction to move a potted plant 1500 is provided by a gesture. In FIG. 34, the user's right hand image 310A and a potted plant image 1500A are displayed on the screen of the smartphone 200. Also in this case, the right hand 310 in the actual space is not in contact with the potted plant 1500.

The potted plant 1500 is not provided with a communication function or a self-running device. Therefore, unlike the exemplary embodiment discussed earlier, even if motion of the right hand 310 is captured in an image by the smartphone 200, the potted plant 1500 may not be moved in accordance with the motion.

In the present embodiment, a humanoid robot 1600 that has a self-running function is designated as the destination of transmission of an operation by a gesture. The robot 1600 as the destination of transmission of an instruction may be designated from a list of devices that are capable of communicating with the smartphone 200, for example.

Although the robot 1600 illustrated in FIG. 34 has a humanoid appearance, the robot may have any appearance as long as a necessary function is provided. For example, the robot may look like an animal such as a dog or a cat, a plant such as a flower or a tree, or a vehicle or a craft such as a car (including a train) or an airplane.

The robot 1600 illustrated in FIG. 34 includes a body portion 1611, a head portion 1612, arms 1613 and 1615, hands 1614 and 1616, and legs 1617 and 1618.

The body portion 1611 stores an electronic component for signal processing. The body portion 1611 may be provided with a display device or an acoustic device.

The head portion 1612 is coupled to the body portion 1611 via a joint mechanism provided at a neck portion. In the case of the present embodiment, the joint mechanism is rotatable about three axes. Rotations about three axes include yaw (rotation about the z-axis), roll (rotation about the x-axis), and pitch (rotation about the y-axis). The joint mechanism here is an example of the movable section.

It is not necessary that the joint mechanism should be rotatable about all the three axes, and the joint mechanism may be rotatable about only one axis or two axes. Such rotation may be implemented by a motor (not illustrated), or may be implemented manually. A case where the head portion 1612 is fixed with respect to the body portion 1611 is not excluded.

The head portion 1612 is provided eyes 1612A and 1612B. The eyes 1612A and 1612B may be disposed decoratively, or may include an image capture device, a projector, a lighting fixture, etc. built therein. The head portion 1612 may be provided with movable ears.

The arms 1613 and 1615 according to the present embodiment are coupled to the body portion 1611 via a joint mechanism. An overarm and a forearm of the arms 1613 and 1615 are coupled to each other via a joint mechanism. The joint mechanism here may be of a multi-axis type or a single-axis type as with that for the head portion 1612. Rotation about an axis may be implemented by a motor (not illustrated), or may be implemented manually. The arms 1613 and 1615 may be fixed to the body portion 1611. The joint mechanism here is also an example of the movable section.

The arms 1613 and 1615 may be bent to an angle determined in advance to be used to transport an object.

The hands 1614 and 1616 are coupled to the arms 1613 and 1615, respectively, via a joint mechanism provided at a wrist portion. A palm and fingers of the hands 1614 and 1616 are coupled to each other via a joint mechanism. The joint mechanism here may be of a multi-axis type or a single-axis type as with that for the head portion 1612. Rotation about an axis may be implemented by a motor (not illustrated), or may be implemented manually. In the case of the present embodiment, the hands 1614 and 1616 may grasp an object by opening and closing the fingers. The joint mechanism here is also an example of the movable section.

The hands 1614 and 1616 may be fixed with respect to the arms 1613 and 1615, respectively.

The legs 1617 and 1618 may be coupled to the body portion 1611 via a joint mechanism, or may be attached to the body portion 1611 as a self-running device such as a wheel or a caterpillar.

In the case where the legs 1617 and 1618 are coupled to the body portion 1611 via a joint mechanism, the joint mechanism may be of a multi-axis type or a single-axis type as with that for the head portion 1612.

Rotation about an axis may be implemented by a motor (not illustrated), or may be implemented manually. The legs 1617 and 1618 may be fixed with respect to the body portion 1611. The joint mechanism here is also an example of the movable section.

Figure 35:
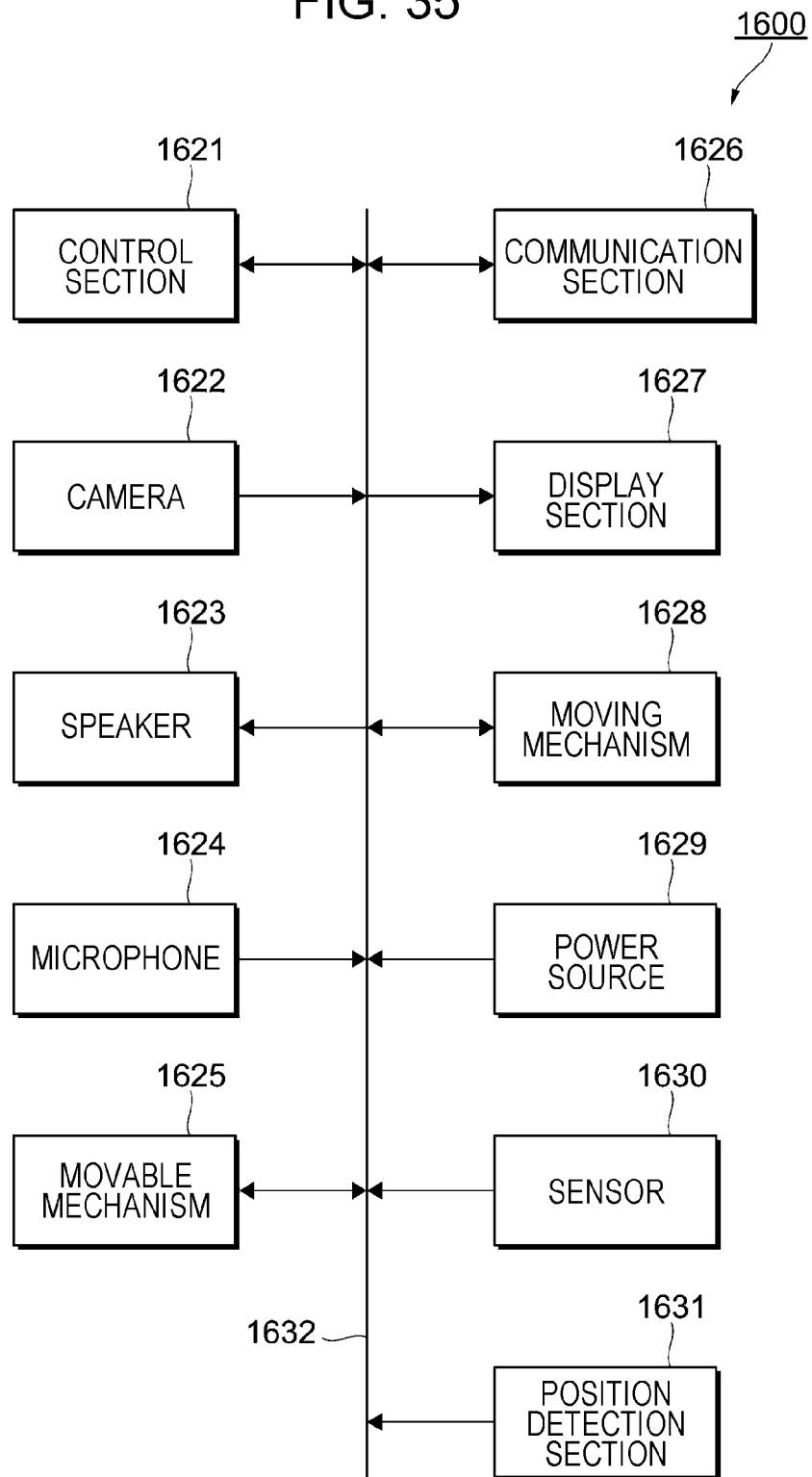
FIG. 35 illustrates the hardware configuration of a robot.

FIG. 35 illustrates the hardware configuration of the robot 1600.

The robot 1600 includes a control section 1621 that controls motion of the entire device, a camera 1622 that captures an image of a scene around the robot, a speaker 1623 that reproduces voices for conversation, tunes, and sound effects, a microphone 1624 that is used to input or acquire a sound, a movable mechanism 1625 such as a joint mechanism, a communication section 1626 that is used to communicate with an external device (e.g. a smartphone), a display section 1627 that displays an image, a moving mechanism 1628 that moves the entire device, a power source 1629 that supplies electric power to the various sections, a sensor 1630 that is used to collect a state of the various sections and information on the surroundings, and a position detection section 1631 that is used to acquire positional information. Such sections are connected to each other via a bus 1632, for example.

It should be understood that the hardware configuration illustrated in FIG. 35 is exemplary. Thus, it is not necessary that the robot 1600 should be provided with all the functional sections discussed earlier.

The robot 1600 may be further provided with a functional section (not illustrated). For example, the robot 1600 may be provided with a power button, a storage device (such as a hard disk device or a semiconductor memory), a heat source (including a cooling source), or the like.

The control section 1621 is a so-called computer, and includes a CPU, a ROM, and a RAM. The ROM stores a program to be executed by the CPU. The CPU reads the program stored in the ROM, and executes the program using the RAM as a work area. The CPU controls operation of the various sections constituting the robot 1600 through execution of the program.

This program includes a program associated with implementation of an algorithm corresponding to artificial intelligence. The CPU and the RAM constituting the control section 1621 provide a computational resource that is used by the artificial intelligence.

The control section 1621 according to the present embodiment processes information acquired through the camera 1622, the microphone 1624, and the sensor 1630, for example, with the artificial intelligence to autonomously determine operation that matches the surrounding environment and the state of the robot 1600.

For example, a voice may be output through the speaker 1623, a message may be transmitted through the communication section 1626, and an image may be output through the display section 1627.

The control section 1621 may establish communication with the user through input and output of such information and motion of the movable mechanism 1625. Examples of application of communication include customer attendance and leading meetings.

The control section 1621 also has a function of collecting additional information through Internet search or communication with an external computer in the case where an unknown situation occurs, and finding a solution in accordance with the degree of similarity to an event found in the search.

In the case of the present embodiment, examples of the information acquired by the control section 1621 include information obtained through the senses of sight, hearing, touch, taste, smell, and balance and the temperature.

The sense of sight is implemented through a process of recognizing an image captured by the camera 1622.

The sense of hearing is implemented through a process of recognizing a sound acquired by the microphone 1624.

Examples of the sense of touch include superficial sensation (such as touch, pain, and temperature), deep sensation (such as pressure, position, and vibration), and cortical sensation (such as two-point discrimination and three-dimensional discrimination).

The control section 1621 is able to discriminate differences in the sense of touch.

The senses of touch, taste, smell, and balance and the temperature are implemented through detection of information by the sensor 1630 of various types. The temperature includes an ambient temperature, an internal temperature, and the body temperature of a human or an animal.

The information acquired by the control section 1621 may include brain waves of a human or an animal. In this case, the brain waves may be obtained by the communication section 1626 receiving information sent from a brain wave detection device mounted to a human or the like.

In the case of the present embodiment, the camera 1622 is disposed at the positions of the eyes 1612A and 1612B (see FIG. 34).

In the case where a projector is used as the display section 1627, the projector may be disposed at one or both of the eyes 1612A and 1612B (see FIG. 1), for example. The projector may be disposed in the body portion 1611 or the head portion 1612.

The movable mechanism 1625 may be used not only to transport an object but also to express a feeling.

In the case where the movable mechanism 1625 is used to transport an object, the movable mechanism 1625 implements operation such as grasping, holding, and supporting the object, for example, through deformation of the arms 1613 and 1615 and the hands 1614 and 1616 (see FIG. 34).

In the case where the movable mechanism 1625 is used to express a feeling, the movable mechanism 1625 implements operation such as tilting the head, looking up, looking around, giving a cheer, and pointing a finger through drive of the head portion 1612, the arms 1613 and 1615, the hands 1614 and 1616, etc. (see FIG. 34), for example.

The communication section 1626 according to the present embodiment communicates with an external device wirelessly.

The robot 1600 is provided with a number of communication sections 1626, the number corresponding to the number of communication methods used by an external device assumed as the target of communication. Examples of the communication methods include infrared communication, visible light communication, proximity wireless communication, Wi-Fi (registered trademark), Bluetooth (registered trademark), RFID (registered trademark), ZigBee (registered trademark), IEEE 802.11a (registered trademark), MulteFire, and Low Power Wide Area (LPWA).

Bands used for wireless communication include a short-wavelength region (e.g. 800 MHz to 920 MHz) and a long-wavelength region (e.g. 2.4 GHz and 5 GHz).

The communication section 1626 and the external device may be connected to each other using a communication cable.

The display section 1627 may be used to achieve visual communication with the user. For example, the display section 1627 may display characters and figures.

In the case where the display section 1627 is disposed at the head portion 1612, the display section 1627 may display a facial expression.

In the case of the present embodiment, a wheel or a caterpillar is used for the moving mechanism 1628. However, the robot 1600 may be moved by a pneumatic force using a propeller or a compressed air blowout mechanism.

A secondary battery is used for the power source 1629 according to the present embodiment. However, any of a primary battery, a fuel cell, and a solar cell that generate electric power may also be used.

Alternatively, the robot 1600 may receive supply of electric power from an external device through a power cable, rather than from the power source 1629.

In the case of the present embodiment, the robot 1600 is provided with the position detection section 1631.

The position detection section 1631 utilizes a method in which location information is read from a global positioning system (GPS) signal, an Indoor MEssaging System (IMES) method in which an indoor position is measured using a signal that is equivalent to the GPS signal, a Wi-Fi position measurement method in which a position is measured from the intensity, arrival time, etc. of radio waves transmitted from plural Wi-Fi access points, a base-station position measurement method in which a position is measured from the direction and delay time of a response to a signal regularly generated from a base station, a sound-wave position measurement method in which a position is measured by receiving ultrasonic waves in an inaudible range, a Bluetooth position measurement method in which a position is measured by receiving radio waves from a beacon that uses Bluetooth, a visible-light position measurement method in which a position is measured using positional information transferred by flashing on and off of illumination light from a light emitting diode (LED) or the like, or an autonomous navigation method in which the current position is measured using an acceleration sensor, a gyro sensor, etc., for example.

Figure 36:
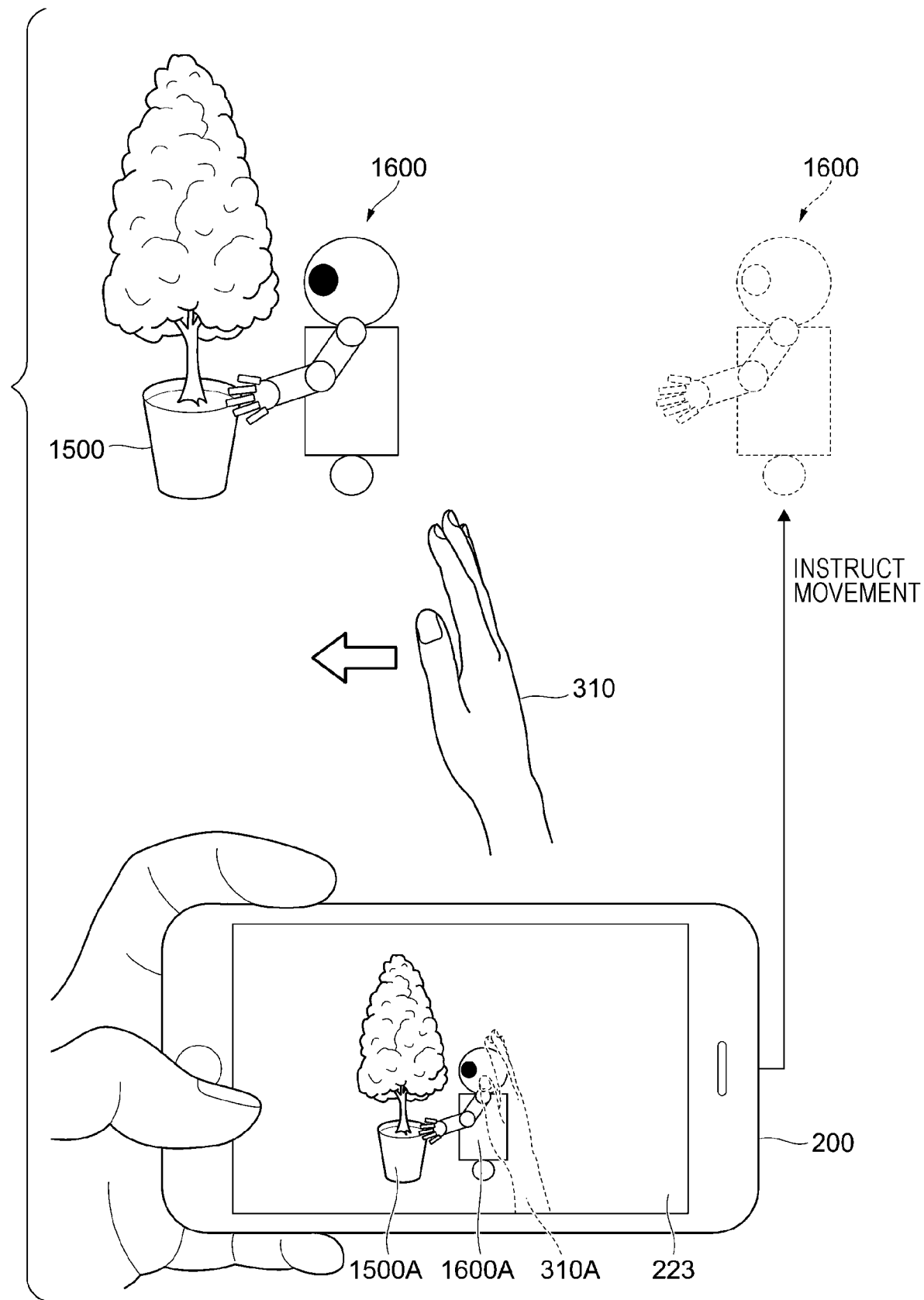
FIG. 36 illustrates how the potted plant is moved using the robot.

FIG. 36 illustrates how the potted plant 1500 is moved using the robot 1600.

Portions in FIG. 36 corresponding to those in FIG. 34 are denoted by the corresponding reference numerals.

As in the other exemplary embodiments, the user moves his/her right hand 310 in the space in front of the smartphone 200, and captures an image of such motion.

When the motion of the right hand 310 is received as an operation, the smartphone 200 instructs the robot 1600, which is able to move to the potted plant 1500, to execute the operation. The operation is to move the potted plant 1500 sideways.

When the instruction for movement is received, the robot 1600 moves to the location of the potted plant 1500 which is the target of movement, and grasps and moves the potted plant 1500 sideways.

In this event, the smartphone 200 displays a robot image 1600A grasping and moving the potted plant image 1500A and the right hand image 310A. In the case of FIG. 36, the right hand image 310A is displayed as a transparent image in order to facilitate confirmation of the robot image 1600A.

In the case of FIG. 36, both the potted plant 1500 and the robot 1600 actually exist in front of the eyes of the user, and thus there is little need to display the right hand image 310A in a transparent manner. In the case where the potted plant image 1500A being displayed on the smartphone 200 is not present in front of the eyes of the user (e.g. in the case where the smartphone 200 displays an image from a web camera), however, the right hand image 310A may be displayed in a transparent manner in order to facilitate confirmation of a scene in the actual space.

Other Exemplary Embodiments

While exemplary embodiments of the present invention have been described above, the technical scope of the present invention is not limited to the exemplary embodiments discussed above. It is apparent from the following claims that a variety of modifications and improvements that may be made to the exemplary embodiments discussed above also fall within the technical scope of the present invention.

(1) For example, in the exemplary embodiments discussed earlier, the smartphone 200 (see FIG. 1) or the glass-type terminal (see FIG. 25) is used to operate an object that is present in the real space. However, the information processing apparatus that receives a gesture of the user as an operation may be a tablet terminal, a so-called digital camera, or a gaming device, for example, that includes a camera for image capture, a display section, and a communication section.

(2) In the exemplary embodiments discussed earlier, the smartphone 200 executes a process of receiving motion of a part of the body of the user captured in an image by the smartphone 200 as an operation. However, the smartphone 200 may be used as a unit that captures an image of motion of a part of the body, and an external device (e.g. a server) may execute a process of receiving such motion as an operation.

(3) In the exemplary embodiments discussed earlier, a glove is described as an example of an object that decorates a part of the body of the user in accordance with the situation of use. However, a garment or the like may be added as decoration. Nails may be manicured on the screen. In the case where an operation is performed using a foot, footwear that matches the situation of use may be added as decoration. Examples of the footwear include a business shoe, a sports shoe, a sandal, and a boot.

(4) In the exemplary embodiments discussed earlier, the smartphone 200 is positioned in front of the object as the operation target to be at the facing position. However, the facing position is not limited to a position in front.

Figure 37:
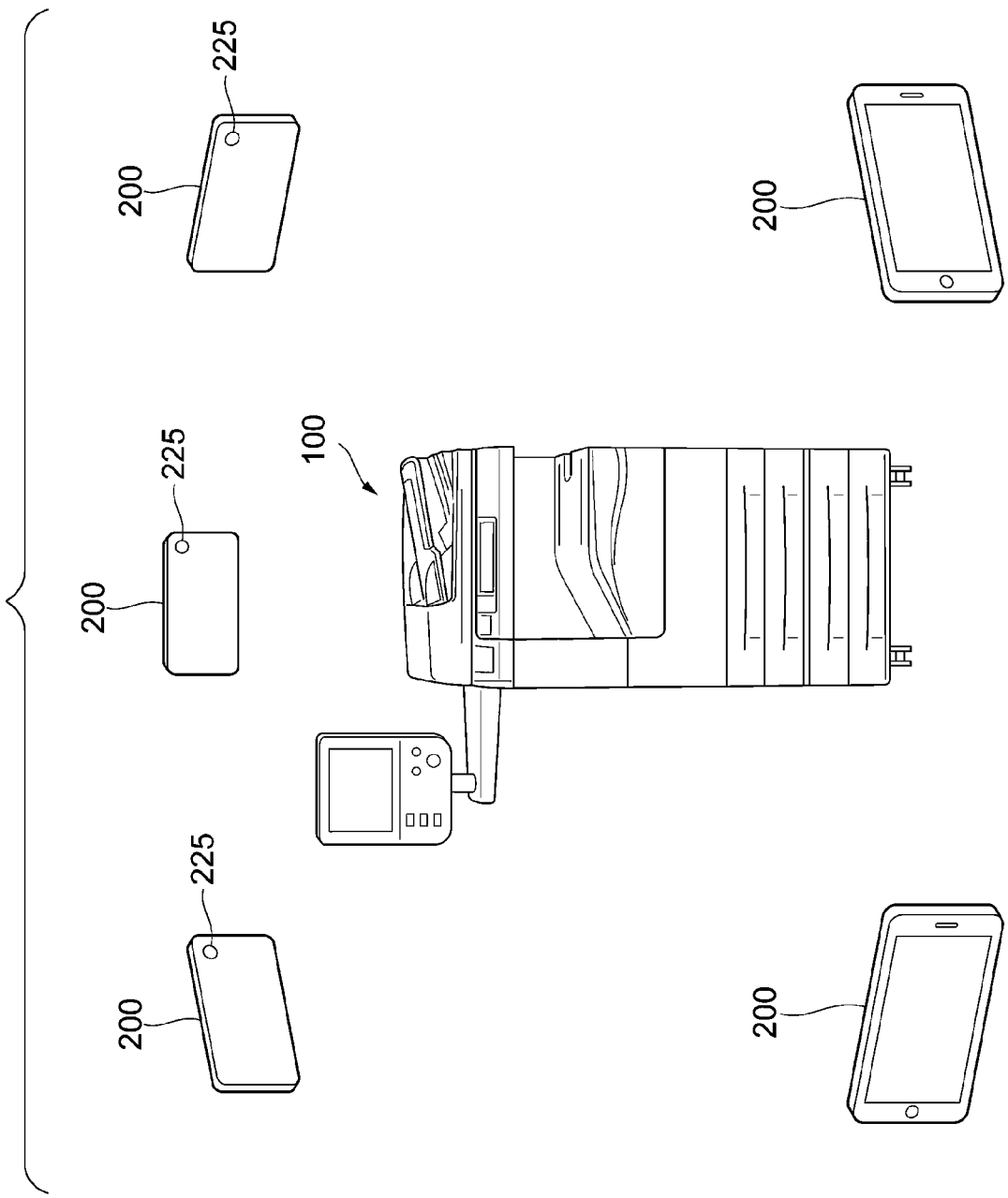
FIG. 37 illustrates a different example of positions facing the image forming apparatus.

FIG. 37 illustrates a different example of positions facing the image forming apparatus 100.

In FIG. 37, the smartphone 200 is positioned diagonally forward right of, diagonally rearward right of, in rear of, diagonally rearward left of, and diagonally forward left of the image forming apparatus 100. Such positions are examples of the position facing the image forming apparatus 100.

(5) In the exemplary embodiments discussed earlier, the buttons displayed on the user interface section 110 (see FIG. 1) of the image forming apparatus 100 (see FIG. 1) are operated by a gesture. However, the housing section 140 (see FIG. 1) for paper may be opened and closed by a gesture.

Figure 38:
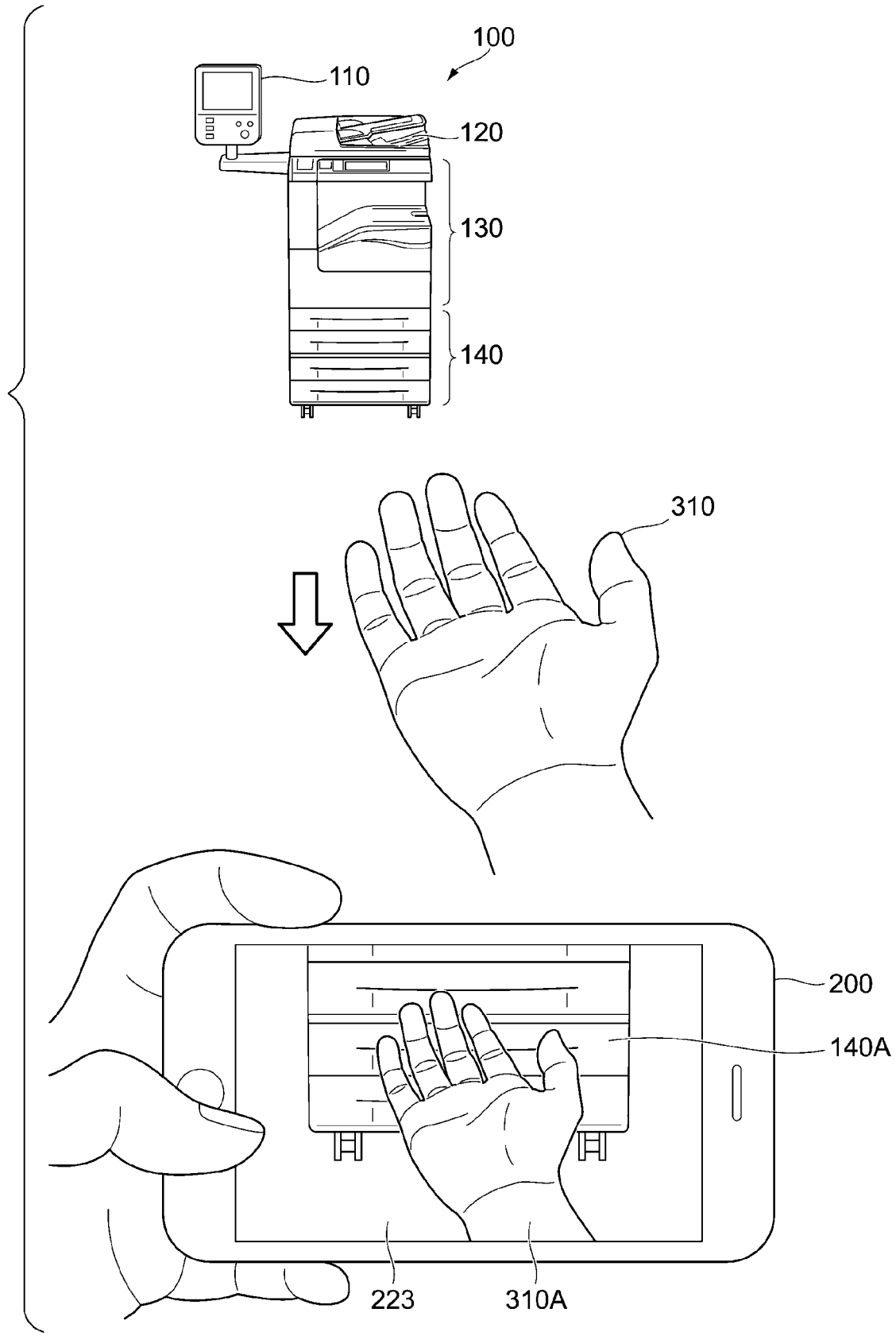
FIG. 38 illustrates an example in which a housing section for paper is opened and closed by a gesture.

FIG. 38 illustrates an example in which the housing section 140 for paper is opened and closed by a gesture. The housing section 140 for paper is the operation target, and thus a housing section image 140A and the user's right hand image 310A are displayed on the liquid crystal display 223 of the smartphone 200. In FIG. 38, the right hand 310 is pulled toward the closer side as indicated by an arrow. In the case of this example, the housing section 140 for paper, which is detected as superposed on the right hand image 310A, is pulled out toward the closer side even if the buttons displayed on the user interface section 110 are not operated. As a matter of course, it is necessary, as a precondition, that a motor (not illustrated) that drives the housing section 140 should be built in the image forming apparatus 100. The housing section 140 for paper may also be closed by moving the right hand 310 toward the farther side.

(6) In the exemplary embodiments discussed earlier, an operation that is similar to that performed in the case where the user interface section 110 is directly operated is implemented by a gesture. In the case where a particular portion as the operation target is designated by a gesture, the content displayed on the user interface section 110 may be switched to display including buttons associated with the designated portion.

Figure 39:
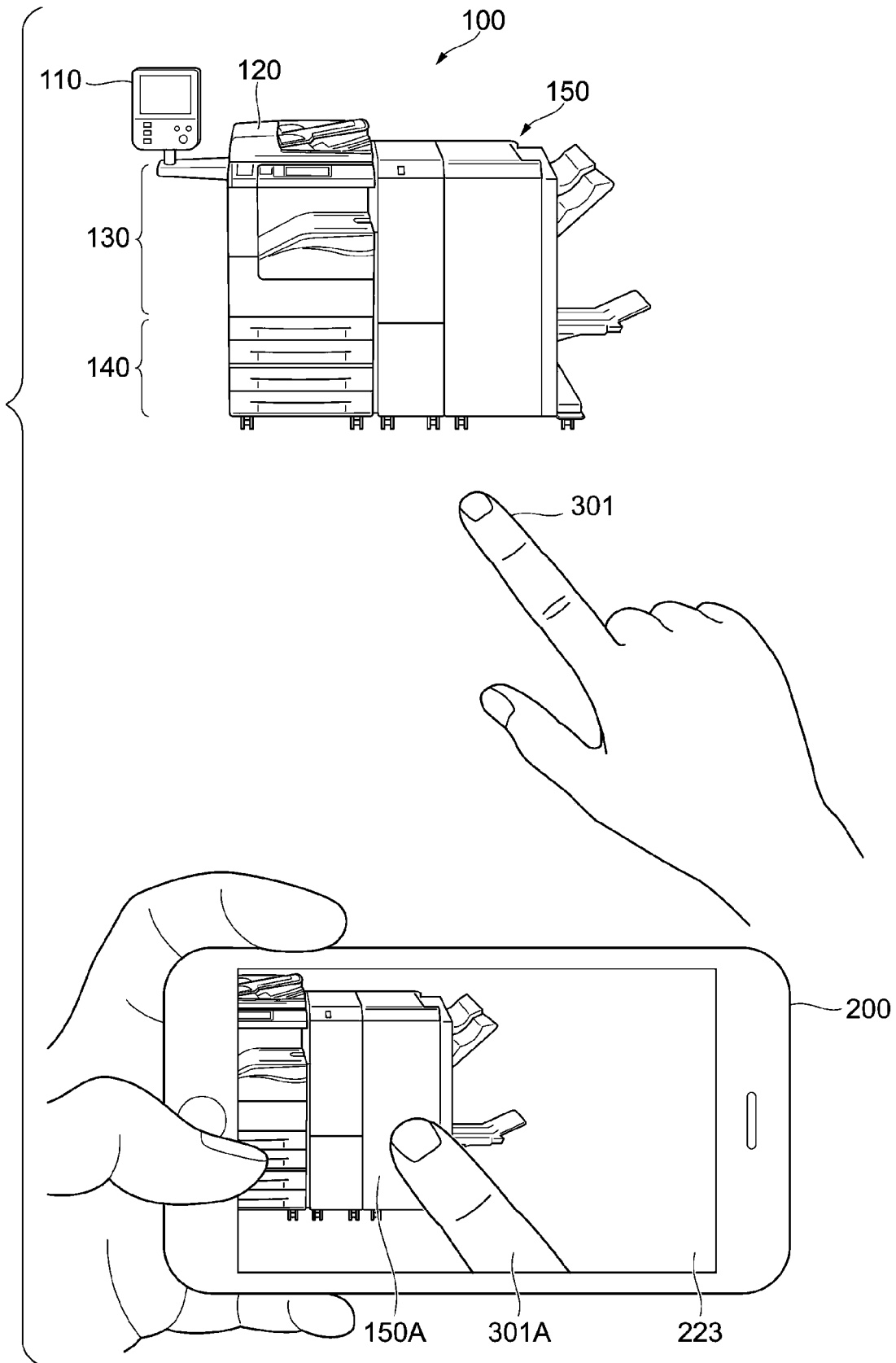
FIG. 39 illustrates an operation example for a case where a mechanism (post-processing device) that applies a punching process or a binding process to printed paper is provided.

FIG. 39 illustrates an operation example for a case where a mechanism (post-processing device 150) that applies a punching process or a binding process to printed paper is provided. The post-processing device 150 may include a sorting mechanism.

In FIG. 39, the index finger image 301A is superposed on a post-processing device image 150A.

In the case of the present embodiment, a select operation by the index finger image 301A and a function of opening the page for setting associated with the post-processing device 150 are assigned to the post-processing device image 150A.

Figure 40A:
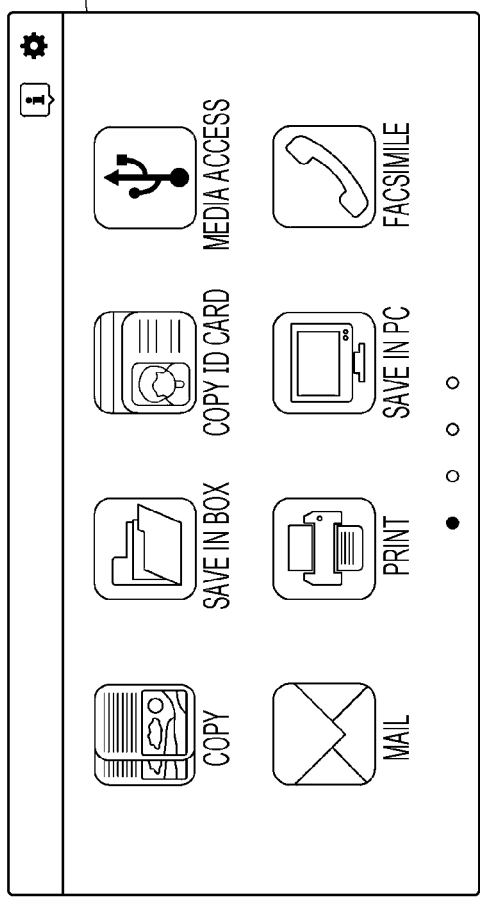
Figure 40C:
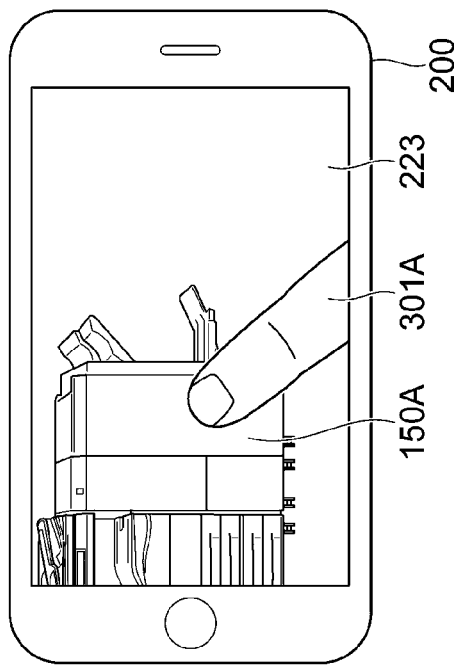
Figure 40B:
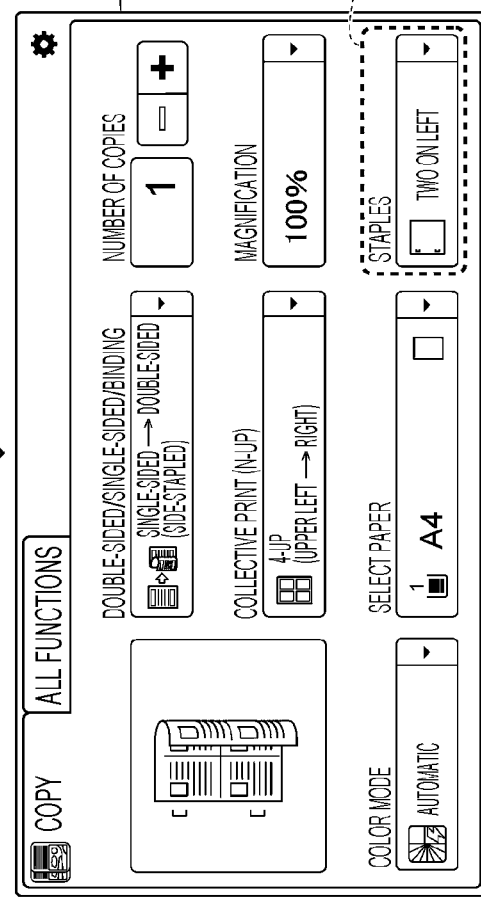

FIGS. 40A to 40C illustrate screen variations caused on the display section 111 in the case where the post-processing device image 150A (see FIG. 39) is selected by the index finger image 301A, in which FIG. 40A illustrates display before a gesture by the index finger image 301A is received, FIG. 40B illustrates display after a gesture by the index finger image 301A is received, and FIG. 40C illustrates an example of a screen of the smartphone 200 that receives an operation by a gesture.

In FIG. 40B, the display section 111 has been switched to a screen including a button 110B for designating whether or not to execute a binding process, even if the display section 111 is captured in an image by the smartphone 200 and operated by a gesture.

As a matter of course, the portion to which a particular gesture and a particular function are assigned is not limited to the post-processing device 150. For example, such a portion may be the back surface of the image forming apparatus 100 (see FIG. 1). In the case where selection by a gesture is received with a connection terminal or a communication line disposed on the back surface captured in an image, the display section 111 may display a menu screen that is used to adjust or set the connection terminal.

(7) In the exemplary embodiments discussed earlier, the liquid crystal display 223 of the smartphone 200 displays reception of an operation by a gesture. However, a function of warning the user in the case where an erroneous operation or an unexpected operation is received may be provided.

Figure 41:
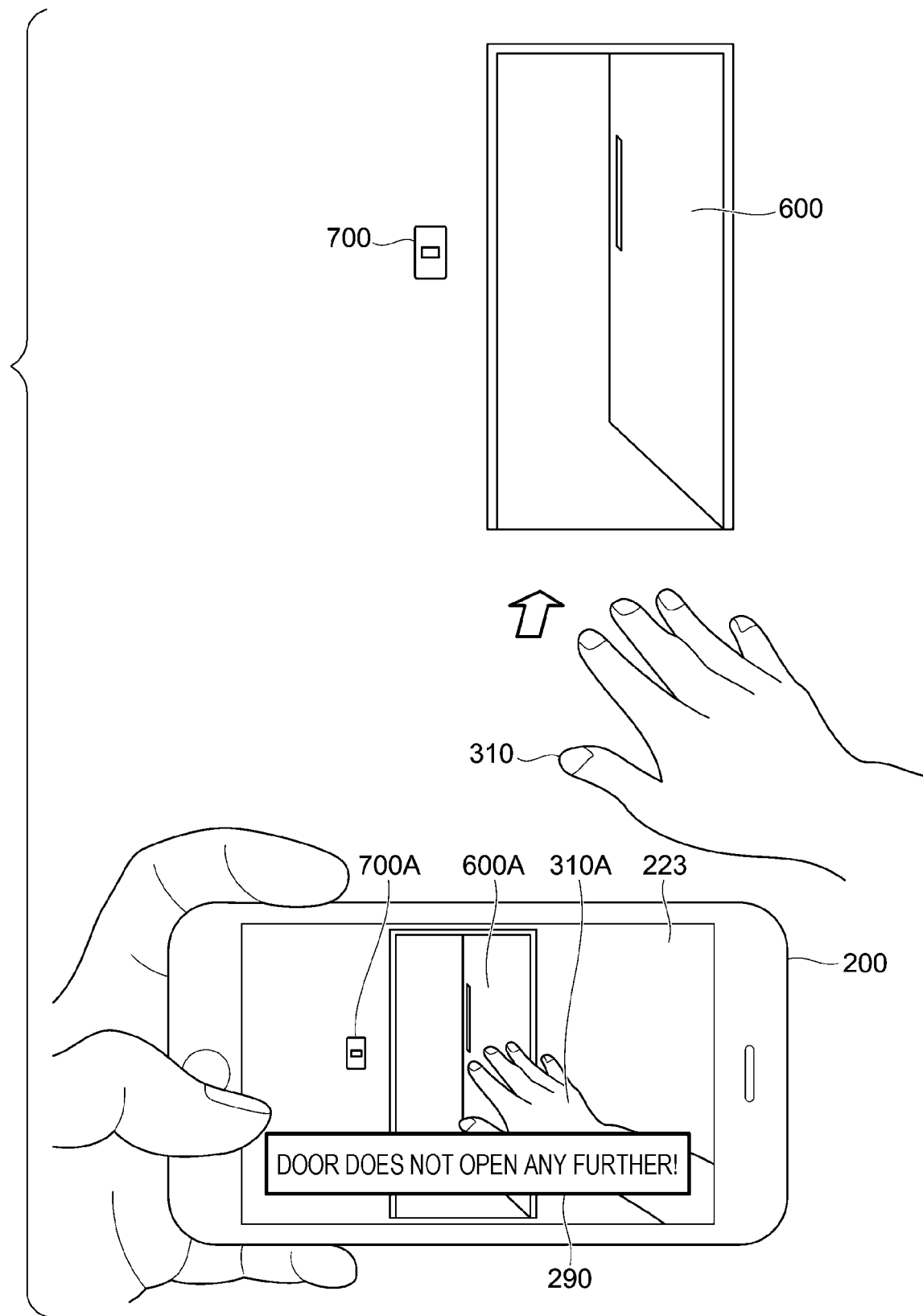
FIG. 41 illustrates an example of a function of notifying the user that a gesture of continuously pushing is detected even after the single-swing door is opened to a maximum allowable angle.

FIG. 41 illustrates an example of a function of notifying the user that a gesture of continuously pushing is detected even after the single-swing door 600 is opened to a maximum allowable angle.

Portions in FIG. 41 corresponding to those in FIG. 19 are denoted by the corresponding reference numerals.

In the case of FIG. 41, a small screen 290 that includes a warning statement "Door does not open any further!" is displayed at the lower portion of the liquid crystal display 223.

The notification may be made by a voice. The notification is not limited to characters and a sound, and an image of the object recognized as the operation target may be changed etc.

While the user is informed of the upper limit of the movable range in this example, the user may be notified of detection of an operation in an immovable direction. In addition, the user may be notified of how to perform a correct operation.

However, it is not necessary that the user should always be notified of a correct operation. Examples of such a case include a case where the operation target is a safe. This is because people other than a particular person are not permitted to unlock a safe. An operator (such as an authorized person or an owner) that is authenticated from the user account or the like of the smartphone 200 sending an instruction for an operation may be notified of how to perform a correct operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus that is used in contact with a user, comprising:
    an image sensor that captures an object as an operation target that is present in a real space from a facing position, captures and detects motion of the user, the motion being performed to operate the object and the motion being performed in the real space without contacting the object; and
    a processing circuit that determines an operation of the object corresponding to the detected motion of the user according to images captured by the image sensor and instructs the object to execute the operation.

2. The information processing apparatus according to claim 1,
    wherein the image sensor detects the motion of the user from the images in which the object and a part of a body of the user are captured at a same time.

3. The information processing apparatus according to claim 2,
    wherein the images are captured by the user.

4. The information processing apparatus according to claim 3,
    wherein the part of the body of the user is displayed as superposed on the object.

5. The information processing apparatus according to claim 2,
    wherein the processing circuit associates the detected motion of the user with the object which is detected as superposed on the part of the body of the user on the images.

6. The information processing apparatus according to claim 5,
    wherein the processing circuit detects a part of a body determined in advance as a detection target.

7. The information processing apparatus according to claim 6,
    wherein the part of the body determined in advance is a finger or a hand.

8. The information processing apparatus according to claim 6,
    wherein the part of the body determined in advance is a foot.

9. The information processing apparatus according to claim 1,
    wherein the image sensor detects, as a detection target, the motion of the user performed in a case where the object and a part of a body of the user are captured in the images at a same time.

10. The information processing apparatus according to claim 1,
    wherein the operation corresponding to the motion of the user is prepared for each of individual portions of the object.

11. The information processing apparatus according to claim 1,
    wherein the processing circuit instructs the object to execute the operation only in a case where the user whose motion has been detected is a user permitted to operate the object.

12. The information processing apparatus according to claim 1,
    wherein the user is notified in a case where the object is unable to execute the operation corresponding to the detected motion of the user.

13. The information processing apparatus according to claim 12,
    wherein the user is notified of a method of correctly operating the object.

14. The information processing apparatus according to claim 1,
    wherein the processing circuit determines a content of the operation corresponding to the detected motion of the user in accordance with the object.

15. The information processing apparatus according to claim 1,
    wherein the processing circuit acquires a function of the object that is operable through communication with the object.

16. The information processing apparatus according to claim 1,
    wherein the processing circuit displays a body of the user in a transparent manner so that the object is not hidden by the body of the user.

17. The information processing apparatus according to claim 1,
    wherein the processing circuit selectively displays a part of a body of the user so that the object is not hidden by the body of the user.

18. The information processing apparatus according to claim 1,
    wherein the processing circuit displays a notation that suggests a portion of a body of the user as superposed on the object.

19. The information processing apparatus according to claim 1,
    wherein the processing circuit notifies the user that the motion of the user has been received as the operation.

20. The information processing apparatus according to claim 19,
    wherein the processing circuit displays a portion of a body whose motion has been received as the operation in a manner that is different from that before reception.

21. The information processing apparatus according to claim 1,
    wherein the processing circuit displays equipment that is used to operate the object as superposed on a body of the user.

22. The information processing apparatus according to claim 1,
    wherein the processing circuit displays equipment that matches an environment in which the object is present as superposed on a body of the user.

23. The information processing apparatus according to claim 1,
    wherein the image sensor detects the motion of a part of a body of the user from an image in which a screen that displays the images of the object and the part of the body of the user are captured at a same time.

24. The information processing apparatus according to claim 1,
    wherein the processing circuit determines a content of the operation corresponding to the motion of the user from an image synthesized from the image in which the object is captured and the image in which a part of a body of the user is captured.

25. The information processing apparatus according to claim 1,
wherein the processing circuit instructs a different device that includes a movable section to execute the operation corresponding to the motion of the user in a case where the operation requires a physical operation on the object.

26. An information processing apparatus comprising:
a receiver that receives an execution of an operation of the information processing apparatus from a terminal that is used in contact with a user, wherein the terminal captures the information processing apparatus, captures and detects a motion performed by the user and corresponding to the operation in a real space without contacting the information processing apparatus to determine the operation of the information processing apparatus; and
a processing circuit that permits the execution of the operation received from the terminal.

27. The information processing apparatus according to claim 1,
wherein when the detected motion of the user is a first motion, the processing circuit instructs the object to execute a first operation, and
wherein when the detected motion of the user is a second motion, the processing circuit instructs the object to execute a second operation.

28. The information processing apparatus according to claim 26,
wherein the processing circuit permits execution of the operation only if instructed from the terminal.

29. A non-transitory computer readable medium storing a program causing a computer that is used in contact with a user to function as:
an image sensor that captures an object as an operation target that is present in a real space from a facing position, captures and detects motion of the user from a location of the user, the motion being performed to operate the object, and the motion being performed in the real space without contacting the object; and
a processing circuit that determines an operation of the object corresponding to the detected motion of the user according to images captured by the image sensor and instructs the object to execute the operation.

* * * * *